United States Patent
Kato et al.

(10) Patent No.: US 10,191,265 B2
(45) Date of Patent: Jan. 29, 2019

(54) IMAGE GENERATION APPARATUS, IMAGE GENERATION METHOD, STORAGE MEDIUM, AND PROCESSING METHOD

(71) Applicant: Panasonic Intellectual Property Management Co., Ltd., Osaka (JP)

(72) Inventors: Yumiko Kato, Osaka (JP); Taichi Sato, Kyoto (JP); Yoshihide Sawada, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 114 days.

(21) Appl. No.: 15/450,329

(22) Filed: Mar. 6, 2017

(65) Prior Publication Data
US 2017/0269344 A1 Sep. 21, 2017

(30) Foreign Application Priority Data

Mar. 18, 2016 (JP) .................................. 2016-056249
Nov. 4, 2016 (JP) .................................. 2016-216720

(51) Int. Cl.
*G02B 21/00* (2006.01)
*G02B 21/36* (2006.01)
*H04N 13/207* (2018.01)
*G06T 5/50* (2006.01)

(52) U.S. Cl.
CPC ......... *G02B 21/008* (2013.01); *G02B 21/006* (2013.01); *G02B 21/0032* (2013.01); *G02B 21/367* (2013.01); *G02B 21/368* (2013.01); *G06T 5/50* (2013.01); *H04N 13/207* (2018.05); *G06T 2207/10056* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 9,031,315 B2* | 5/2015 | Muquit | .............. | G06K 9/00013 382/154 |
| 2014/0133702 A1 | 5/2014 | Zheng et al. | | |
| 2015/0199018 A1* | 7/2015 | Kim | ........................ | G06F 3/017 345/156 |
| 2015/0355101 A1* | 12/2015 | Sun | ...................... | H04N 13/254 348/46 |

FOREIGN PATENT DOCUMENTS

JP 2013-101512 5/2013

* cited by examiner

*Primary Examiner* — Pankaj Kumar
*Assistant Examiner* — Charles N Hicks
(74) *Attorney, Agent, or Firm* — Wenderoth, Lind & Ponack, L.L.P.

(57) ABSTRACT

An image generation apparatus includes a plurality of irradiators, and a control circuit. The control circuit performs an operation including generating an in-focus image of an object in each of a plurality of predetermined focal planes, extracting a contour of at least one or more cross sections of the object represented in the plurality of in-focus images, generating at least one or more circumferences based on the contour of the at least one or more cross sections, generating a sphere image in the form of a three-dimensional image of at least one or more spheres, each sphere having one of the circumferences, generating a synthetic image by processing the sphere image such that a cross section appears, and displaying the resultant synthetic image on a display.

19 Claims, 42 Drawing Sheets

FIG. 6

| FILE ID | IRRADIATOR POSITION INFORMATION | | |
|---|---|---|---|
| | x | y | z |
| ⋮ | ⋮ | ⋮ | ⋮ |
| 0000101 | 0360 | −1020 | 800 |
| 0000102 | 0420 | −1020 | 800 |
| 0000103 | 0480 | −1020 | 800 |
| ⋮ | ⋮ | ⋮ | ⋮ |

FIG. 29

| EMBRYO CULTURE TIME | STATE OF EMBRYO | NUMBER OF FOCAL PLANES |
|---|---|---|
| 0 H TO 10 H | PRONUCLEAR STAGE | 1 |
| 10 H TO 24 H | TWO CELL STAGE | 1 |
| 24 H TO 48 H | FOUR CELL STAGE | 2 |
| 48 H TO 72 H | EIGHT CELL STAGE | 3 |
| ⋮ | ⋮ | ⋮ |

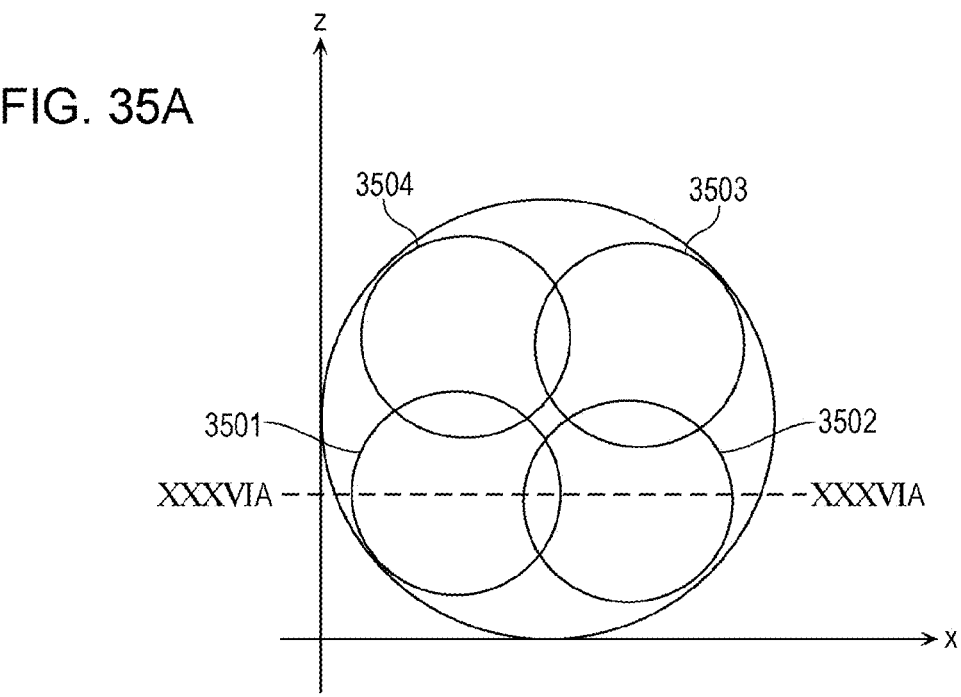
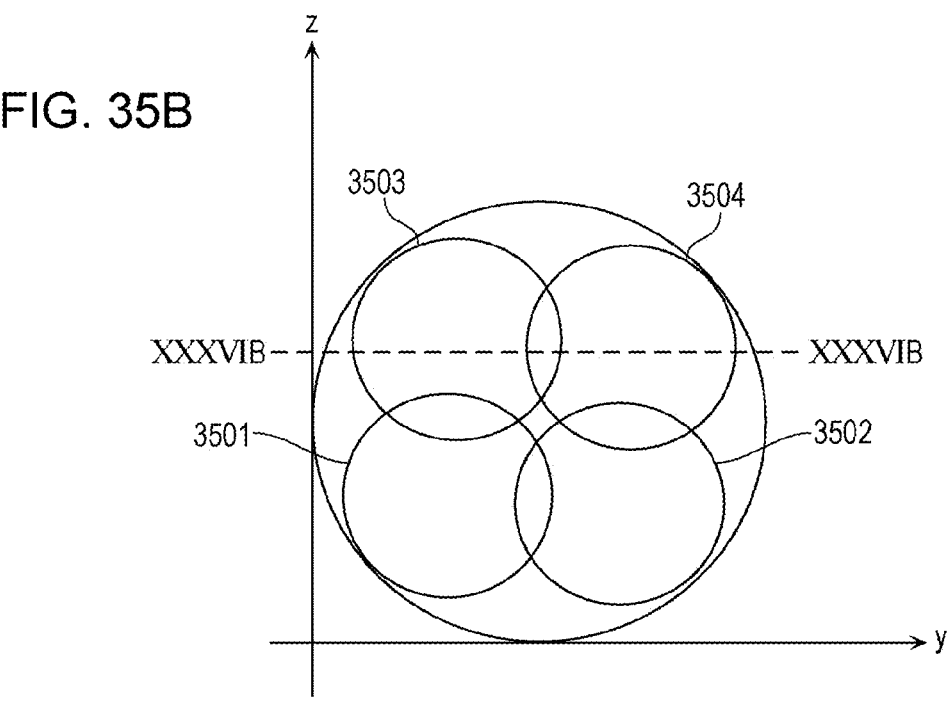

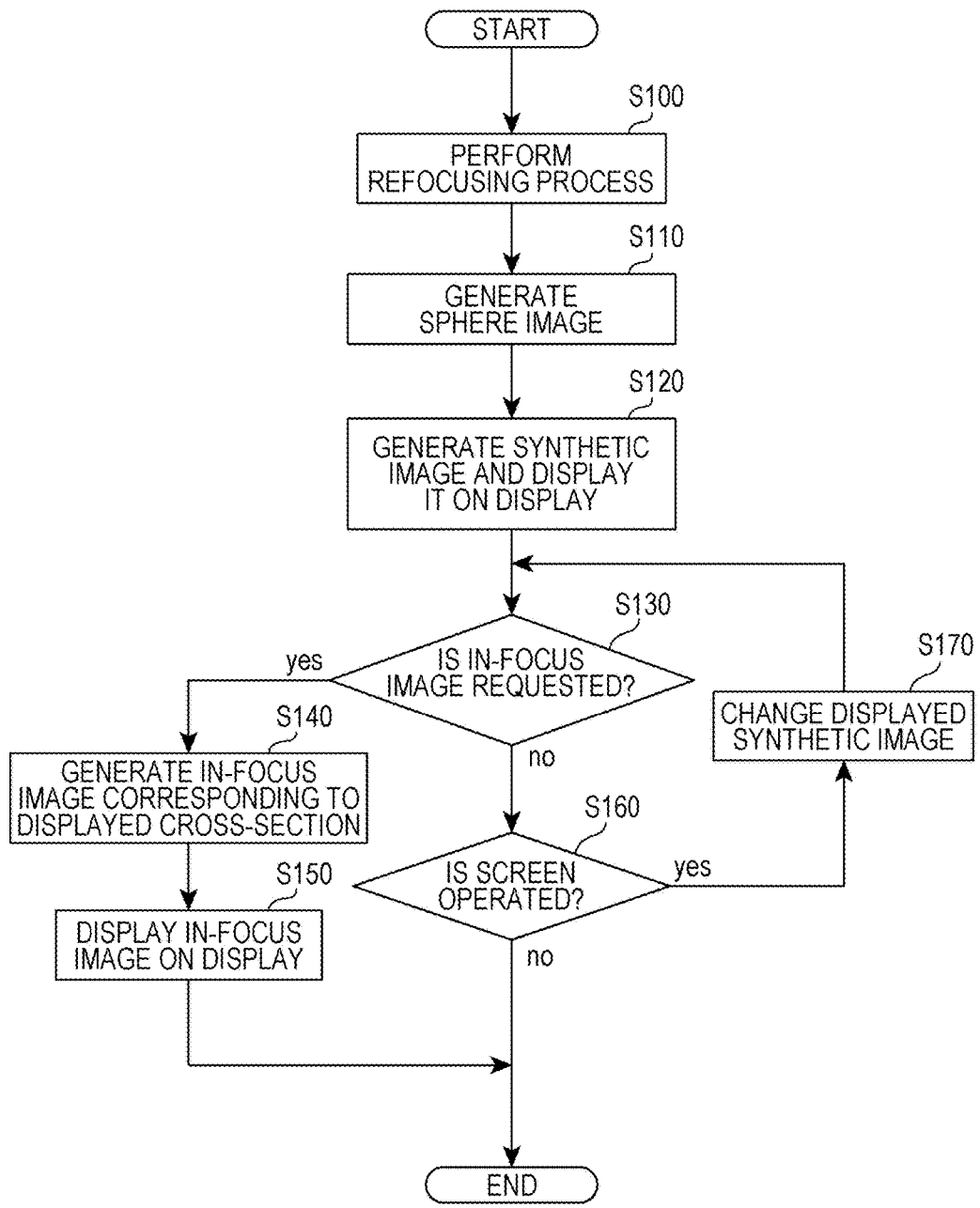

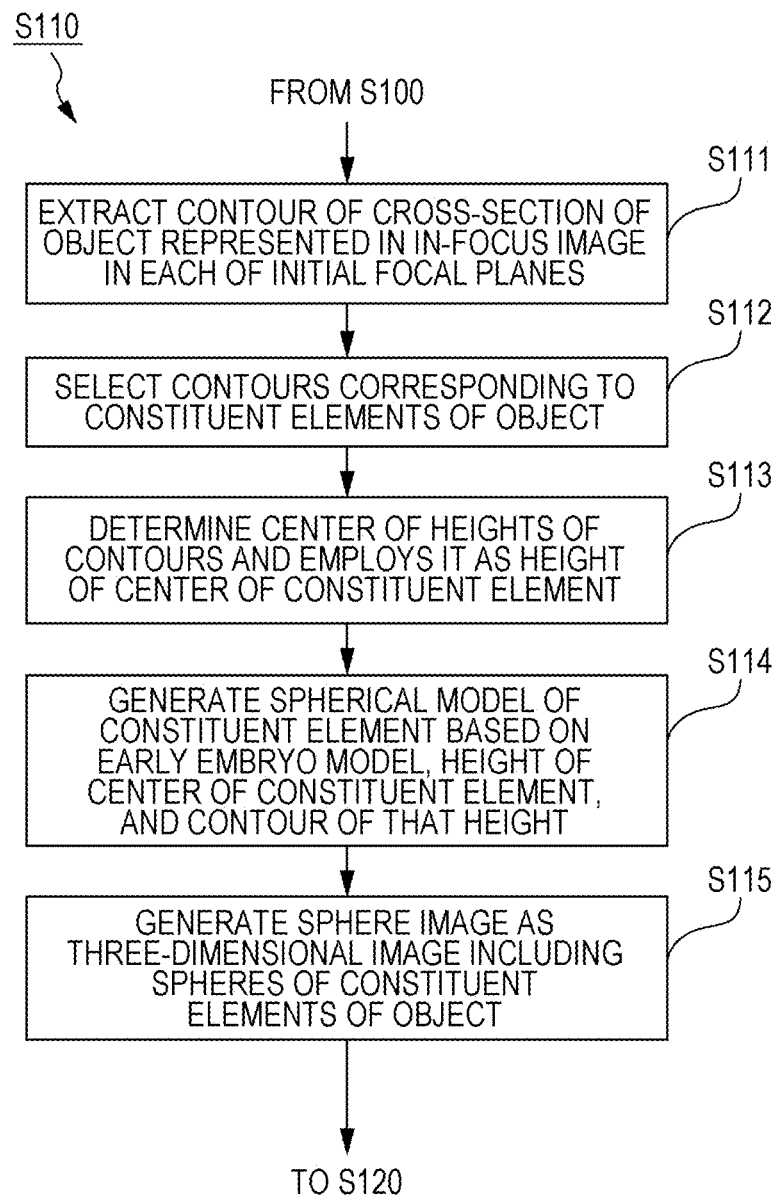

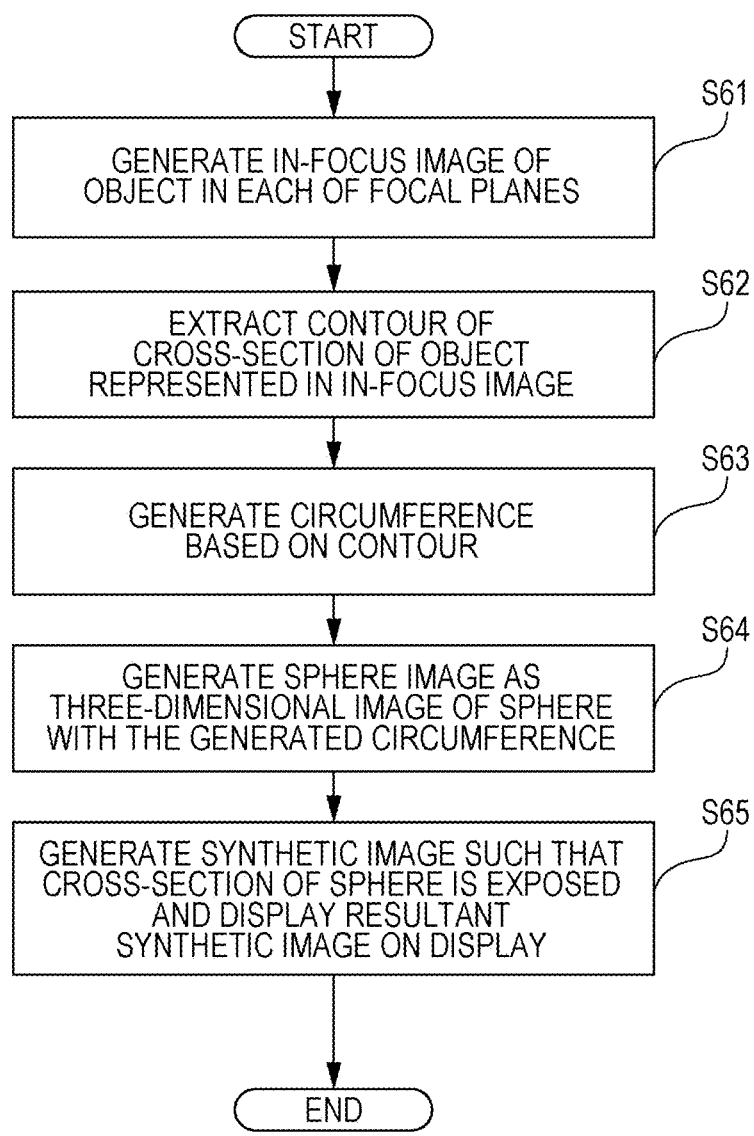

IMAGE GENERATION APPARATUS, IMAGE GENERATION METHOD, STORAGE MEDIUM, AND PROCESSING METHOD

BACKGROUND

1. Technical Field

The present disclosure relates to a technique of, in a lensless microscope, generating an image of an object in a virtual in-focus plane based on a plurality of captured images.

2. Description of the Related Art

In a wide variety of fields in which cells for treatment are produced, cells are used in evaluating effects of medicines, or cultured cells are used in medical treatment or industries, there is a need for continuously observing cells in culture without staining them. However, many cells are almost colorless and transparent, and thus it is difficult to recognize a three-dimensional structure of such a cell observed by an optical microscope using transmitted light.

In a technique disclosed in Japanese Unexamined Patent Application Publication No. 2013-101512, to evaluate a cross-sectional shape of a cell, an in-focus image (a pseudo cross section image) is generated in a plane not parallel to an objective lens from many images captured in focal planes that are parallel to the objective leans and that have different focal-point heights from an object (that is, the in-focus image is generated from many images captured while changing the position of the in-focus plane in a direction of height of the object).

Continuous observation of a cell in culture is performed in a limited space called an incubator keep a high-humidity environment necessary to culture the cell. For use in observation in such a high-humidity limited space, U.S. Patent Application Publication No. 2014/0133702 discloses a lensless microscope capable of observing a small cell without using a lens. In this technique, a plurality of images are captured while changing the position from which irradiation light is emitted, and the images are superimposed thereby achieving improved resolution. This technique is called ptychography.

SUMMARY

In the method disclosed in Japanese Unexamined Patent Application Publication No. 2013-101512, a problem is that it is difficult for a user to easily recognize a structure of an object.

One non-limiting and exemplary embodiment provides an image generation apparatus capable of allowing a user to easily understand a structure of an object and associated techniques.

In one general aspect, the techniques disclosed here feature an image generation apparatus including a plurality of irradiators, an image sensor having a surface on which an object is placed, and a control circuit that generates an in-focus image of the object in a virtual focal plane located between the image sensor and the plurality of irradiators, wherein the control circuit performs an operation including (a) generating an in-focus image of the object in each of a plurality of predetermined focal planes by using a plurality of captured images of the object, the captured images being obtained such that the plurality of irradiators sequentially irradiate the object and one image is captured by the image sensor each time the object is irradiated by one of the plurality of irradiator, (b) extracting a contour of at least one or more cross sections of the object represented in the plurality of generated in-focus images, (c) generating at least one or more circumferences based on the contour of the at least one or more cross sections, (d) generating a sphere image in the form of a three-dimensional image of at least one or more spheres, each sphere having one of the generated at least one or more circumferences, and (e) generating a synthetic image by processing the sphere image such that a cross section of the at least one or more spheres appears in the synthetic image, and displaying the resultant synthetic image on a display.

According to the present disclosure, it is possible to allow a user to easily understand a structure of an object.

It should be noted that general or specific embodiments may be implemented as a system, a method, an integrated circuit, a computer program, a computer-readable storage medium, or any selective combination thereof. The computer-readable storage medium may be, for example, a non-transitory storage medium such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of a content stored in a storage unit according to the first embodiment;

FIG. 29 is a diagram illustrating an example of an embryo information table according to the third embodiment;

FIG. 35A is a side view of a three-dimensional model of an embryo in a four cell stage;

FIG. 35B is a side view of a three-dimensional model of an embryo in a four cell stage;

FIG. 44 is a flow chart illustrating an example of an operation of an image generation apparatus according to the fourth embodiment;

FIG. 45 is a flow chart illustrating a detailed process of generating a sphere image in step S110 shown in FIG. 44;

FIG. 46B is a flow chart illustrating an example of an operation of a control circuit included in the image generation apparatus according to the fourth embodiment.

DETAILED DESCRIPTION

Figure 1:
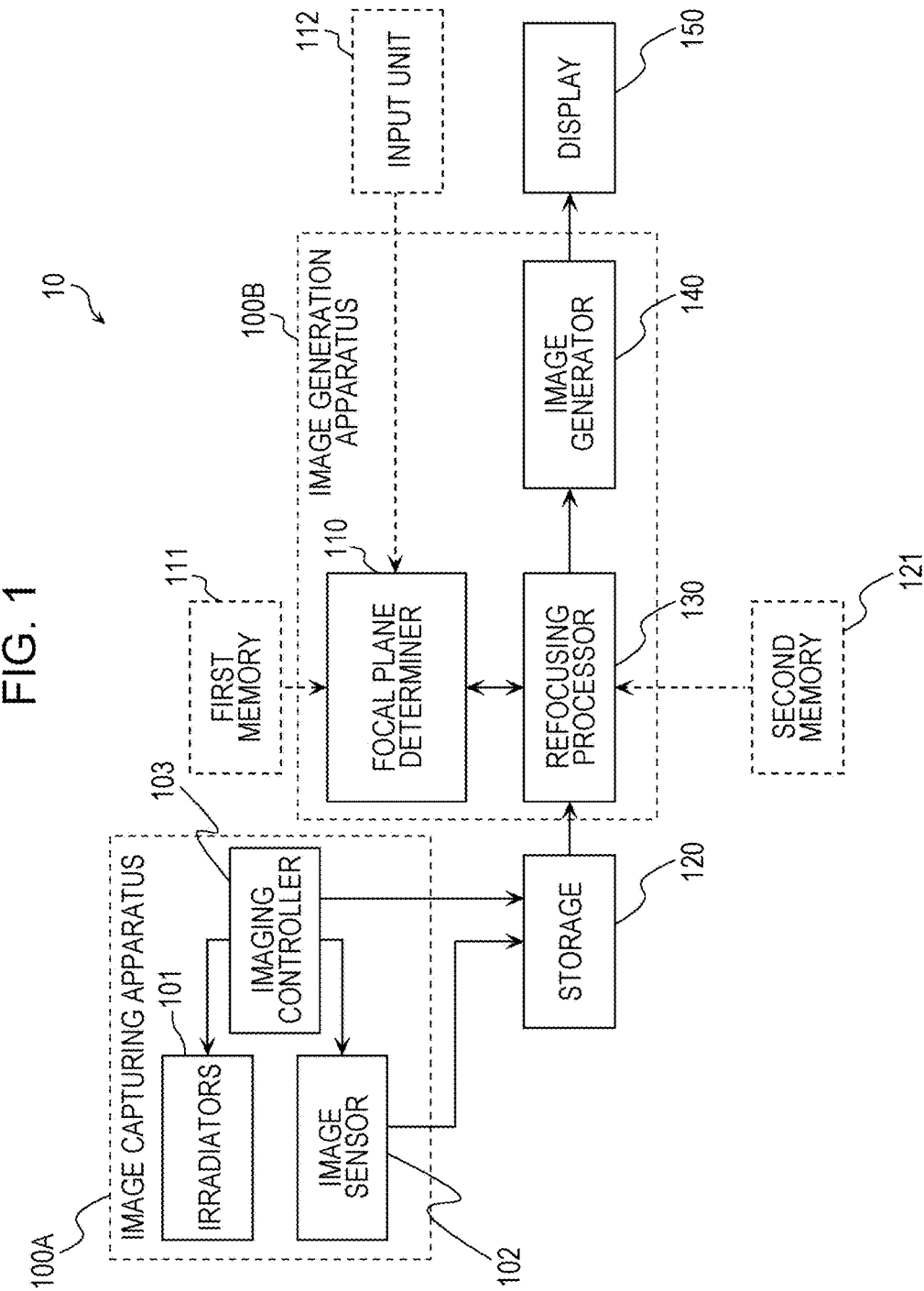
FIG. 1 is a block diagram illustrating an example of a functional configuration of an image generation system according to a first embodiment.
Figure 2:
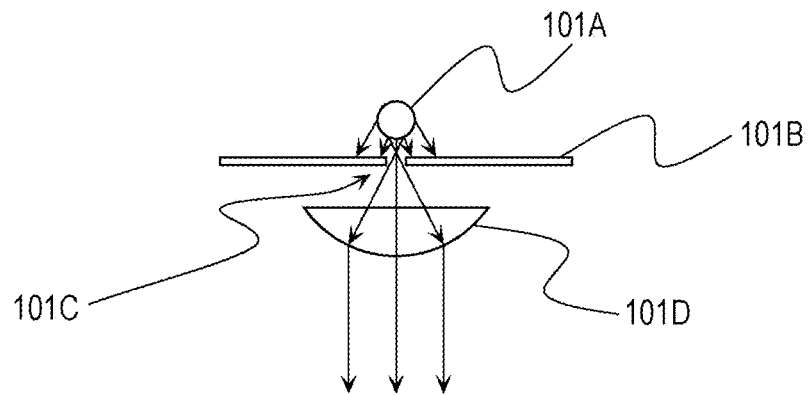
FIG. 2 is a diagram schematically illustrating an example of a structure of an irradiator according to the first embodiment.

In an aspect of the present disclosure, an image generation apparatus includes a plurality of irradiators, an image sensor having a surface on which an object is placed; a control circuit that generates an in-focus image of the object in a virtual focal plane located between the image sensor and the plurality of irradiators, wherein the control circuit performs an operation including (a) generating an in-focus image of the object in each of a plurality of predetermined focal planes by using a plurality of captured images of the object, the captured images being obtained such that the plurality of irradiators sequentially irradiate the object and one image is captured by the image sensor each time the object is irradiated by one of the plurality of irradiator, (b) extracting a contour of at least one or more cross sections of the object represented in the plurality of generated in-focus images, (c) generating at least one or more circumferences based on the contour of the at least one or more cross sections, (d) generating a sphere image in the form of a three-dimensional image of at least one or more spheres, each sphere having one of the generated at least one or more circumferences, and (e) generating a synthetic image by processing the sphere image such that a cross section of the at least one or more spheres appears in the synthetic image, and displaying the resultant synthetic image on a display.

Thus, it is possible to obtain a model representing the object in the form of a sphere image, and a synthetic image including the sphere image and a cross section is displayed on the display. Observing this synthetic image allows a user to easily understand the structure of the object.

In the operation performed by the control circuit, in (b), from the contours of the cross sections of the object represented in the respective generated in-focus images, a plurality of contours having the same size and located at the same position may be extracted from the respective in-focus images, and in (c), the circumference may be generated based on a contour having a highest edge intensity among the extracted contours. More specifically, for example, in the operation performed by the control circuit, in (c), the circumference may be generated such that the circumference is inscribed in or circumscribed about the contour having the highest edge intensity.

This aspect makes it possible to properly extract a contour of an object and determine a circumference according to the extracted contour. Thus it is possible to use the circumference in building a model of the object.

In the operation performed by the control circuit, in (d), the sphere image may be generated such that the sphere image includes a three-dimensional image of a sphere having the same center and the same radius as the center and the radius of the generated circumference.

This aspect makes it possible to properly generate a three-dimensional image of a sphere corresponding to an object.

In the operation performed by the control circuit, in (d), the sphere image may be generated such that the sphere image includes a three-dimensional images of a plurality of spheres whose respective spherical surfaces do not intersect with each other.

This aspect makes it possible to build a model in the form of a sphere image representing a structure of an object such as an embryo or the like.

In the image generation apparatus, the object may be an embryo, and each of the at least one or more spheres may include an outer sphere representing an outward appearance of the embryo and at least one or more inner spheres, each inner sphere being contained in the outer sphere and representing an outward appearance of a cell.

This aspect makes it possible for a user to easily understand a structure of an embryo.

The operation performed by the control circuit may further include (f) in response to an operation performed by a user, changing the position of the cross section in the synthetic image displayed on the display, and (g) in response to a request from a user, generating an in-focus image of the object in a focal plane corresponding to the cross section displayed on the display by using the plurality of captured images, and displaying the resultant in-focus image on the display.

This aspect allows a user to select a desired position of a cross section of an object such that a synthetic image, in which a cross section at the selected position appears, is displayed. Thus, according to this aspect, it is possible to easily display an in-focus image in which a cross-section of an object appears at a position specified by a user.

According to another aspect of the present disclosure, an image generation system includes a plurality of irradiators, an image sensor having a surface on which an object is placed, and a control circuit, and the image generation system generates an in-focus image of the object in a virtual focal plane located between the image sensor and the plurality of irradiators in which the plurality of irradiators sequentially irradiate the object, the image sensor acquires a captured image of the object each time the object is irradiated by one of the plurality of irradiators, and the control circuit performs an operation including (i) acquiring information on the focal plane located between the image sensor and the plurality of irradiators, (ii) performing (iii) to (vi) described below for each of a plurality of pixels forming the in-focus image, (iii) performing (iv) to (vi) described below for each of the plurality of irradiators, (iv) calculating a position of a point of interest given by an intersection at which a straight light connecting the position of the pixel on the focal plane and the position of the irradiator intersects with a light reception surface of the image sensor, (v) based on the position of the point of interest on the light reception surface of the image sensor, calculating a pixel value at the point of interest in the captured image acquired when the object is irradiated from the position of the irradiator wherein the pixel value shows brightness of a region in image, (vi) applying the pixel value at the point of interest to a pixel value of the pixel, (vii) generating an in-focus image of the object in the focal plane using a result of the pixel value applied to each of the plurality of pixels, and (viii) outputting the generated in-focus image of the object.

According to the present aspect, the pixel value of a pixel in a focal plane can be determined by applying thereto a pixel value at an intersection at which a straight light connecting the position of the pixel on the focal plane and the position of the irradiator intersects with the light reception surface of the image sensor. Thus, it is possible to determine the pixel value of each pixel of the in-focus image in the virtual focal plane such that pixel values of a plurality of captured images corresponding to the pixel are reflected, and thus it is possible to achieve high image quality in the generated in-focus image of the object.

According to another aspect of the present disclosure, an image generation system includes a plurality of irradiators, an image sensor having a surface on which an object is placed, and a control circuit, and the image generation system generates an in-focus image of the object in a virtual focal plane located between the image sensor and the plurality of irradiators in which the plurality of irradiators sequentially irradiate the object, the image sensor acquires a captured image of the object each time the object is irradiated by one of the plurality of irradiators, and the control circuit performs an operation including (i) acquiring information on the focal plane located between the image sensor and the plurality of irradiators, (ii') performing (iii') to (vi') described below for each of the plurality of captured images, (iii') acquiring position information on an irradiator corresponding to the captured image (iv') performing (v') to (vi') described below for each of a plurality of first pixels included in the captured image, (v') calculating a position of an intersection at which a straight light connecting the position of the first pixel on the light reception surface of the image sensor and the position of the irradiator intersects with the focal plane, (vi') applying the pixel value of the first pixel to the pixel value of one or more second pixels which are included in a plurality of second pixels forming the in-focus image and which correspond to the position of the intersection on the focal plane, (vii') generating an in-focus image of the object in the focal plane using an application result of the pixel values of the plurality of second pixels, and (viii) outputting the generated in-focus image of the object.

According to present aspect, the pixel value of the first pixel of the captured image can be applied to the pixel value of one or more second pixels of the in-focus image corresponding to the position of the intersection at which the straight light, connecting the position of the first pixel on the light reception surface of the image sensor and the position of the irradiator, intersects with the focal plane. Thus it is possible to reflect the pixel value of each pixel in the captured image in determining the pixel value of the pixels of the in-focus image, and thus it is possible to achieve high image quality in the generated in-focus image of the object.

For example, each of the plurality of irradiators may include a light source and a light blocking plate having a pinhole and located between the light source and the object, and the light source may emit diffusion light thereby irradiating the object via the pinhole.

According to this aspect, it is possible to irradiate an object with diffusion light emitted from the light source via the pinhole. This makes it possible to prevent a plurality of light beams emitted by irradiators from crossing each other, which allows an improvement in image quality for both the captured image and the in-focus image of the object.

For example, the image generation system may further include a display, and the display may display the in-focus image output from the control circuit.

According to the present aspect, it is possible to display the in-focus image.

For example, an irradiation position range may be further determined based on information on the focal plane, and the object may be irradiated sequentially by irradiators that are included in the plurality of irradiators and that correspond to the irradiation position range described above.

According to this aspect, the irradiation position range can be determined based on the information on the focal plane, and the object can be irradiated sequentially by the irradiators corresponding to the determined irradiation position range. Thus, it is possible to capture an image of the object using irradiators suitable for use in generating an in-focus image in a focal plane, which makes it possible to reduce the total image capturing time.

It should be noted that general or specific aspects may be implemented as an apparatus, a method, an integrated circuit, a computer program, a computer-readable storage medium such as a CD-ROM, or any selective combination thereof.

Next, an image generation system according to an embodiment of the present disclosure is described below with reference to drawings.

Note that any embodiment described below is proved to illustrate a general or specific example. In the following embodiments, values, shapes, constituent elements, locations of the constituent elements and manners of connecting the constituent elements, steps, the order of steps, and the like are described by way of example but not limitation. Among constituent elements described in the following embodiments, those constituent elements that are not described in independent claims indicating highest-level concepts of the present disclosure are optional.

First Embodiment

In a first embodiment, an object placed on an image sensor is illuminated sequentially by a plurality of irradiators. Each time the object is illuminated by one of the plurality of irradiators, an image of the object is captured. Using a plurality of obtained captured images, an image of the object in a virtual focal plane located between the image sensor between the plurality of irradiators is generated. Hereinafter, the image generated using a plurality of captured images will also be referred to as an in-focus image.

Configuration of Image Generation System

FIG. 1 is a functional block diagram of an image generation system according to a first embodiment. The image generation system 10 shown in FIG. 1 includes an image capturing apparatus 100A, an image generation apparatus 100B, a storage 120, and a display unit 150. The image generation system 10 may further include a first memory 111 storing information on a predetermined focal plane, a second memory 121 storing information on a pixel for which a refocusing process has been completed, and an input unit 112 that accepts an input on specification information specifying a focal plane.

Configuration of Image Capturing Apparatus

First, a configuration of the image capturing apparatus 100A is described below. The image capturing apparatus 100A includes a plurality of irradiators 101, an image sensor 102, and an imaging controller 103. The image capturing apparatus 100A acquires a captured image of an object. Note that the image capturing apparatus 100A does not have a focus lens.

The object is, for example, a plurality of translucent substances disposed on the image sensor 102. The plurality of substances are located such that there may be an overlap when seen in a projected view. A specific example of a substance is a cell.

Each of the irradiators 101 is an irradiator that emits parallel light or an irradiator that emits diffusion light. The plurality of irradiators 101 include a first irradiator and a second irradiator. The first irradiator and the second irradiator respectively emit light beams that do not cross each other. That is, a plurality of first light beams emitted as first light from the first irradiator do not cross each other. Similarly, a plurality of second light beams emitted as second light from the second irradiator do not cross each other. Therefore, in a case where light is emitted by either one of the first irradiator and the second irradiator, the light emitted from this one of the first irradiator and the second irradiator reaches, from one direction, one pixel included in the image sensor 102. That is, one pixel does not receive light from two or more directions.

In the following description, such irradiation will be referred to as non-intersecting irradiation. The non-intersecting irradiation may be realized using, for example, parallel light or diffusion light emitted from a point light source. The plurality of irradiators 101 sequentially emit light. The plurality of irradiators 101 are disposed at locations different from each other such that the light beams emitted from the respective irradiators 101 reach the object from directions different from each other.

The image sensor 102 includes a plurality of pixels. Each pixel of the image sensor 102 is disposed on a light reception surface and is configured to acquire an intensity of light received from the plurality of irradiators 101. The image sensor 102 acquires a captured image based on the intensity of light acquired by each pixel.

The image sensor 102 may be realized, for example, by a complementary metal-oxide semiconductor (CMOS) image sensor or a charge-coupled device (CCD).

The imaging controller 103 controls emission of light from the plurality of irradiators 101 and imaging by the image sensor 102. More specifically, the imaging controller 103 controls the order of emitting light by the plurality of irradiators 101 and the time intervals at which the plurality of irradiators 101 sequentially emit light. The imaging controller 103 may be realized by a computer system (not illustrated) including a central processing unit (CPU), a random access memory (RAM), a read-only memory (ROM), and the like. Functions of all or part of the elements of the imaging controller 103 may be realized by the CPU by executing a program stored in the ROM using the RAM as a work memory area. The functions of all or part of the elements of the imaging controller 103 may be realized using a dedicated hardware circuit.

The light beams, emitted from respective irradiators 101 disposed at location different from each other with respect to the light reception surface of the image sensor 102, are incident on the light reception surface at different angles depending on the irradiators 101. In a case where each of the plurality of irradiators 101 emits parallel light, the parallel light, emitted from each of the plurality of irradiators 101 is incident on the light reception surface of the image sensor 102 at a different angle depending on the irradiator 101. The parallel light may be obtained, for example, by passing light emitted from the LED light source 101A through a pinhole 101C formed in the light blocking plate 101B and further refracting it through a collimating lens 101D.

Figure 3:
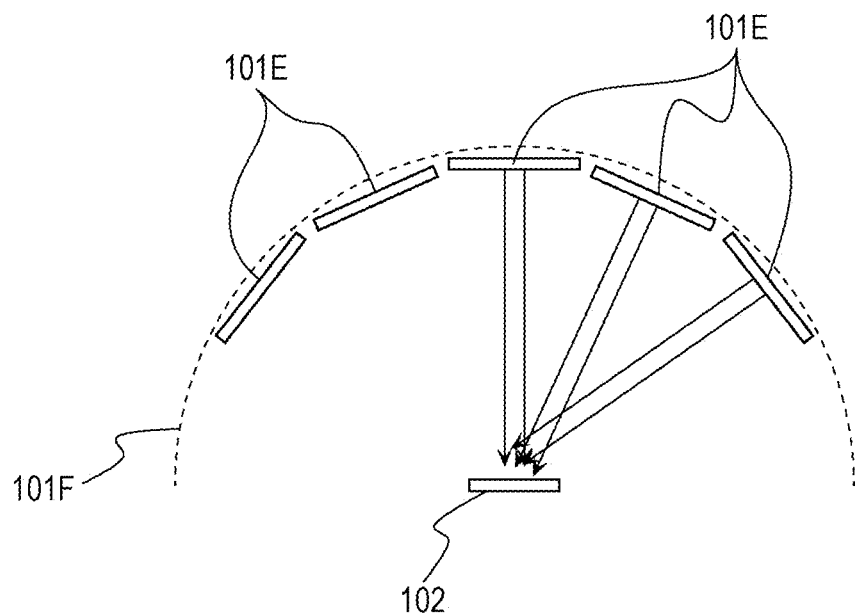
FIG. 3 is a diagram schematically illustrating an example of a structure of an irradiator according to the first embodiment.

FIG. 3 is a schematic diagram illustrating an example of a structure of the plurality of irradiators 101. In the example of the plurality of irradiators 101 shown in FIG. 3, the plurality of light sources 101E that emit parallel light are disposed at different angles with respect to the light reception surface of the image sensor 102. In the example shown in FIG. 3, a plurality of light sources 101E are disposed on an inner surface of a hemisphere 101F covering the image sensor 102. When light beams from the respective light sources 101E reach the light reception surface of the image sensor 102, the light beams are incident at different angles from each other depending on the light sources 101E.

Figure 4:
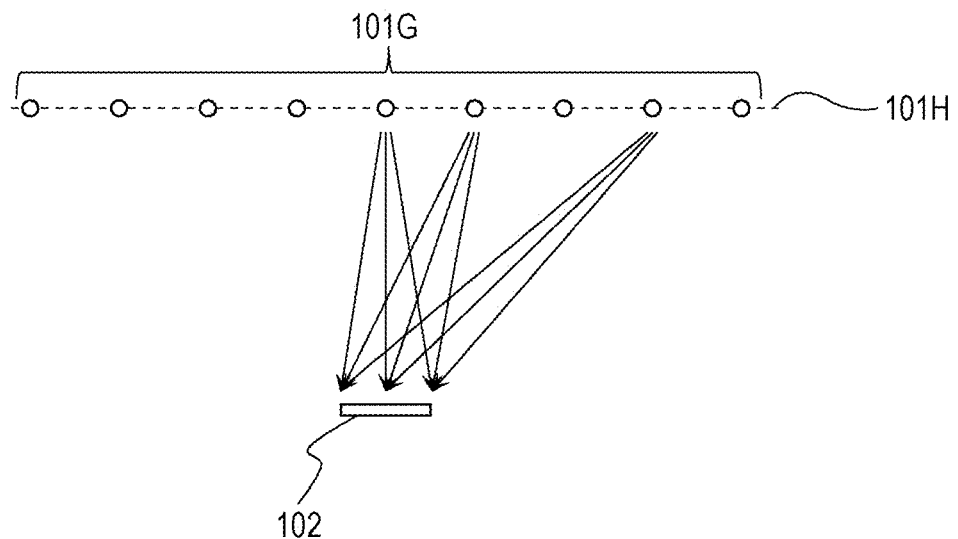
FIG. 4 is a diagram schematically illustrating an example of a structure of an irradiator according to the first embodiment.

FIG. 4 is a schematic diagram illustrating another example of a structure of the plurality of irradiators 101. In the example of the plurality of irradiators 101 shown in FIG. 4, a plurality of pseudo point light sources 101G are disposed at different locations in a plane 101H parallel to the light reception surface of the image sensor 102 such that the pseudo point light sources 101G face toward the image sensor 102. Light beams from the plurality of pseudo point light sources 101G are incident, from different directions, on pixels on the light reception surface of the image sensor 102. Each of the pseudo point light sources 101G may be realized, for example, by disposing a light blocking plate 101B having a pinhole 101C in the vicinity of the LED light source 101A. The size of the pinhole 101C is limited by the pixel pitch of the image sensor 102, the distance between the image sensor 102 and the pinhole 101C, and the distance of a point where an in-focus image is formed from the image sensor 102.

Figure 5:
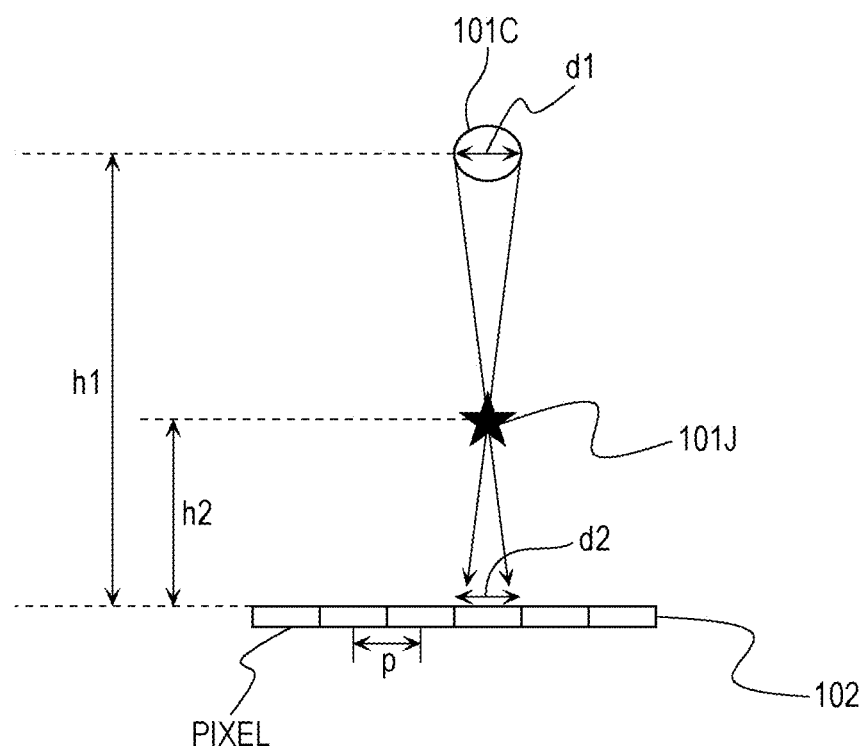
FIG. 5 is a schematic diagram illustrating a condition to be satisfied by a pinhole included in an irradiator according to the first embodiment.

FIG. 5 is a schematic diagram illustrating a condition to be satisfied in terms of the size of the pinhole. In FIG. 5, d1 denotes the diameter of the pinhole 101C, h1 denotes the distance from the light reception surface of the image sensor 102 to the pinhole 101C, and h2 denotes the distance from the light reception surface of the image sensor 102 to an in-focus point 101J (that is, a point of an arbitrary pixel in an in-focus image in a focal plane). Furthermore, d2 denotes the diameter of a spread spot of light arriving at the light reception surface of the image sensor 102 after passing through the pinhole 101C and further through the in-focus point, and p denotes the pixel pitch of the image sensor 102.

Ideally, light emitted from the pinhole 101C passes through the in-focus point 101J and reaches one point on the light reception surface of the image sensor 102. That is, it is desirable that light emitted from the pinhole 101C passes through the in-focus point 101J and reaches only one pixel of the image sensor 102. Therefore, it is desirable that d2 is not greater than the pixel pitch p of the image sensor. That is, to realize a non-intersecting irradiation, it is necessary to satisfy the condition d2<p as shown in formula (1).

$$d2 = \frac{d1 \cdot h2}{h1 - h2} < p \quad (1)$$

The condition to be satisfied by d1 can be obtained by rewriting formula (1) as shown in formula (2).

$$d1 < \frac{p(h1 - h2)}{h2} \quad (2)$$

For example, in a case where the pixel pitch p is 0.001 mm, the distance h1 from the light reception surface of the image sensor 102 to the pinhole 101C is 2 mm, and the distance h2 from the image sensor 102 to the in-focus point 101J is 0.1 mm, the diameter d1 of the pinhole may be less than 0.19 mm.

Configuration of Image Generation Apparatus

Next, a configuration of the image generation apparatus 100B is described below. The image generation apparatus 100B may be realized using a control circuit. As shown in FIG. 1, the image generation apparatus 100B includes a focal plane determiner 110, a refocusing processor 130, and an image generator 140.

The focal plane determiner 110 may be realized, for example, using a control circuit or a processor. The focal plane determiner 110 determines a virtual focal plane located between the plurality of irradiators 101 and the image sensor 102. More specifically, the focal plane determiner 110 determines the focal plane, for example, based on information about the focal plane stored in advance in the first memory 111. Alternatively, the focal plane determiner 110 may determine the focal plane based on information input from the outside via the input unit 112.

The storage 120 may be realized, for example, using a semiconductor memory, a hard disk drive, or the like. The storage 120 stores an image captured by the image sensor 102 together with position information indicating a position of the irradiator used in capturing this image.

FIG. 6 illustrates an example of a content stored in the storage 120. For each image file of an image captured by the image capturing apparatus 100A, position information associated with the irradiator used in obtaining the image file is stored. In the example shown in FIG. 6, the position information associated with the irradiator represents a relative position with respect to the image sensor 102. Hereinafter, the position information associated with the irradiator will also referred to as irradiation position information. The irradiation position information is stored together with a file ID of an image file such that the irradiation position information is linked to image data via the file ID. Note that the irradiation position information may be alternatively stored in a part (for example, a header) of an image file.

The refocusing processor 130 may be realized, for example, using a control circuit or a processor. The refocusing processor 130 calculates the light intensity for each of the pixels forming the in-focus image in the focal plane from the plurality of images, the position information associated with the plurality of irradiators 101, and the information on the virtual focal plane. Details of the refocusing process will be described later.

The image generator 140 may be realized, for example, using a control circuit or a processor. The image generator 140 generates an in-focus image in the focal plane from the pixel values of the respective pixels calculated by the refocusing processor 130.

The display 150 is realized by a display device, and the display 150 displays the in-focus image generated by the image generator 140.

Operation of Image Generation System

Figure 7:
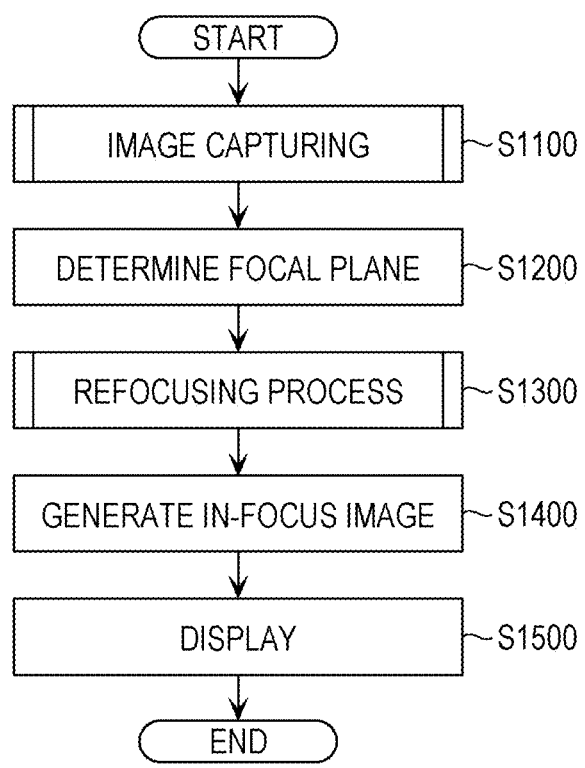
FIG. 7 is a flow chart illustrating an example of an operation of the image generation system according to the first embodiment.
Figure 8:
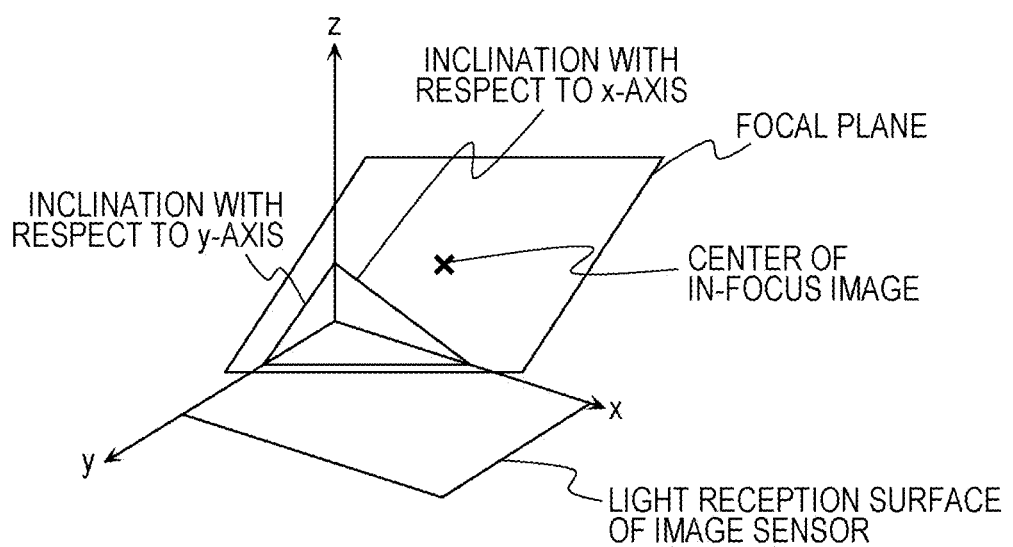
FIG. 8 is a schematic diagram illustrating an example of a relationship between coordinates and a focal plane.

Next, an operation of the image generation system 10 configured in the above-described manner is described below. FIG. 7 is a flow chart illustrating an example of an operation of the image generation system 10 according to the first embodiment. FIG. 8 is a schematic diagram illustrating an example of a relationship between coordinates and a focal plane.

(Step S1100) First, the image capturing apparatus 100A irradiates an object by sequentially using the plurality of irradiators 101 and captures a plurality of images of the object. More specifically, each time one of the irradiators 101 irradiates the object, the image capturing apparatus 100A captures an image of the object by storing the intensity of light reaching the light reception surface of the image sensor 102. The captured image is stored in the storage 120 together with the position information associated with the irradiator used to irradiate the object when the image of interest is captured. Note that in the present example, the locations of the plurality of irradiators 101 are fixed with respect to the image sensor 102, and the position information associated with each of the irradiators 101 is determined in advance. Details of the image capturing process will be described later.

(Step S1200) The focal plane determiner 110 determines the focal plane. More specifically, the focal plane determiner 110 determines the position and the inclination (the angle) of the focal plane with respect to the image sensor 102. For example, the focal plane determiner 110 may determine the focal plane based on the predetermined information on the focal plane stored in the first memory 111. Alternatively, the focal plane determiner 110 may determine the focal plane based on specification information specifying the focal plane given by a user via the input unit 112.

The focal plane refers to a virtual plane where an in-focus image is formed. That is, each of the pixels included in the in-focus image of the object in the focal plane has a one-to-one correspondence to a point in the focal plane.

For example, the focal plane determiner 110 determines the focal plane using the angle and the position of the focal plane. The angle and the position of the focal plane may be defined in an xyz-space such as that shown in FIG. 8.

In FIG. 8, an xy-plane is coincident with the xy-plane of the image sensor 102, and a z-axis is perpendicular to the light reception surface of the image sensor 102. In this case, the angle of the focal plane is defined by an angle with respect to the x-axis and an angle with respect to the y-axis in the xyz-space in which the origin is taken at the center of the light reception surface of the image sensor 102. The position of the focal plane is defined by coordinates of the center point of the focal plane.

(Step S1300) The refocusing processor 130 determines the pixel value of each of points in the focal plane by performing the refocusing process based on the plurality of captured images, the position information associated with the plurality of irradiators 101, and the information on the focal plane. Details of the refocusing process will be described later.

(Step S1400) The image generator 140 generates image data capable of being output to a display or the like based on a result of the refocusing process performed in step S1300. The image generator 140 outputs the generated image data to the display 150.

(Step S1500) The display 150 displays the image generated in step S1400.

Image Capturing Process

Figure 9:
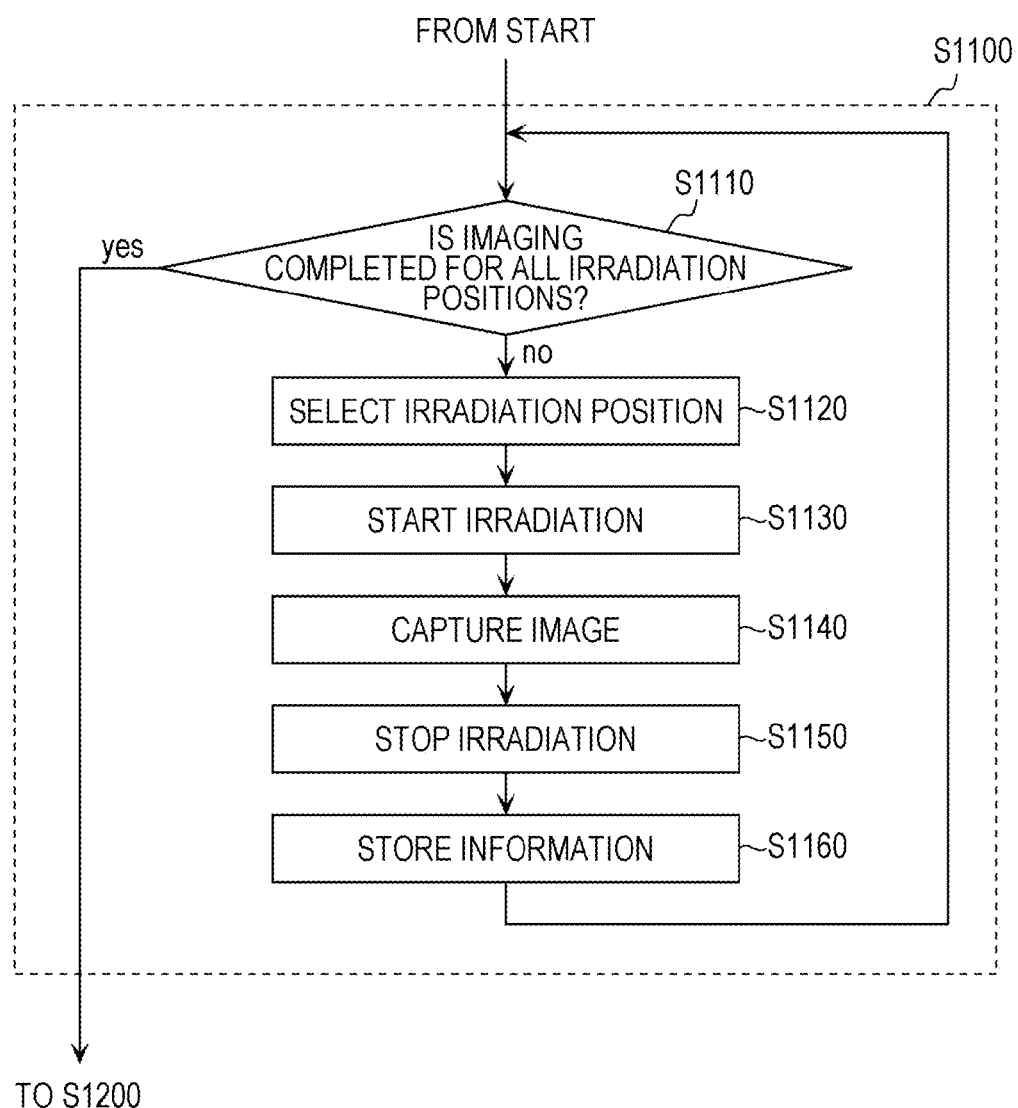
FIG. 9 is a flow chart illustrating an example of an operation of an image capturing apparatus according to the first embodiment.

The details of the operation of the image capturing apparatus 100A in step S1100 are described below. FIG. 9 is a flow chart illustrating an example of an operation of the image capturing apparatus 100A.

(Step S1110) The imaging controller 103 makes a determination, by referring to a list of a plurality of irradiation positions specified via a not-illustrated input unit (hereinafter referred to as an irradiation position list), as to whether capturing images of the object irradiated from the respective irradiation positions is completed. The plurality of irradiators 101 and the plurality of irradiation positions in the irradiation position list have a one-to-one correspondence.

In a case where it is determined that the image capturing is completed for all irradiation positions included in the irradiation position list (yes in step S1110), the processing flow proceeds to step S1200. On the other hand, in a case where it is determined that the image capturing is not completed for any one of the irradiation positions included in the irradiation position list (no in step S1110), the processing flow proceeds to step S1120.

(Step S1120) The imaging controller 103 selects an irradiation position that has not been used in illumination from the plurality of irradiation positions included in the irradiation position list, and the imaging controller 103 outputs a control signal to the plurality of irradiators 101. Note that in a case where there are two or more irradiation positions that have not been used in illumination, the imaging controller 103 select one of such irradiation positions. In the irradiation position list, each irradiation position is indicated, for example, by a number uniquely assigned to the irradiation position. Alternatively, each irradiation position may be indicated by coordinate values in the xyz-space such as that illustrated in FIG. 8. The selection of the irradiation position may be performed, for example, in ascending order of irradiation positions described in the list.

(Step S1130) The plurality of irradiators 101 start illuminating the object according to the control signal output in step S1120 from the imaging controller 103. That is, the irradiator located at the irradiation position selected in step S1120 starts emitting light.

(Step S1140) When the object is being irradiated by the irradiator, the image sensor 102 acquires an image formed by light emitted from the irradiator and passed through the object.

(Step S1150) Thereafter, the imaging controller 103 outputs a control signal to the plurality of irradiators 101 to stop illuminating the object. Note that stopping the illumination may not be performed according to the control signal from the imaging controller 103, but, for example, the plurality of irradiators 101 may measure the elapsed time since the start of illumination and may spontaneously stop the illumination when the measured elapsed time reaches a predetermined value. Alternatively, after the image sensor 102 has acquired the image in step S1140, the image sensor 102 may output the control signal to the plurality of irradiators 101 to stop the illumination.

(Step S1160) Next, the imaging controller 103 outputs the image acquired in step S1140 and the position information associated with the irradiator used in step S1130 to the storage 120. The storage 120 stores the image data and the irradiation position information in a correlated manner. After step S1160, the processing flow returns to step S1110.

The process from step S1110 to step S1160 is repeated until the object is illuminated from all irradiators located at irradiation positions included in the irradiation position list and an image is acquired each time the object is irradiated with light from one of the irradiation positions.

Refocusing Process

Figure 10:
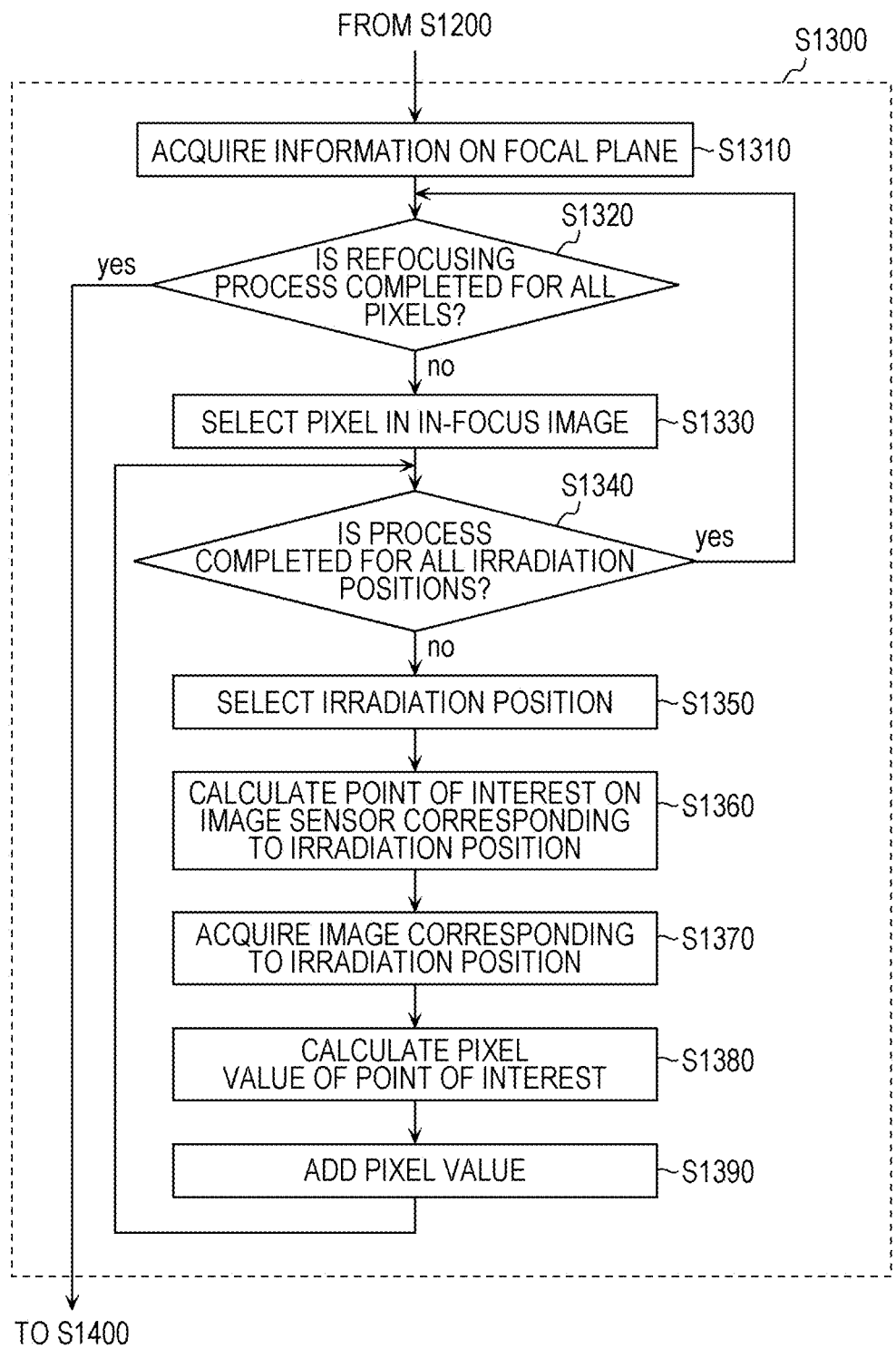
FIG. 10 is a flow chart illustrating an example of an operation of a refocusing processor according to the first embodiment.

The operation by the refocusing processor 130 in step S1300 is described in further detail below. FIG. 10 is a flow chart illustrating an example of the operation of the refocusing processor 130 according to the first embodiment. FIGS. 11 to 15 are schematic diagrams illustrating examples of calculation methods of the refocusing process.

Referring to FIGS. 11 to 15, each step in the flow chart shown in FIG. 10 is described below.

(Step S1310) The refocusing processor 130 acquires, from the focal plane determiner 110, the information on the focal plane determined in step S1200.

The information on the focal plane includes, for example, coordinate values of the center of the focal plane, and a value indicating the inclination of the focal plane. The inclination of the focal plane may be represented, for example, by an angle made by an intersection line between the focal plane and the xz-plane with respect to the x-axis. Alternatively, for example, the inclination of the focal plane may be represented by an angle made by an intersection line between the focal plane and the yz-plane with respect to the y-axis. The coordinate values of the center of the focal plane are given by the coordinate values of a pixel at the center of the in-focus image in the focal plane.

Figure 11:
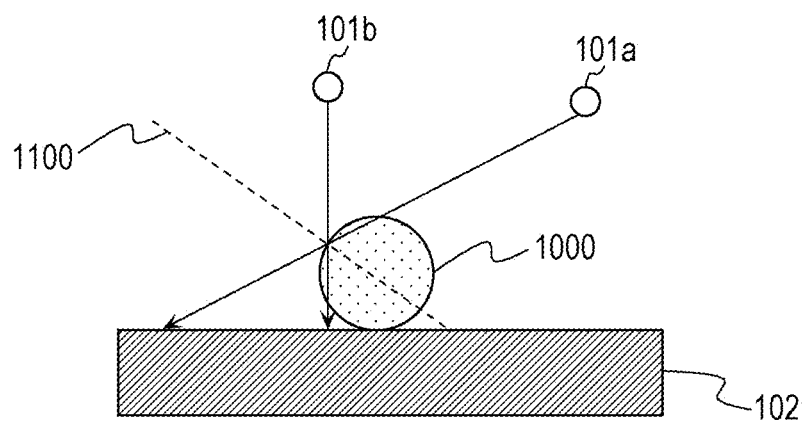
FIG. 11 is a schematic diagram illustrating a specific example of a refocusing process according to the first embodiment.

FIG. 11 illustrates the image capturing apparatus 100A and an example of a cross-sectional view, taken along the xz-plane, of an object 1000. The object 1000 is located above the image sensor 102 and between the image sensor 102 and the irradiators 101a and 101b. The refocusing processor 130 acquires the information on the focal plane 1100.

(Step S1320) The refocusing processor 130 determines whether the refocusing process is completed for all pixels included in the in-focus image. Note that the refocusing process refers to a process from step S1320 to step S1390.

In a case where the refocusing process is completed for all pixels included in the in-focus image (yes in step S1320), the refocusing processor 130 ends the refocusing process (the processing flow proceeds to step S1400).

In a case where the refocusing process is not completed for any one of the pixels included in the in-focus image (no in step S1320), the refocusing processor 130 continues the refocusing process (the processing flow proceeds to step S1330).

Figure 12:
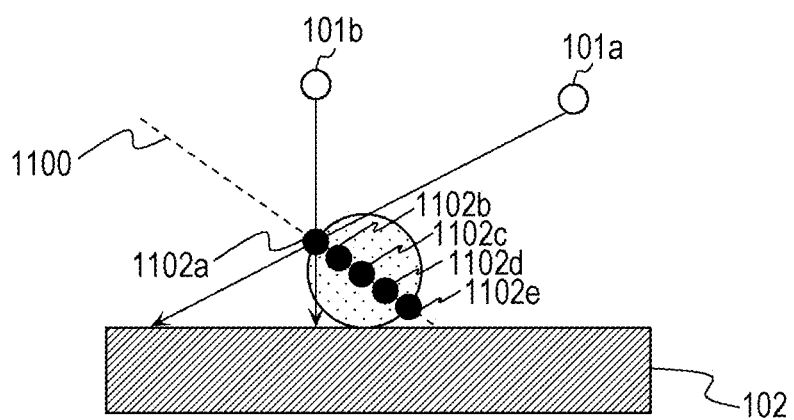
FIG. 12 is a schematic diagram illustrating a specific example of a refocusing process according to the first embodiment.

The in-focus image includes a plurality of pixels. The plurality of pixels included in the in-focus image correspond in a one-to-one manner to a plurality of points on the focal plane. FIG. 12 illustrates a plurality of points 1102a to 1102e on the focal plane 1100 corresponding to a plurality of pixels included in an in-focus image. In the example shown in FIG. 12, the points 1102a to 1102e on the focal plane 1100 are those on the object 1000. However, points other than those on the object 1000 may correspond to pixels of the in-focus image.

(Step S1330) The refocusing processor 130 selects one pixel from a plurality of pixels included in the in-focus image. Note that the one pixel selected herein is a pixel that is included in the plurality of pixels of the in-focus image but that has not yet been subjected to the refocusing process. Note that the pixel values of the in-focus image are initially set to 0.

Figure 13:
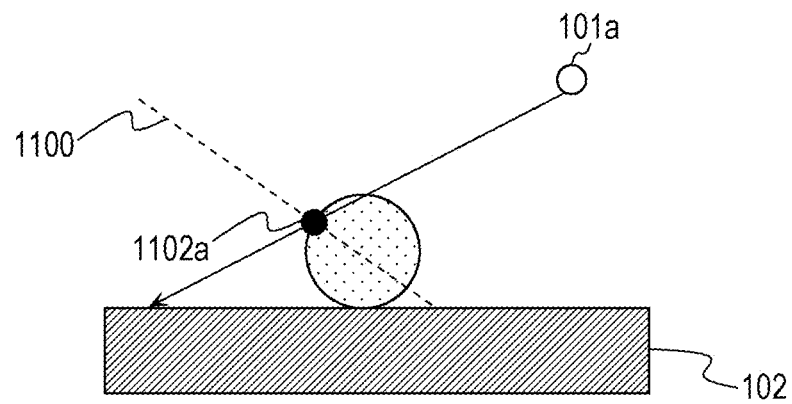
FIG. 13 is a schematic diagram illustrating a specific example of a refocusing process according to the first embodiment.

For example, the second memory 121 shown in FIG. 1 stores information on pixels that are included in the in-focus image and that have already been subjected to the refocusing process. After a process in step S1390 described below, the refocusing processor 130 stores, in the second memory 121, information of a pixel already subjected to the refocusing process. The refocusing processor 130 refers to the information on the pixels stored in the second memory 121 and selects a pixel that is not yet subjected to the refocusing process. Herein, let it be assumed by way of example that a pixel corresponding to point 1102a is selected as shown in FIG. 13. Hereinafter, the pixel corresponding to the point 1102a will also be referred to simply as a selected pixel.

(Step S1340) The refocusing processor 130 determines whether an addition process is completed for all irradiation positions.

In a case where the addition process is completed for all irradiation positions (yes in step S1340), the process of the refocusing processor 130 returns to step S1320.

On the other hand, in a case where the addition process is not completed for any one of the irradiation positions (no in step S1340), the refocusing processor 130 continues the addition process (the processing flow proceeds to step S1350). Note that the addition process refers to a process from step S1340 to step S1390.

(Step S1350) The refocusing processor 130 selects an irradiation position, for which the addition process has not yet been performed, from all irradiation positions used in the image capturing process.

(Step S1360) The refocusing processor 130 calculates a point at which a straight line extending passing through the selected irradiation position and the location of the selected pixel in the focal plane intersects with the light reception surface of the image sensor 102.

Figure 14:
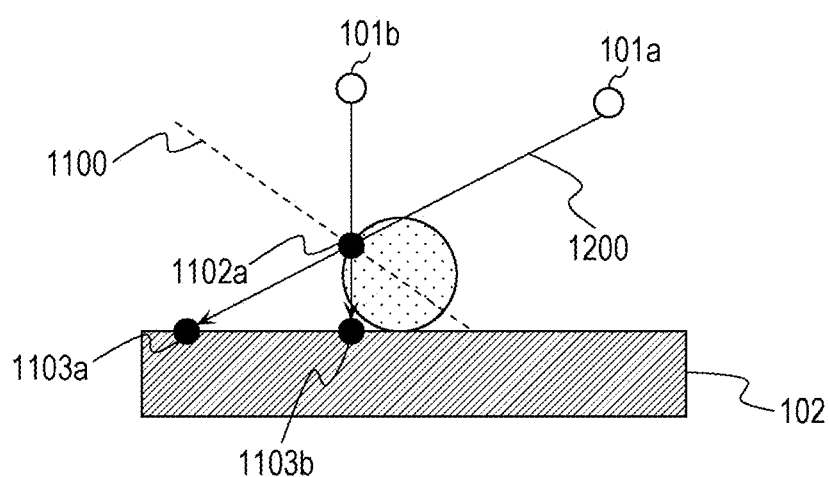
FIG. 14 is a schematic diagram illustrating a specific example of a refocusing process according to the first embodiment.

FIG. 14 illustrates a straight light 1200 passing through the location of the irradiator 101a and a point 1102a corresponding to the selected pixel and also illustrates an intersection 1103a at which the straight light 1200 intersects the light reception surface of the image sensor 102. Hereinafter, the intersection 1103a will also be referred to as a point of interest subjected to the addition process.

The point of interest on the light reception surface of the image sensor 102 may be represented, for example, by coordinate values on the xy-plane shown in FIG. 8.

(Step S1370) The refocusing processor 130 acquires, from the storage 120, an image corresponding to the selected irradiation position. That is, the refocusing processor 130 acquires, from the storage 120, an image captured using an irradiator located at the selected irradiation position. More specifically, the refocusing processor 130 acquires an image stored in the storage 120 according to the relationship between the image and the irradiation position information shown in FIG. 6. For example, the refocusing processor 130 acquires an image corresponding to the location of the irradiator 101a shown in FIG. 13.

(Step S1380) The refocusing processor 130 determines the position of the point of interest, calculated in step S1360, on the image sensor 102 for the captured image. More specifically, the refocusing processor 130 determines the position of the point of interest in the captured image with respect to a pixel array of the captured image.

In a case where the point of interest in the captured image is at a center position of a plurality of pixels, the refocusing processor 130 calculates the pixel value of the point of interest in the captured image by performing an interpolation process using pixel values of a plurality of pixels adjacent to the position of the point of interest. More specifically, for example, the refocusing processor 130 determines the distance between the point of interest and each of the plurality of pixels (for example, 4 pixels) adjacent to the point of interest, and determines the sum of pixel values of the respective pixels times the reciprocal ratios of the distances from the point of interest to the pixels thereby determining the pixel value of the point of interest in the captured image.

Figure 15:
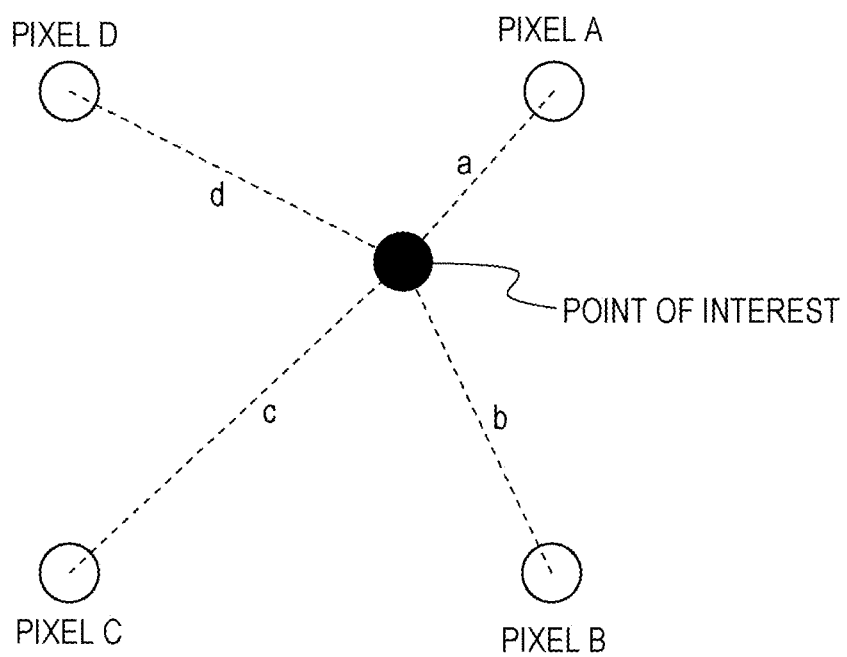
FIG. 15 is a schematic diagram illustrating a specific example of a refocusing process according to the first embodiment.

FIG. 15 is a schematic diagram illustrating the calculation of the pixel value of the point of interest in step S1380. In FIG. 15, the distances from the point of interest to four pixels A, B, C, and D adjacent to the point of interest are denoted by a, b, c, and d. In this case, the pixel value Lt of the point of interest is determined according to formula (3) described below.

$$L_t = \left(\frac{L_a}{a} + \frac{L_b}{b} + \frac{L_c}{c} + \frac{L_d}{d}\right) \times (a+b+c+d) \qquad (3)$$

where La, Lb, Lc, and Ld respectively denote pixel values of the pixel A, the pixel B, the pixel C, and pixel D.

(Step S1390) The refocusing processor 130 adds the pixel value of the point of interest calculated in step S1390 to the pixel value of the selected pixel on the in-focus image.

By repeating the process from step S1340 to step S1390, the pixel value of the selected pixel is obtained as a result of the process in which the pixel values of the points of interest in the captured image for all irradiation positions are added to the pixel value of the selected pixel.

Via the addition process described above, a plurality of images formed by light beams coming from a plurality of directions for each point on the focal plane are superimposed on one pixel of the in-focus image.

In FIG. 14, light emitted from the irradiator 101a passes through a point 1102a on the focal plane 1100 corresponding to the selected pixel and reaches a point of interest (an intersection 1103a) on the light reception surface of the image sensor 102. Thus, the image at the point 1102a on the focal plane 1100 is involved in the image at the position of the point of interest (the intersection 1103a) in the image captured using the irradiator 101a.

On the other hand, in FIG. 14, light emitted from the irradiator 101b passes through a point 1102a on the focal plane 1100 corresponding to the selected pixel and reaches a point of interest (an intersection 1103b) on the light reception surface of the image sensor 102. Thus, the image at the point 1102a on the focal plane 1100 is involved in the image at the position of the point of interest (the intersection 1103b) in the image captured using the irradiator 101b.

By adding an image (a pixel value) at one point of interest (the intersection 1103a in the present example) and an image (a pixel value) at another point of interest (the intersection 1103b in the present example), a plurality of images formed from light coming from a plurality of directions are superimposed on a selected pixel in an in-focus image.

Advantageous Effects

In the image generation system according to the present embodiment, as described above, a pixel value of a pixel on a focal plane is given such that a straight light is defined to pass through a position of the pixel on the focal plane and a position of an irradiator, and a pixel value of a point on the light reception surface of the image sensor 102 at which the straight line intersects with the light reception surface of the image sensor 102 is applied to the pixel value of the pixel on the focal plane. Thus a pixel value of a pixel of an in-focus image on a virtual focal plane may be given by applying pixel values of a plurality of captured images corresponding to this pixel. By performing this process for each pixel of the in-focus image, it is possible to generate a high-quality in-focus image of an object.

First Modification to First Embodiment

A first modification to the first embodiment is described below. In the first embodiment described above, an irradiation position is selected in step S1350 in FIG. 10. Alternatively, in the first modification, a captured image is selected. In the following description of the first modification to the first embodiment, the description focuses on differences from the first embodiment.

Figure 16:
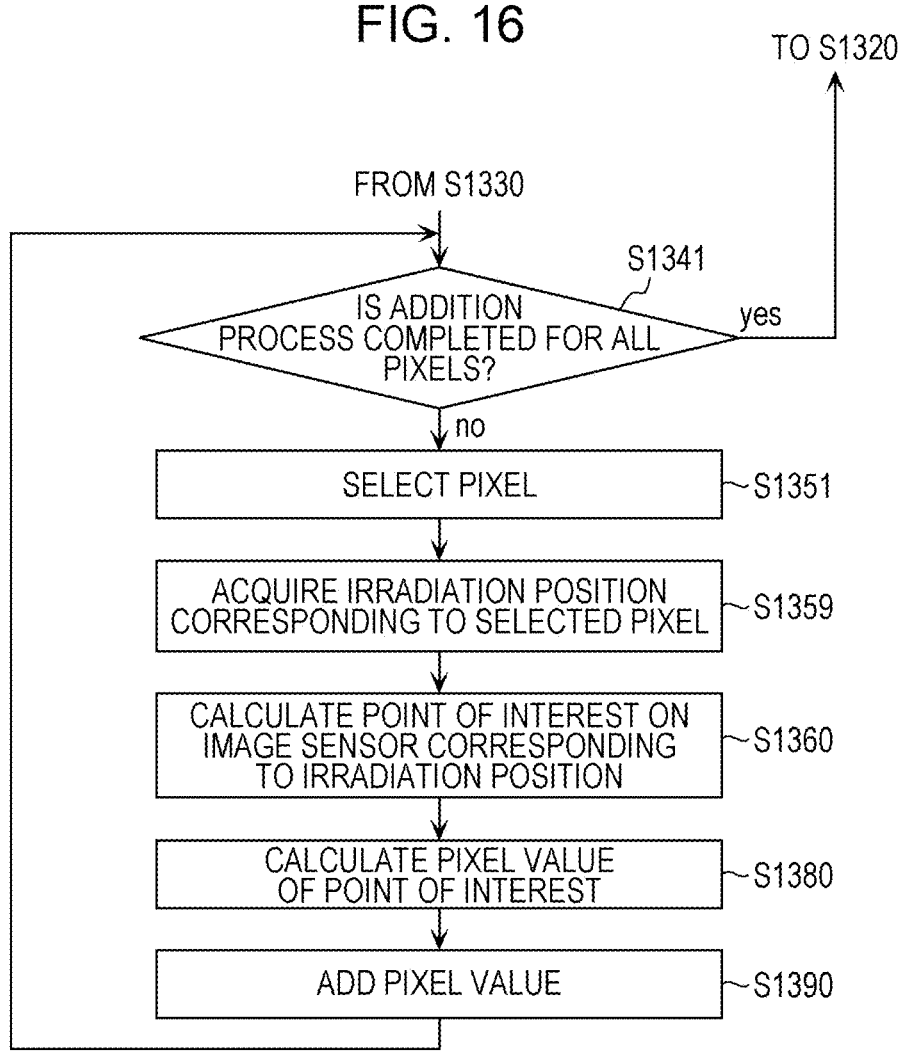
FIG. 16 is a flow chart illustrating an example of an operation of a refocusing processor according to a first modification to the first embodiment.

FIG. 16 is a flow chart illustrating an example of an operation of a refocusing processor according to a first modification to the first embodiment. In FIG. 16, instead of performing step S1340 to step S1390 in FIG. 10, step S1341 to step S1390 are performed. In FIG. 16, steps substantially the same as those in FIG. 10 are denoted by similar reference symbols, and a further detailed description thereof is omitted.

In FIG. 16, in a case where all captured images have been used in the addition process (yes in step S1341), the processing flow returns to step S1320. On the other hand, in a case where there is a captured image that has not yet been used in the addition process (no in step S1341), the processing flow proceeds to step S1351, and the refocusing processor 130 selects one captured image stored in the storage 120 (step S1351). In this step, a captured image that has not yet been used in the addition process is selected as the one captured image.

The refocusing processor 130 acquires, from the storage 120, irradiation position information corresponding to the captured image selected in step S1351 (step S1359). Thereafter, the process is performed in a similar manner as shown in FIG. 9 except that acquisition of an image in step S1370 is not performed.

In the image generation system according to the present modification, as described above, instead of selecting an irradiation position, a captured image is selected. Also in this case, as with the first embodiment, a pixel value of each pixel of an in-focus image can be obtained by applying pixel values of a plurality of captured images corresponding to the pixel, and thus it is possible to generate a high-quality in-focus image of an object.

Second Modification to First Embodiment

A second modification to the first embodiment is described below. In the first embodiment described above, pixels of an in-focus image are sequentially selected in step S1320 and step S1330 shown in FIG. 10. Alternatively, in the second modification, pixels of a captured image are sequentially selected. That is, in the second modification, unlike the first embodiment, a pixel of a captured image is first selected, and then a point on a focal plane corresponding to the selected pixel is determined. The pixel value of the selected pixel in the captured image is then reflected in the pixel in the in-focus image corresponding to the determined point on the focal plane. In the following description of the second modification to the first embodiment, the description focuses on differences from the first embodiment.

Figure 17:
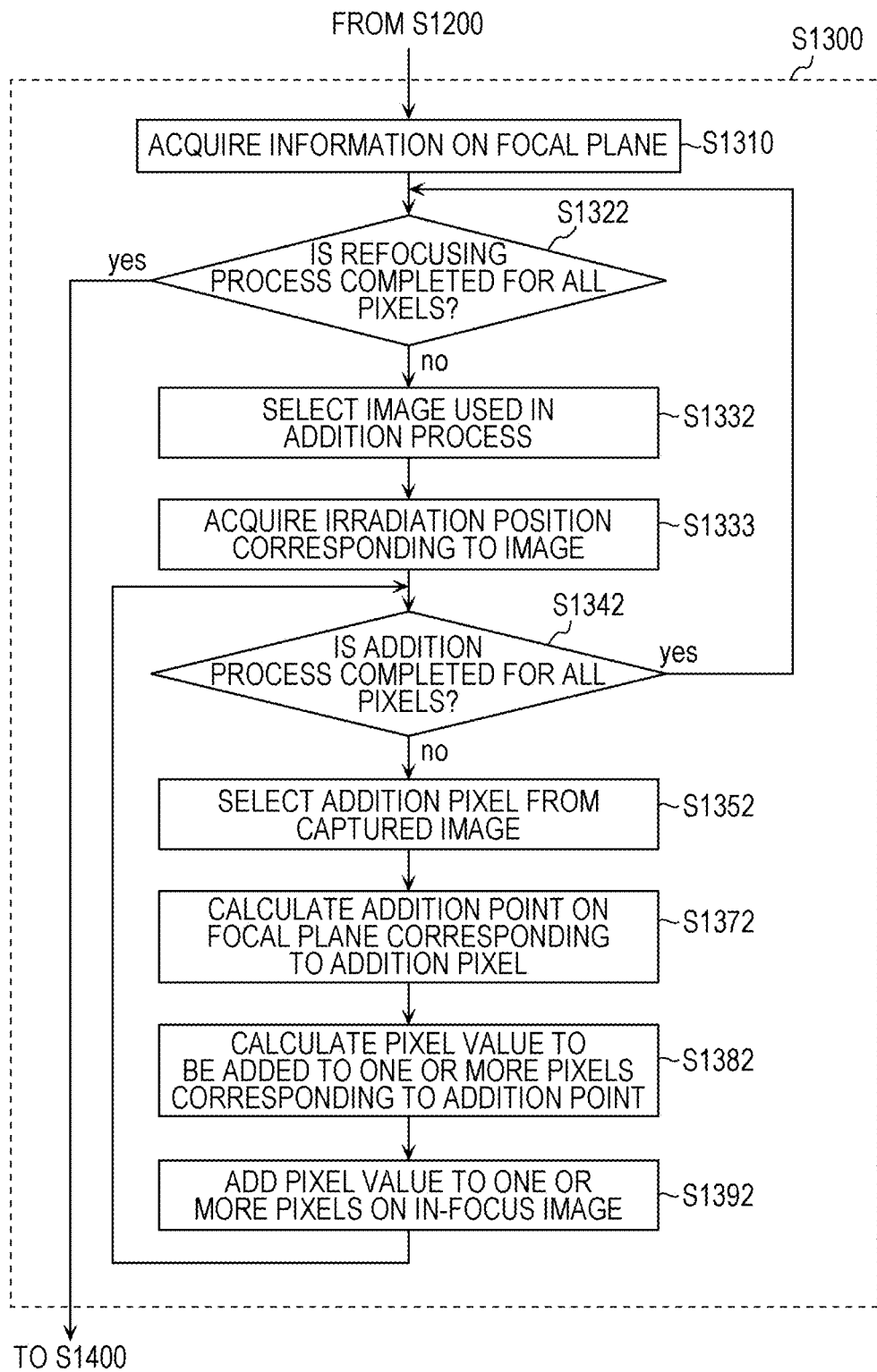
FIG. 17 is a flow chart illustrating an example of an operation of a refocusing processor according to a second modification to the first embodiment.

FIG. 17 is a flow chart illustrating an example of an operation of a refocusing processor according to the second modification to the first embodiment. In FIG. 17, steps substantially the same as those in FIG. 10 are denoted by similar reference symbols, and a further detailed description thereof is omitted.

(Step S1322) The refocusing processor 130 determines whether the refocusing process is completed for all images captured in step S1100. The refocusing process refers to a process from step S1322 to step S1392. In a case where the refocusing process is completed for all images (yes in step S1322), the refocusing processor 130 advances the processing flow to step S1400. In a case where the refocusing process is not completed for any one of the images captured in step S1100 (no in step S1322), the processing flow proceeds to step S1332.

(Step S1332) The refocusing processor 130 selects one captured image from images captured in step S1100 and stored in the storage 120 (step S1332). Note that the one captured image selected herein is an image that has not yet been subjected to the refocusing process. Hereinafter, the one image selected in step S1332 will be referred to as a selected image.

(Step S1333) The refocusing processor 130 acquires irradiation position information corresponding to the selected image. For example, the refocusing processor 130 acquires irradiation position information according to the correspondence between the image and the irradiation position information shown in FIG. 6. Herein, let it be assumed by way of example that position information corresponding to an irradiator 101a is selected.

(Step S1342) The refocusing processor 130 determines whether the addition process is completed for all pixels of the selected image (step S1342). In a case where the addition process is completed for all pixels of the selected image (yes in step S1342), the addition process is ended, and the processing flow returns to step S1322. In a case where the addition process is not yet completed for any one of the pixels of the selected image (no in step S1342), the processing flow proceeds to step S1352. Herein, the addition process refers to a process from step S1342 to step S1392.

(Step S1352) The refocusing processor 130 selects one pixel from pixels of the selected image. Note that the one pixel selected herein is a pixel that has not yet been subjected to the addition process.

Figure 18:
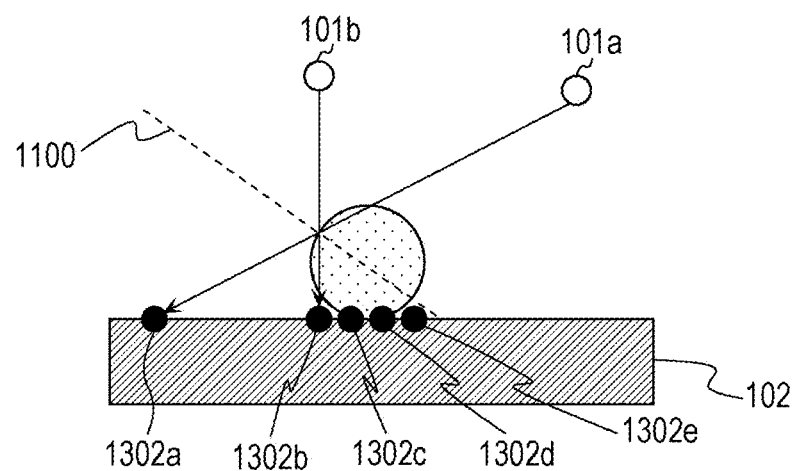
FIG. 18 is a schematic diagram illustrating a specific example of a refocusing process according to the second modification to the first embodiment.
Figure 19:
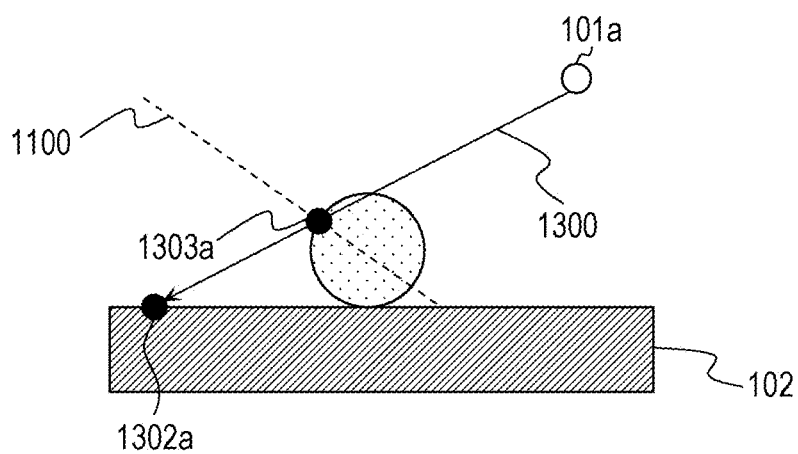
FIG. 19 is a schematic diagram illustrating a specific example of a refocusing process according to the second modification to the first embodiment.

FIG. 18 illustrates a plurality of points 1302a to 1302e on the light reception surface corresponding to a plurality of pixels included in the selected image. Herein, as illustrated in FIG. 19, let it be assumed by way of example that a pixel corresponding to the point 1302a on the light reception surface is selected from the selected image. Hereinafter, the pixel selected in step S1352 will also be referred to as an addition pixel.

(Step S1372) The refocusing processor 130 calculates a position of an intersection 1303a at which a straight line, which extends passing through the point 1302a on the light reception surface and a position of the irradiator 101a, intersects with the focal plane 1100. Hereinafter, the intersection 1303a will also be referred to as an addition point.

(Step S1382) The refocusing processor 130 adds a pixel value of the addition pixel in the selected image corresponding to the point 1302a on the light reception surface to a pixel value of one or more pixels in the in-focus image corresponding to the addition point (the intersection 1303a) on the focal plane.

For example, in a case where the position of the intersection 1303a does not correspond to a position of any pixel (integer pixel) in the in-focus image, the refocusing processor 130 calculates pixel values to be added to a plurality of pixels, in the in-focus image, adjacent to the intersection 1303a. More specifically, the refocusing processor 130 determines a position, with reference to the pixel array of the in-focus image, in the in-focus image corresponding to the addition point (the intersection 1303a) on the focal plane calculated in step S1372.

Figure 20:
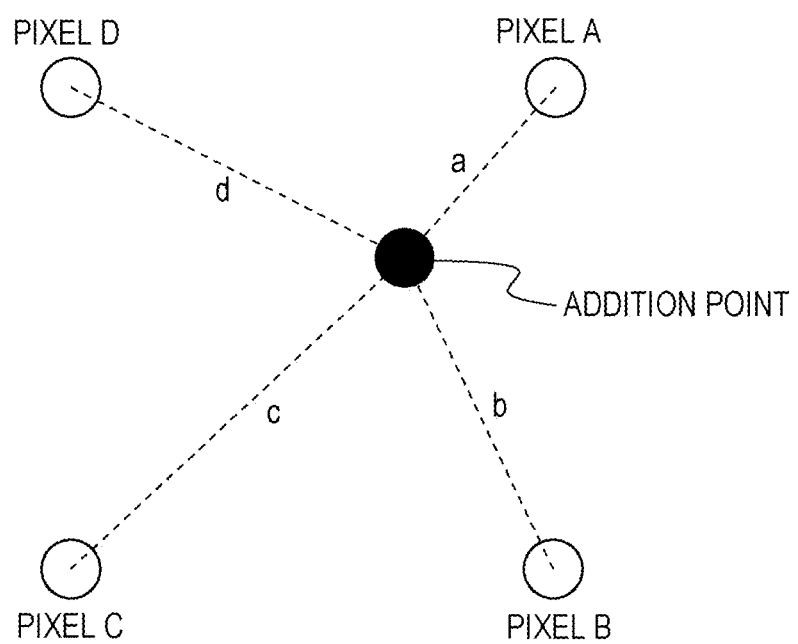
FIG. 20 is a schematic diagram illustrating a specific example of a refocusing process according to the second modification to the first embodiment.

For example, as shown in FIG. 20, a position surrounded by four pixels (a pixel A to a pixel D) in the in-focus image is determined as the position of the addition point. In this case, the refocusing processor 130 calculates the distances from the addition point to respective four pixels (pixels A, B, C, and D) in the in-focus image adjacent to the point of interest. The refocusing processor 130 calculates the pixel values to be added to the respective pixels adjacent to the addition point using the pixel value of the addition pixel and the calculated distances. For example, the refocusing processor 130 calculates the pixel values to be added to the respective pixels such that the relative pixel value increases with decreasing relative distance between the addition point and the pixel in the in-focus image adjacent to the addition point. More specifically, for example, for a pixel value La to be added to the pixel A, the refocusing processor 130 calculates the pixel value La according to formula (4) shown below.

$$L_a = \frac{a+b+c+d}{a} \times L \qquad (4)$$

where a denotes the distance between the addition point and the pixel A in the in-focus image, b denotes the distance between the addition point and the pixel B in the in-focus image, c denotes the distance between the addition point and the pixel C in the in-focus image, d denotes the distance between the addition point and the pixel D in the in-focus image, and L denotes the pixel value of the addition pixel in the captured image.

(Step S1392) The refocusing processor 130 adds the pixel value calculated in step S1382 to the pixel value of one or more pixels in the in-focus image.

By repeating the process from step S1342 to step S1392, it is possible to reflect pixel values of all pixels in the selected image in pixel values of pixels in the in-focus image.

Furthermore, by repeating the process from step S1322 to step S1392, the addition process is performed for all pixels in the captured image thereby generating an in-focus image in the focal plane.

Figure 21:
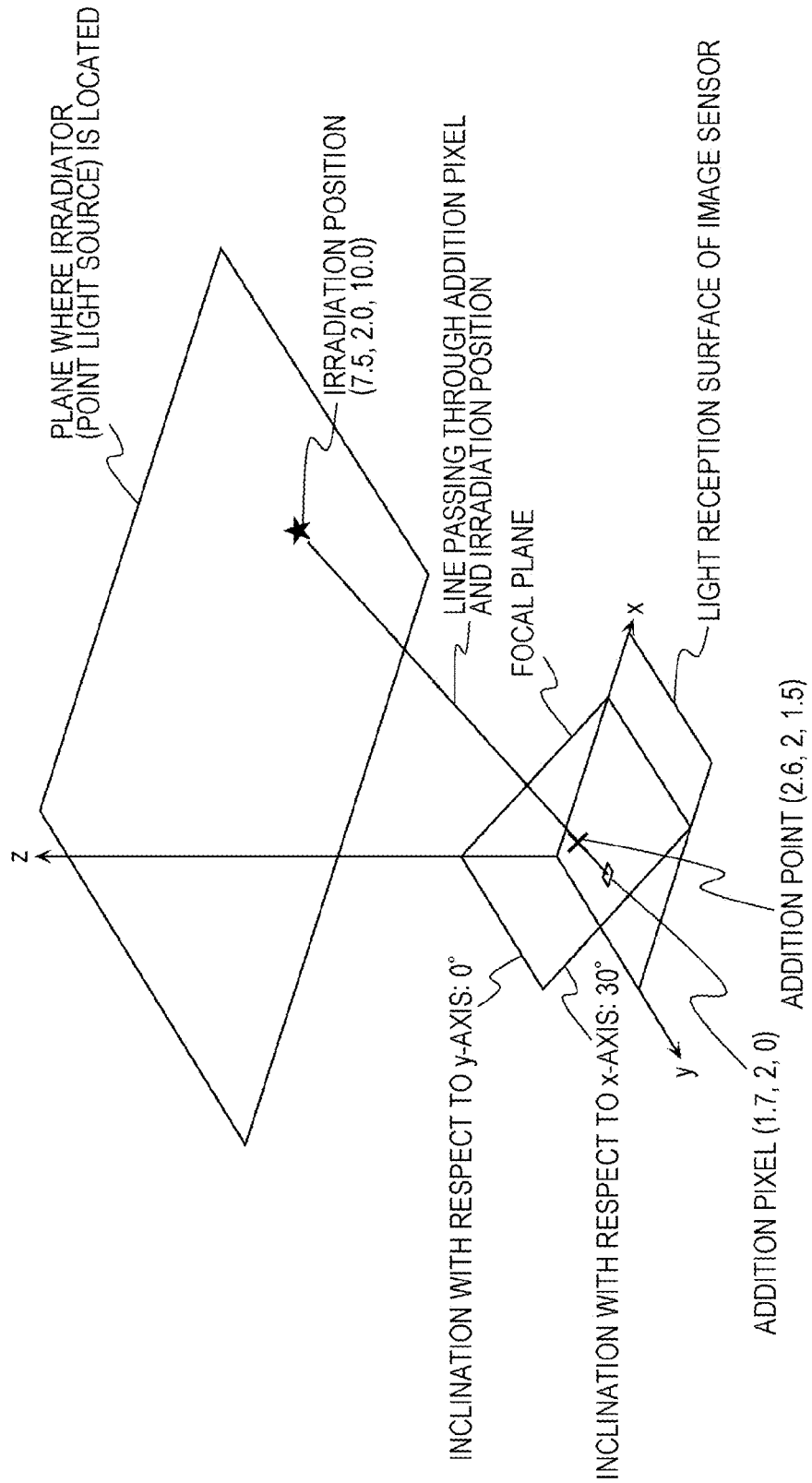
FIG. 21 is a schematic diagram illustrating a specific example of a refocusing process according to the second modification to the first embodiment.

A specific example of each step in the flow chart shown in FIG. 17 is described below with reference to FIG. 21. Herein, let it be assumed by way of example that the image sensor 102, the focal plane, and other factors satisfy conditions described below. The light reception surface of the image sensor 102 has a length of 6 mm in its longitudinal direction (that is, in a direction parallel to the x-axis) and a length of 4 mm in its lateral direction (that is, in a direction parallel to the y-axis). The inclination of the focal plane is 30° with respect to the x-axis and 0° with respect to the y-axis. The area of the focal plane is the same as the area of the light reception surface of the image sensor 102. That is, the focal plane has a rectangular shape of a plane with a size of 6 mm×4 mm. One of the short sides of the focal plane is in the yz-plane as shown in FIG. 21 and extends in a direction parallel to the y-axis. The other one of the short sides of the focal plane is in the xy-plane and extends, passing through a point with an x-coordinate of about 5.2 mm, in a direction parallel to the y-axis. The center of the focal plane is located a coordinates (x, y, z) of (2.6, 2, 1.5).

Herein, let it be assumed by way of example that an image is selected in step S1332, an irradiation position (7.5, 2, 10) corresponding to the image is acquired in step S1333, and an addition pixel (1.7, 2, 0) is selected in step S1352. In this case, in step S1372, the coordinates (2.6, 2, 1.5) are calculated for an addition point given at an intersection between the focal plane and a straight light passing through the addition pixel (1.7, 2, 0) and the irradiation position (7.5, 2.0, 10). Thereafter, in step S1382, the pixel value of the addition pixel is added to the pixel values of the pixels adjacent to the addition point in the in-focus image such that the pixel value of the addition pixel is distributed to the pixel values of the pixels adjacent to the addition point.

In the image generation system according to the present modification, as described above, a pixel value of a first pixel of a captured image is applied to a pixel value of one or more second pixels in an in-focus image corresponding to a position of an intersection at which a straight line, which passes through a position of the first pixel on the light reception surface of the image sensor 102 and a position of an irradiator, intersects with the focal plane. Thus it is possible to reflect the pixel value of each pixel in the captured image in determining the pixel value of the pixels of the in-focus image. Thus it is possible to generate a high-quality in-focus image of an object.

Second Embodiment

Next, a second embodiment is described below. The second embodiment is different from the first embodiment in that an irradiation position is adaptively determined depending on a determined focal plane, and an image of an object is captured using an irradiator located at the determined irradiation position. The second embodiment is described below while placing a focus on differences from the first embodiment.

Configuration of Image Generation System

Figure 22:
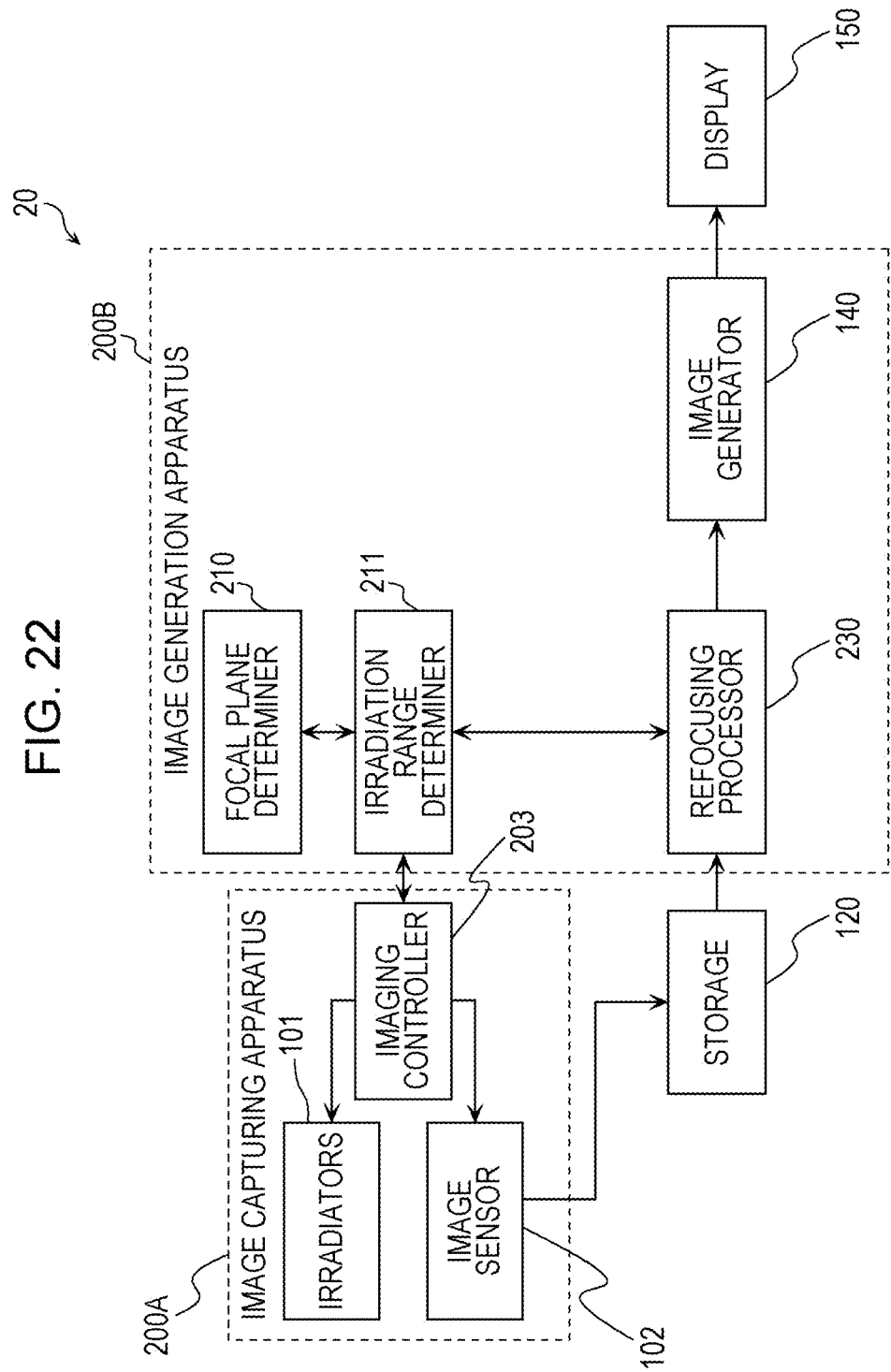
FIG. 22 is a block diagram illustrating an example of a functional configuration of an image generation system according to a second embodiment.

FIG. 22 is a block diagram illustrating a functional configuration of an image generation system 20 according to the second embodiment. In FIG. 22, constituent elements substantially the same as those in FIG. 1 are denoted by similar reference symbols, and a further detailed description thereof is omitted.

The image generation system 20 includes an image capturing apparatus 200A, an image generation apparatus 200B, a storage 120, and a display 150.

Configuration of Image Capturing Apparatus

The image capturing apparatus 200A includes a plurality of irradiators 101, an image sensor 102 that stores light intensity at each pixel, and an imaging controller 203.

The imaging controller 203 controls an operation of the plurality of irradiators 101 and an operation of the image sensor 102 according to irradiation range information acquired from an irradiation range determiner 211 that will be described later. More specifically, the imaging controller 203 controls the plurality of irradiators 101 such that light is emitted sequentially from the irradiators 101 located at different positions. Each time light is emitted from one of the irradiators 101, an image of an object is captured by the image sensor 102.

As with the imaging controller 103 according to the first embodiment, the imaging controller 203 may be realized by a computer system (not illustrated) including, for example, a CPU, a RAM, a ROM, and the like. Functions of all or part of the elements of the imaging controller 203 may be realized by the CPU by executing a program stored in the ROM using the RAM as a work memory area. The functions of all or part of the elements of the imaging controller 203 may be realized using a dedicated hardware circuit.

Configuration of Image Generation Apparatus

The image generation apparatus 200B includes a focal plane determiner 210, an irradiation range determiner 211 a refocusing processor 130, and an image generator 140.

The focal plane determiner 210 may be realized, for example, using a control circuit or a processor. The focal plane determiner 210 determines a virtual focal plane located between the plurality of irradiators 101 and the image sensor 102. More specifically, the focal plane determiner 210 determines the focal plane, for example, based on information on a focal plane determined in advance. Alternatively, for example, the focal plane determiner 210 may determine the focal plane based on information input from the outside.

Figure 23:
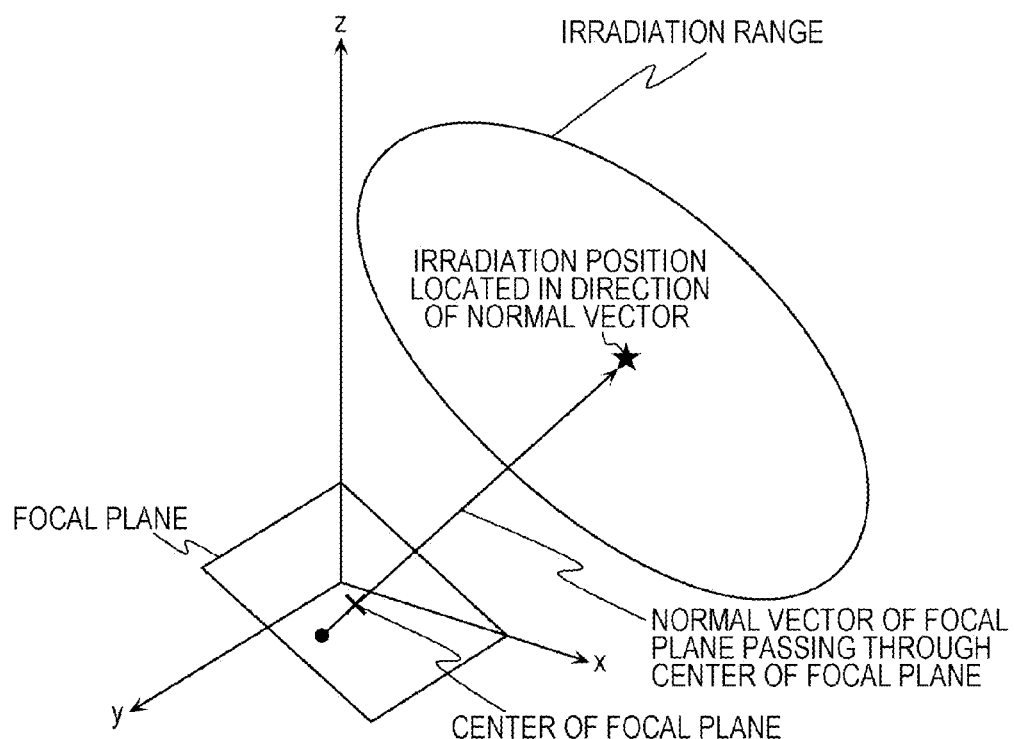
FIG. 23 is a diagram schematically illustrating an example of a range of an irradiation position according to the second embodiment.
Figure 24:
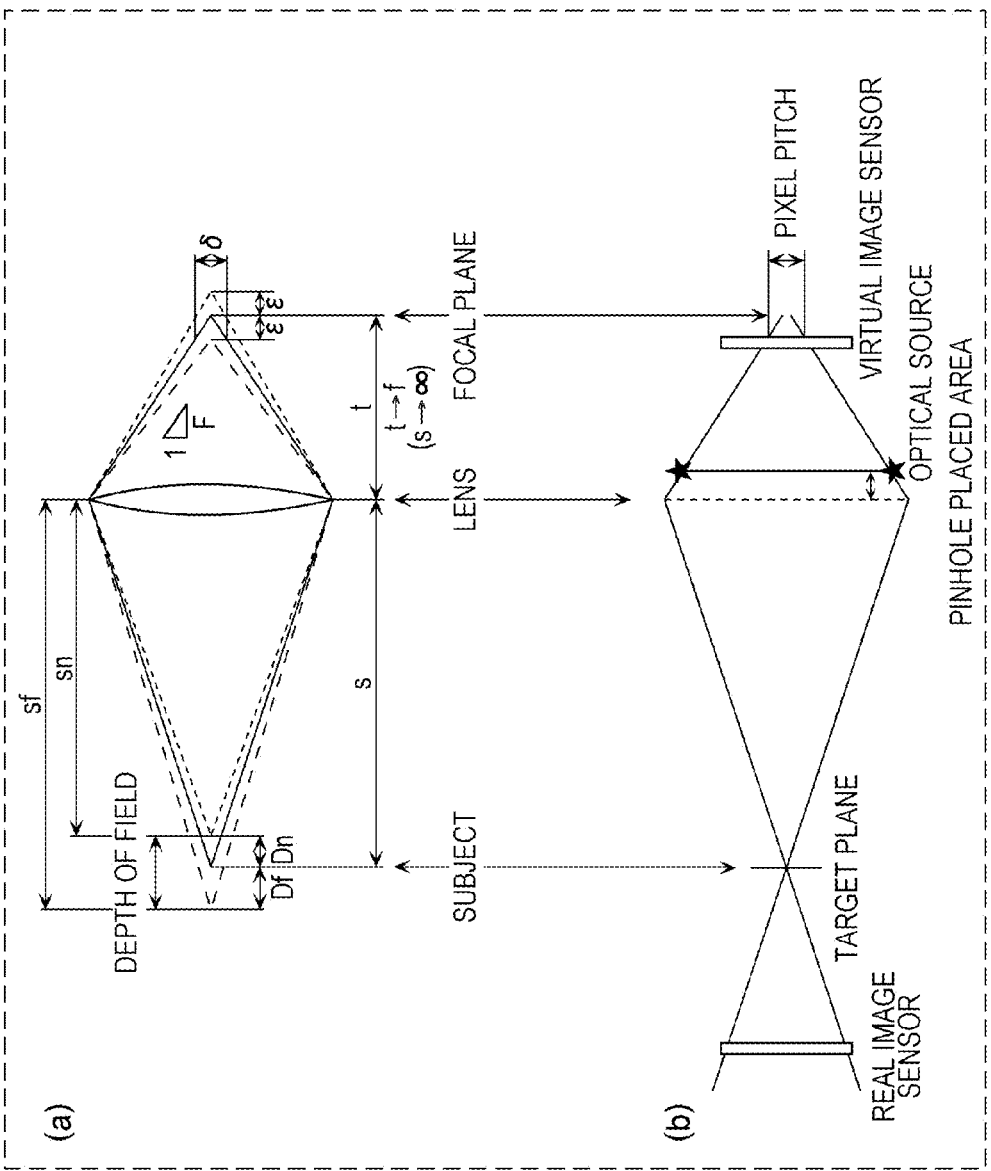
FIG. 24 is a diagram schematically illustrating a relationship between a focal length of a lens and a depth of field and a relationship between a point light source arrangement and a depth of field in a refocusing process.

The irradiation range determiner 211 determines an irradiation position corresponding to the focal plane determined by the focal plane determiner 210. Referring to FIG. 23 and FIG. 24, a specific example of determining an irradiation position is described below.

FIG. 23 is a diagram schematically illustrating a method of determining an irradiation position according to the second embodiment. FIG. 24 is a diagram schematically illustrating a relationship between a focal length of a lens and a depth of field and a relationship between an arrangement of point light sources and a depth of field in the refocusing process. FIG. 24(a) illustrates a relationship between the focal length of the lens and the depth of field, and FIG. 24(b) illustrates a relationship between the arrangement of point light sources and the depth of field in the refocusing process.

In FIG. 24, f denotes a focal length of a lens, s denotes a distance to a subject, t denotes a distance from the lens to an image focusing plane, F denotes an F value, ε denotes a value one-half the depth of focus, δ denotes a diameter of a permissible circle of confusion, sn denotes a near point distance, sf denotes a far point distance, Dn denotes a front depth of field, and Df denotes a back depth of field.

The depth of field in the refocusing is determined by a distribution range of the irradiation position. In FIG. 24(b), the distribution range of irradiation positions represented by a dotted line corresponds to a lens diameter in FIG. 24(a). In the case of a lens shown in FIG. 24(a), light reflected at a surface of a subject passes through the lens and forms an image on a focal plane. The depth of field is the sum of the front depth of field Dn and a back depth of field Df. In the present disclosure, refocusing is performed for an image captured using transmitted light, and thus the position of the focal plane corresponds to a position of the subject in FIG. 24(a). In FIG. 24(b), an image sensor is located at a position shifted to the left from the focal plane. In the present embodiment, there is nothing in a region right to the point light source array in FIG. 24, but it is possible to calculate the depth of field by setting the pixel pitch of the image sensor as the permissible circle of confusion.

For example, in FIG. 23, an irradiation position range necessary in generating an in-focus image in the focal plane corresponds to the size of the lens disposed in parallel to the focal plane as illustrated in FIG. 24. When a lens is used to observe a subject located at the position of the focal point, the irradiation position range necessary when the lens with a diameter of 10 mm is located 5 mm apart from a subject is a circular range as described below. That is, the irradiation position range is represented, as shown in FIG. 23, by a circle having a diameter of 10 mm and having a center located at an intersection at which a normal line of the focal plane passing through the center of the focal plane intersects with a plane parallel to the focal plane wherein the circle is located 5 mm apart from the focal plane so as to be parallel to the focal plane. Positions of irradiators suitable for the focal plane determined by focal plane determiner 210 are such positions that are located in a region obtained by mapping the irradiation position range described above to a plane or a curved surface where point light sources are arranged (for example, the curved surface shown in FIG. 3 or the plane shown in FIG. 4).

Operation of Image Generation System

Next, an operation of the image generation system 20 configured in the above-described manner is described below.

Figure 25:
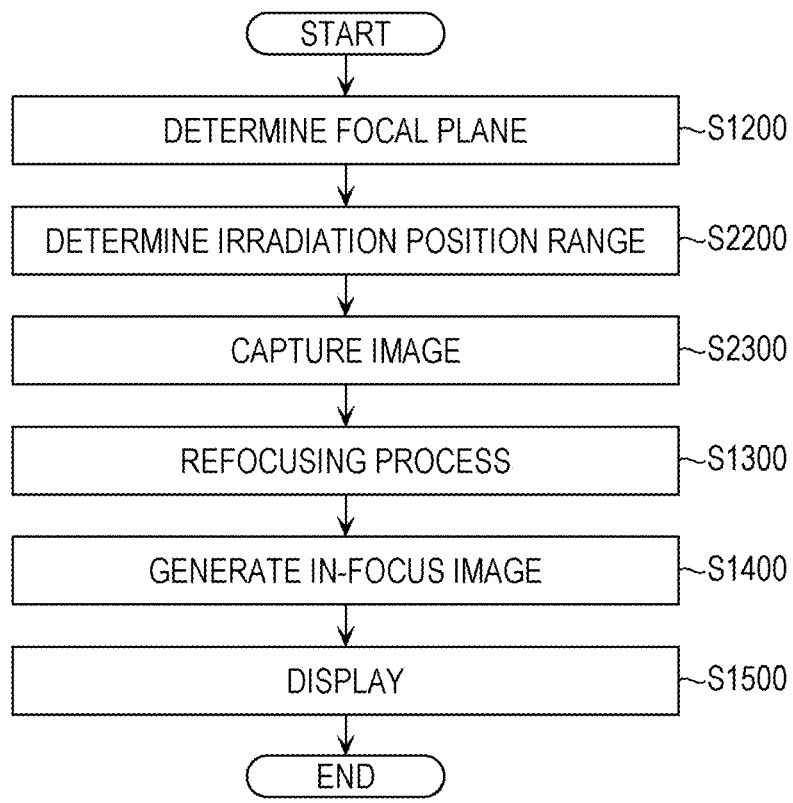
FIG. 25 is a flow chart illustrating an example of an operation of an image generation system according to the second embodiment.

FIG. 25 is a flow chart illustrating an example of an operation of the image generation system 20 according to the second embodiment. In FIG. 25, steps substantially the same as those in FIG. 7 are denoted by similar reference symbols, and a further detailed description thereof is omitted.

As shown in FIG. 25, first, the focal plane determiner 210 determines the focal plane (step S1200).

The irradiation range determiner 211 determines an irradiation position range corresponding to the focal plane determined in step S1200 (step S2200).

The image capturing apparatus 200A irradiates an object by sequentially using irradiators that are included in the plurality of irradiators 101 and that are located within the irradiation position range determined in step S2200. Each time one of irradiators irradiates the object, the image capturing apparatus 200A stores the intensity of light reaching the light reception surface of the image sensor 102 thereby acquiring an image of the object. The acquired image is stored in the storage 120 together with information indicating the position of the irradiator used in irradiating the object to capture the image (step S2300). More specifically, the imaging controller 203 of the image capturing apparatus 200A selects two or more irradiators included in the determined irradiation position range from the plurality of irradiators 101 according to the irradiation position range determined in step S2200. The imaging controller 203 then controls the selected two or more irradiators to sequentially emit light in the order determined in advance, and controls the image sensor 102 to capture an image. The image capturing apparatus 200A performs irradiating the object and capturing the image repeatedly using the irradiators in the determined irradiation position range thereby acquiring the image of the object. The following process is performed in a basically similar manner to the first embodiment described above with reference FIG. 7, and thus a further description thereof is omitted.

Advantageous Effects

In the image generation system according to the present embodiment, as described above, the irradiation position range is determined based on the focal plane information, and the object is irradiated with light sequentially using irradiators in the determined irradiation position range. Thus, it is possible to capture the image of the object by using irradiators suitable for the in-focus image in the focal plane, which makes it possible to reduce the total image capturing time.

Modification to the Second Embodiment

A modification to the second embodiment is described below. This modification is different from the second embodiment in that a region of interest is determined using a pilot image acquired in advance, and the irradiation position range is determined based on the region of interest. The modification to the second embodiment is described below while placing a focus on differences from the second embodiment.

Configuration of Image Generation System

Figure 26:
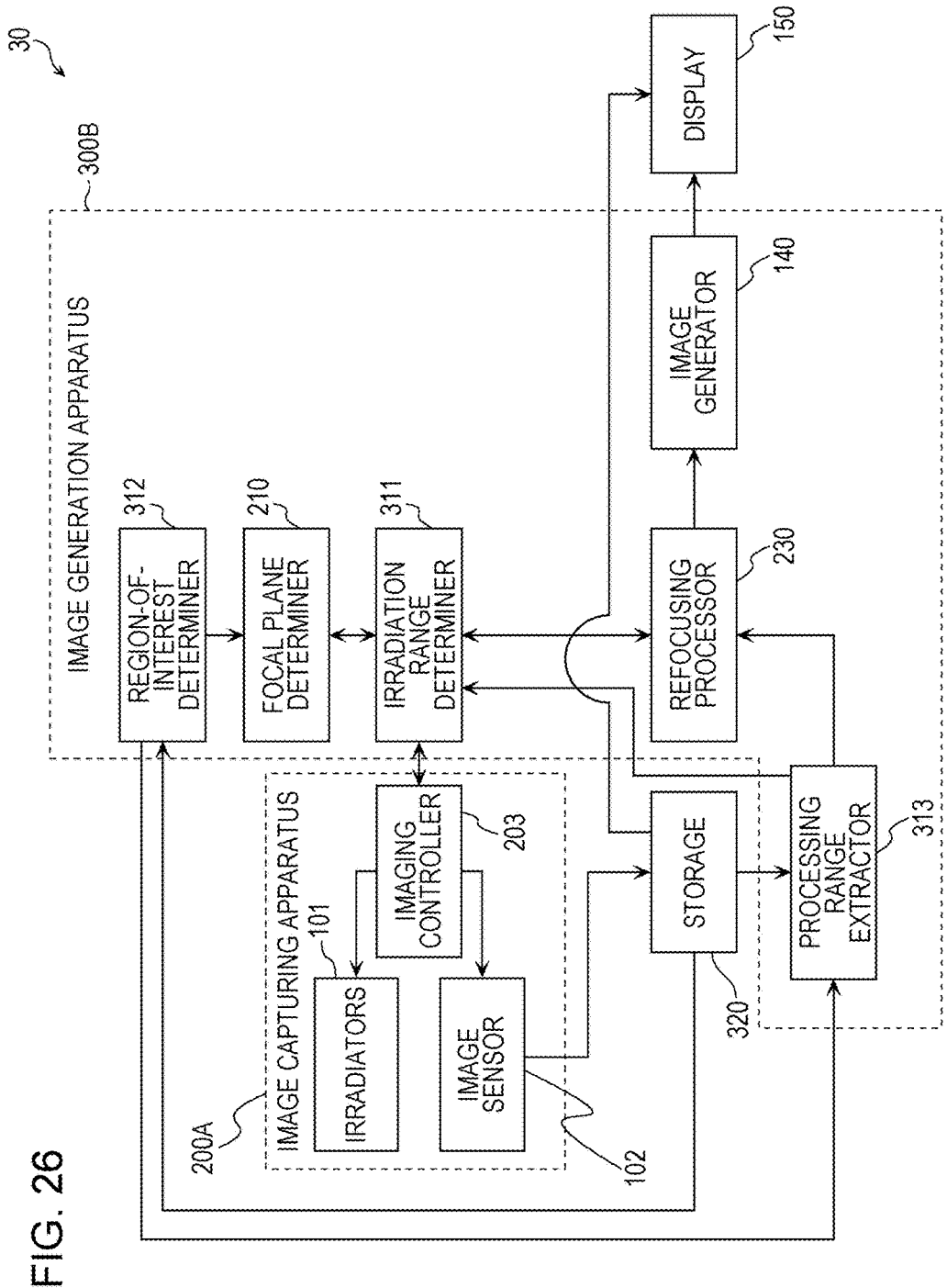
FIG. 26 is a block diagram illustrating an example of a functional configuration of the image generation system according to a modification to the second embodiment.

FIG. 26 is a block diagram illustrating a functional configuration of an image generation system 30 according to the modification to the second embodiment. In FIG. 26, constituent elements substantially the same as those in FIG. 22 are denoted by similar reference symbols, and a further detailed description thereof is omitted.

The image generation system 30 includes an image capturing apparatus 200A, an image generation apparatus 300B, a storage 320, and a display 150.

The image capturing apparatus 200A includes a plurality of irradiators 101, an image sensor 102, and an imaging controller 203. In the present modification, before the image capturing apparatus 200A performs an operation of capturing an image of an object by sequentially using irradiators in a determined irradiation position range, the image capturing apparatus 200A acquires a pilot image by capturing an image of the object by using irradiators determined in advance. The pilot image is stored in the storage 320 and displayed on the display 150.

The image generation apparatus 300B includes a focal plane determiner 210, an irradiation range determiner 311, a region-of-interest determiner 312, a processing-range extractor 313, a refocusing processor 230, and an image generator 140.

The region-of-interest determiner 312 determines a region of interest in the pilot image based on a region specified by an externally given input or a region specified according to a method determined in advance.

The irradiation range determiner 311 determines the irradiation position range based on the focal plane determined by the focal plane determiner 210 and the region of interest determined by the region-of-interest determiner 312.

The storage 320 stores the image captured by the image sensor 102 together with position information indicating a position of an irradiator used in capturing this image. Furthermore, the storage 120 stores, as the pilot image, an image captured when the object is irradiated by a predetermined irradiator. This pilot image is output to the region-of-interest determiner 212.

The processing-range extractor 313 extracts a region corresponding to the region of interest determined by the region-of-interest determiner 312 from each of a plurality of images stored in the storage 320. The processing-range extractor 313 outputs the extracted images together with the irradiation position information to the refocusing processor 230.

Operation of Image Generation System

Next, an operation of the image generation system 30 configured in the above-described manner is described below.

Figure 27:
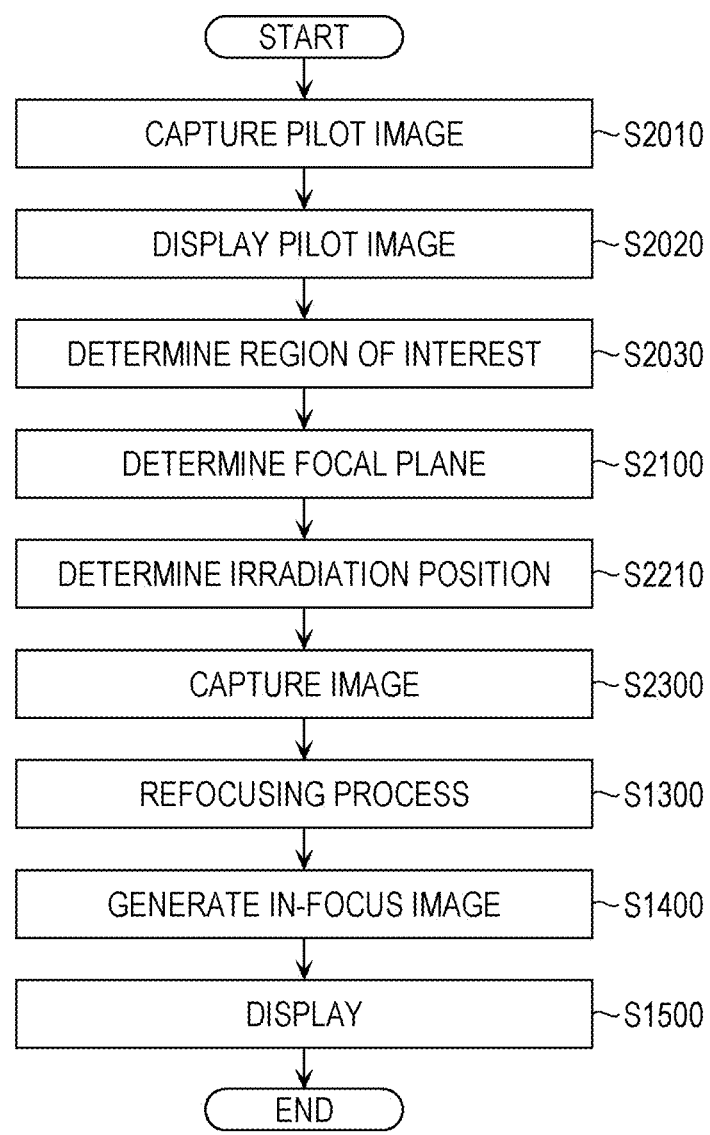
FIG. 27 is a flow chart illustrating an example of an operation of an image generation system according to a modification to the second embodiment.

FIG. 27 is a flow chart illustrating an example of an operation of the image generation system 30. As shown in FIG. 27, first, the imaging controller 203 of the image pickup unit 200 illuminates an object by using a predetermined irradiator (for example, an irradiator located at coordinates (0, 0)) and detects the intensity of light reaching the light reception surface of the image sensor 102 thereby acquiring the pilot image. The pilot image is stored in the storage 320 (step S2010). The storage 320 outputs the pilot image captured in step S2010 to the display 150, and the display 150 displays the received pilot image (step S2020).

A user specifies a region of the pilot image displayed on the step S2020 to indicate the region in which an in-focus image is to be generated. The region-of-interest determiner 212 determines a region of interest based on the region specified by the user (step S2030).

In the present modification, the pilot image is displayed, and a user specifies a region of the pilot image. However, the region-of-interest determiner 312 may determine the region of interest in an alternative manner. For example, the region-of-interest determiner 312 may perform a process of recognizing an object in the pilot image and may determine the region of interest based on a recognition result. The object recognition process may be performed, for example, based on a predetermined feature in terms of a color, a contour, or the like. In a case where a plurality of regions are extracted as a result of the object recognition process, the region-of-interest determiner 312 may select, as the region of interest, at least one region from the extracted regions, for example, based on positions of the regions in the image or may select all extracted regions.

The focal plane determiner 210 determines the focal plane (step S2100). The irradiation range determiner 311 determine the irradiation position range based on the region of interest determined in step S2030 and the focal plane determined in step S2100 (step S2210). More specifically, the irradiation range determiner 211 determines the irradiation position range by using the center of the region of interest instead of the center of the focal plane in FIG. 23. The following steps are substantially the same as those shown in FIG. 18, and thus a further description thereof is omitted.

Advantageous Effects

In the image generation system 30 according to the present modification, as described above, the irradiation position range is determined based on the region of interest in addition to the focal plane, which makes it possible to further reduce the total image capturing time.

Third Embodiment

Next, a third embodiment is described below. The third embodiment is different from the first embodiment in that the focal plane is determined based on a state of an object. For example, in the third embodiment, in a case where the state of the object changes with culture time as in a case where the state of a fertilized egg or an early embryo changes with culture time, the number of focal planes and the angles thereof are determined based on the state of the object depending on the culture time. The third embodiment is described below while placing a focus on differences from the first embodiment.

Configuration of Image Generation System

Figure 28:
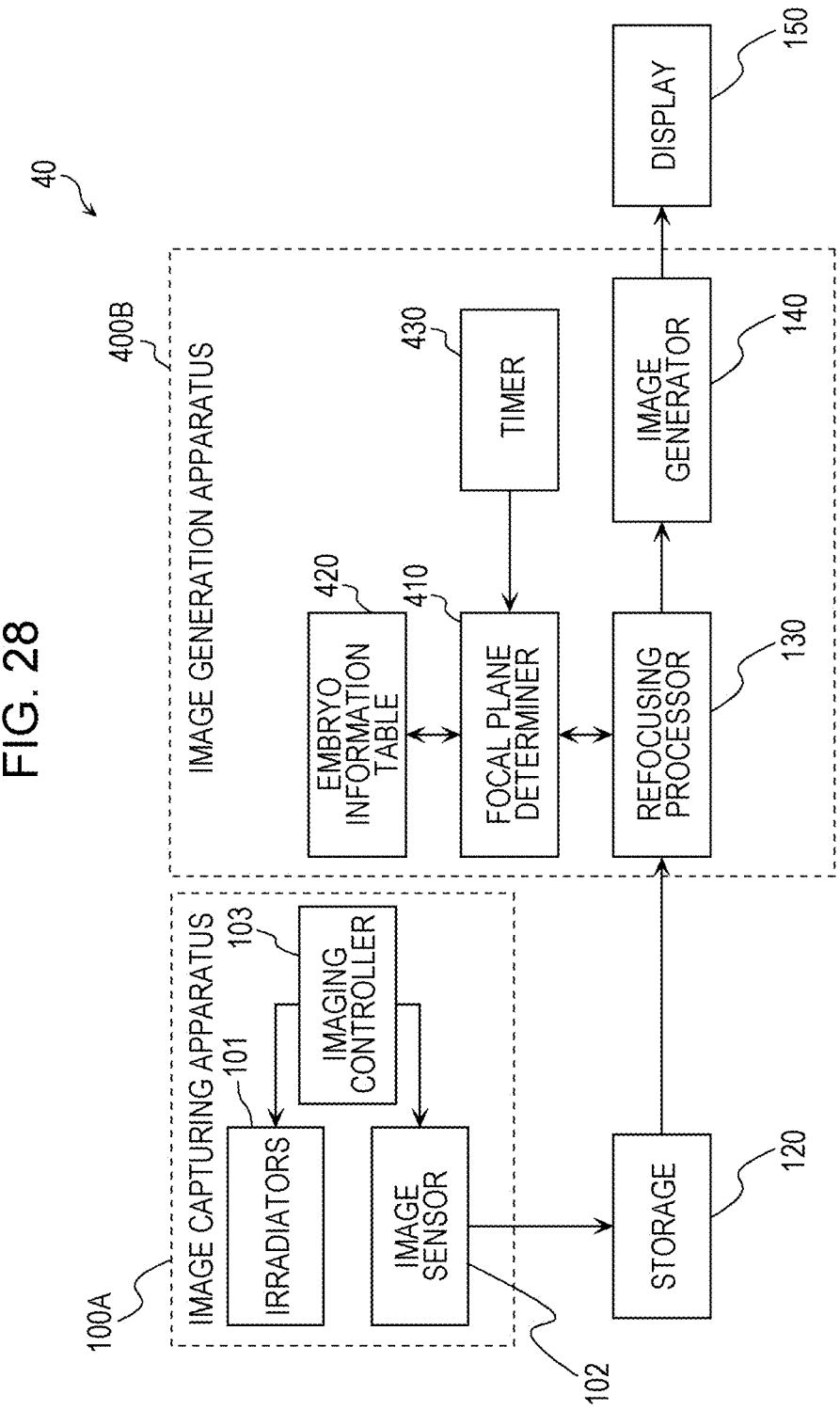
FIG. 28 is a block diagram illustrating an example of a functional configuration of an image generation system according to a third embodiment.

FIG. 28 is a block diagram illustrating a functional configuration of an image generation system 40 according to the third embodiment. In FIG. 28, constituent elements substantially the same as those in FIG. 1 are denoted by similar reference symbols, and a further detailed description thereof is omitted.

The image generation system 40 includes an image capturing apparatus 100A, an image generation apparatus 400B, a storage 120, and a display 150. The image generation apparatus 400B includes a focal plane determiner 410, an embryo information table 420, a timer 430, a refocusing processor 130, and an image generator 140.

The embryo information table 420 stores information associated with the culture time and the state of the embryo corresponding to the culture time and information associated with the focal plane. FIG. 29 illustrates an example of the embryo information table 420. In the example shown in FIG. 29, in the embryo information table 420, the state of the embryo and the number of focal planes for each culture time.

The timer 430 measures an elapsed time (culture time) since the start of the culture of the object.

The focal plane determiner 410 acquires, from the embryo information table 420, the number of focal planes corresponding to the culture time measured by the timer 430. The focal plane determiner 410 then determines as many focal planes between the image sensor 102 and a plurality of irradiators 101 as the acquired number of focal planes. More specifically, the focal plane determiner 410 determines as many focal planes with predetermined inclination angles or inclination angles specified via an input unit as the number of focal planes acquired from the embryo information table 420. In a case where the object is an early embryo, for example, a plurality of focal planes parallel to each other are determined. The size of the early embryo is typically about 100 µm, and thus the distance between each adjacent focal planes is determined such that the height of 100 µm is equally divided by as many focal planes as the number of focal planes acquired from the embryo information table 420. For example, in a case where there are two focal planes, the distance between the two focal plane is determined to be equal to 33 µm.

Operation of Image Generation System

Next, an operation of the image generation system 40 configured in the above-described manner is described below.

The operation of the image generation system 40 is similar to that according to the first embodiment described above with reference to FIG. 7 except for the operation of determining focal planes in step S1200, and thus, in the following description, the operation in step S1200 is described in detail but a further description of the other operations is omitted.

Figure 30:
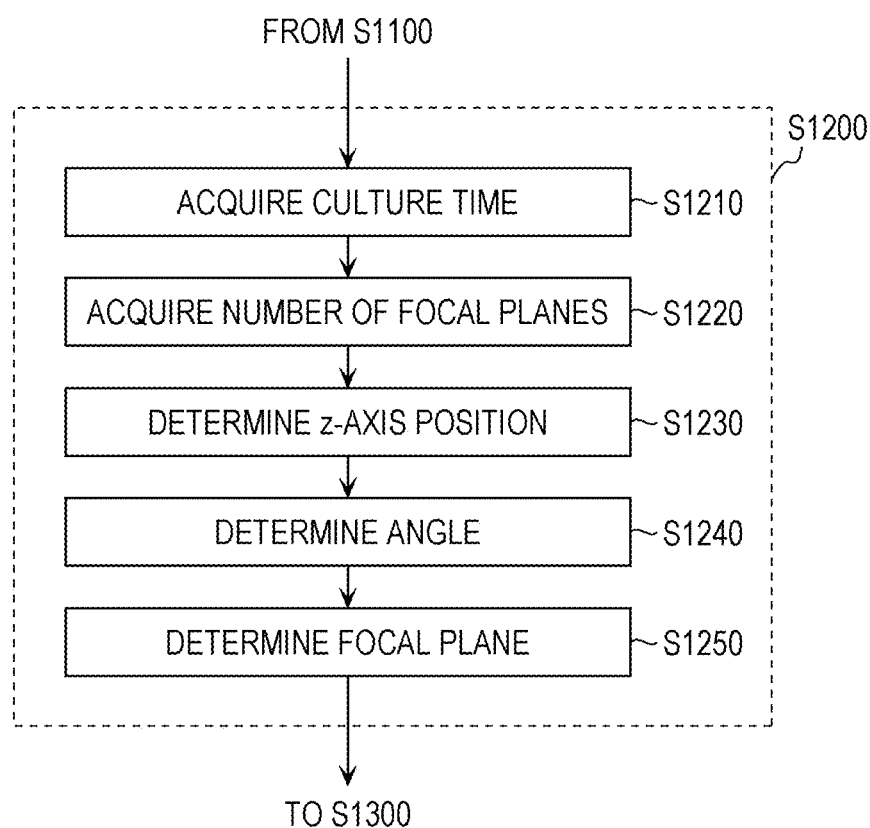
FIG. 30 is a flow chart illustrating an example of an operation of a focal plane determiner according to the third embodiment.

FIG. 30 is a flow chart illustrating an example of an operation of the focal plane determiner 410 according to the third embodiment.

First, the focal plane determiner 410 acquires a culture time from the timer 430 (step S1210). Subsequently, the focal plane determiner 410 refers to the embryo information table 420 and acquires the number of focal planes corresponding to the culture time acquired in step S1210 (step S1220). The focal plane determiner 410 determines the height of the center of each focal plane (that is, the z-coordinate value in the xyz-space defined as shown in FIG. 8) based on the number of focal planes acquired in step S1220 (step S1230). In the present embodiment, when an in-focus image is generated for each of a plurality of focal planes, all focal planes may be arranged in parallel to allow a user to easily understand the focal planes. Note that the angles and the positions of the plurality of focal planes are not limited to the examples described above.

Furthermore, the focal plane determiner 410 determines the angle of the focal plane with respect to the x-axis and the angle with respect to the y-axis based on the information on the inclinations of the focal planes specified via an input unit (not shown) or determined in advance (step S1240). Each focal plane is determined by virtually positioning it such that the focal plane is inclined at the angle determined in step S1240 with respect to a rotation center given by the center position of the focal plane determined in step S1230 (step S1250).

Advantageous Effects

In the image generation system 40 according to the present embodiment, as described above, the number of focal planes can be determined depending on the state of the object, and thus it is possible to generate an in-focus image in a manner suitable for observing the object.

Modification to Third Embodiment

A modification to the third embodiment is described below. This modification is different from the third embodiment in that first, an in-focus image is generated in a focal plane parallel to the light reception surface of the image sensor, and then other focal planes are automatically determined depending on a three-dimensional arrangement of an object (for example, a cell) in the generated in-focus image. The modification to the third embodiment is described below while placing a focus on differences from the third embodiment.

Figure 31:
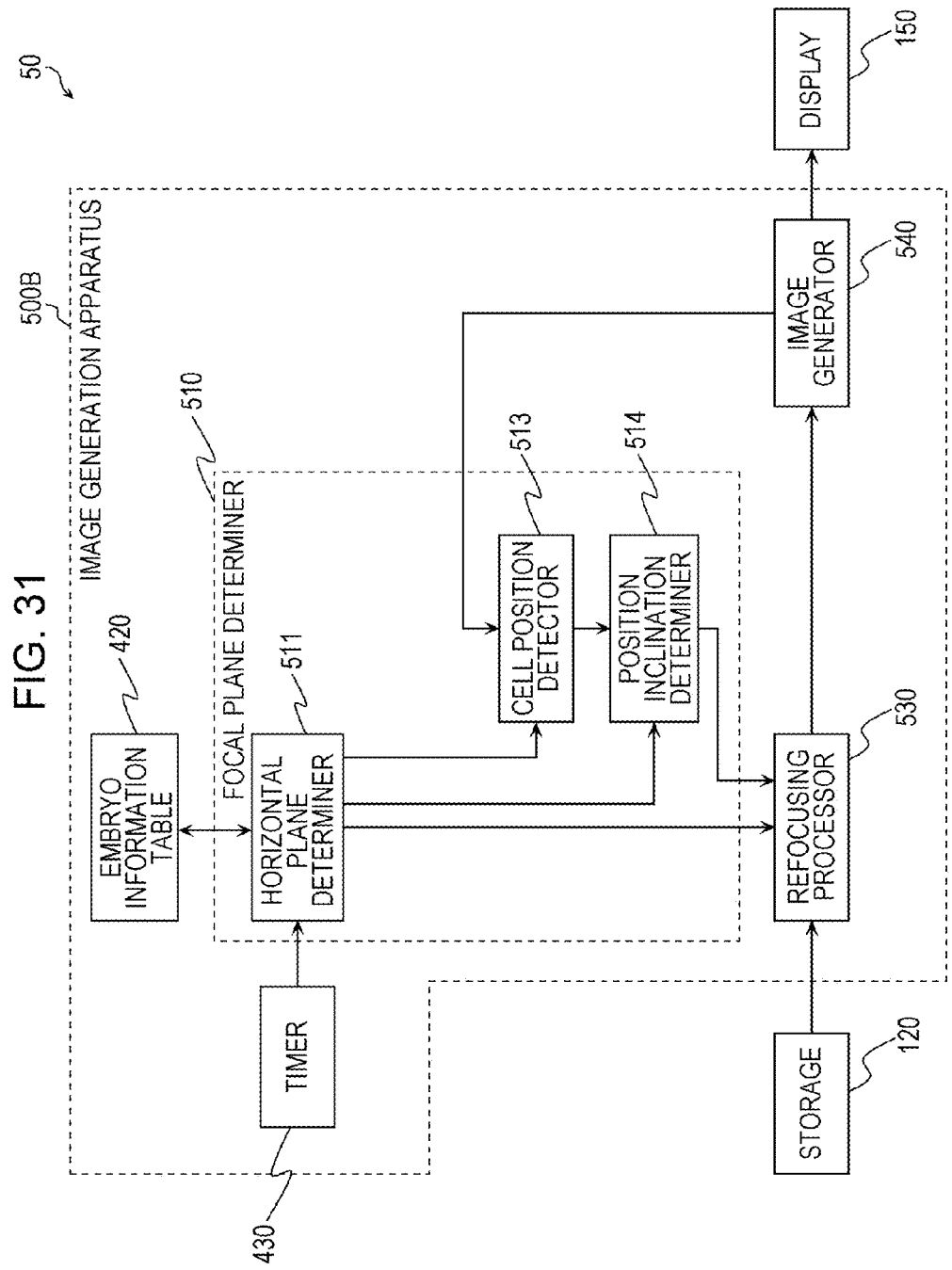
FIG. 31 is a block diagram illustrating an example of a functional configuration of an image generation system according to a modification to the third embodiment.

FIG. 31 is a block diagram illustrating a functional configuration of an image generation system 50 according to the modification to the third embodiment. Although an image capturing apparatus 100A is not shown in FIG. 31, the image capturing apparatus 100A which is the same as that shown in FIG. 28 is actually included in the image generation system 50. In FIG. 31, constituent elements substantially the same as those in FIG. 28 are denoted by similar reference symbols, and a further detailed description thereof is omitted.

An image generation apparatus 500B includes a focal plane determiner 510, an embryo information table 420, a timer 430, a refocusing processor 530, and an image generator 540. The focal plane determiner 510 includes a horizontal plane determiner 511, a cell position detector 513, and a position inclination determiner 514.

The horizontal plane determiner 511 refers to the embryo information table 420 and determines the number of focal planes corresponding to the culture time acquired from the timer 430. The horizontal plane determiner 511 determines, based on the determined number of focal plane, the number of horizontal planes parallel to the light reception surface of the image sensor 102 and the position on the z-axis of these horizontal planes for use in determining the position and the inclination of each focal plane.

The cell position detector 513 compares the in-focus image in the horizontal plane parallel to the light reception surface generated by the image generator 540 with a cross-section image generated from a three-dimensional model, and, from a result of the comparison, determines the arrangement of cells in the 3-dimensional coordinates.

A configuration of the cell position detector 513 is described in detail below with reference to FIG. 32.

Figure 32:
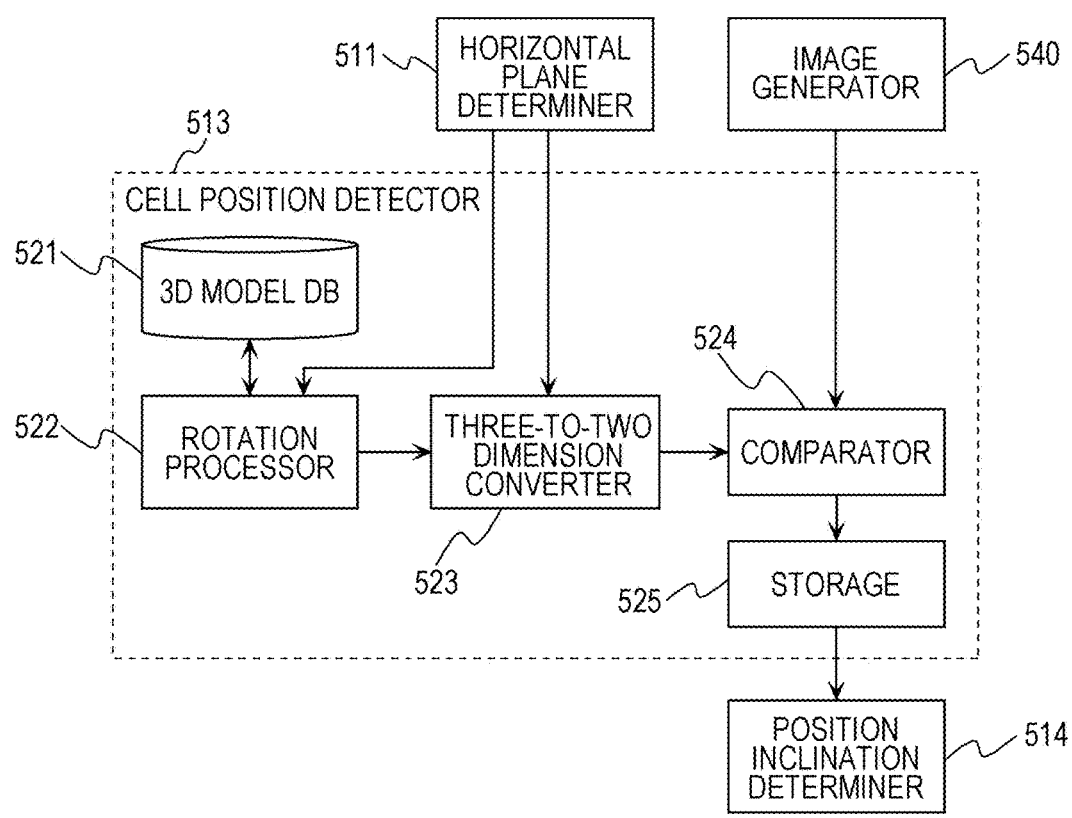
FIG. 32 is a block diagram illustrating an example of a detailed functional configuration of a cell position detector according to a modification to the third embodiment.

FIG. 32 is a block diagram illustrating a detailed functional configuration of a cell position detector 513. The cell position detector 513 includes a three-dimensional model database (DB) 521, a rotation processor 522, a three-to-two dimension converter 523, a comparator 524, and a storage 525.

The three-dimensional model database 521 stores a state of an object (a three-dimensional model of an early embryo in each cell stage, in the present example). The three-dimensional model of the early embryo represents a state in which as many cells with a substantially spherical shape are contained in a spherical embryonic membrane as the number varying depending on the cell stage.

The rotation processor 522 rotates the three-dimensional model stored in the three-dimensional model database 521 by a predetermined angle.

By using the three-dimensional model rotated by the rotation processor 522, the three-to-two dimension converter 523 generates a cross-section image taken in the horizontal plane determined by the horizontal plane determiner 511.

The comparator 524 compares the in-focus image in the horizontal plane generated by the image generator 540 with the cross-section image generated from the three-dimensional model by the three-to-two dimension converter 523. The comparison is performed repeatedly while changing the rotation angle by the rotation processor 522 to determine a rotation angle that results in a value smaller than a predetermined threshold value in terms of a difference between the in-focus image and the cross-section image.

The storage 525 stores the rotation angle made by the rotation processor 522 resulting in the value smaller than the threshold value in terms of the difference between the two images compared by the comparator 524.

Based on the cell arrangement as represented in the 3-dimensional coordinates determined by the cell position detector 513 and the number of focal planes determined by the horizontal plane determiner 511, the position inclination determiner 514 determines the position, on the z-axis, of the center point of each focal plane and the inclination value of each focal plane with respect to the x-axis and the y-axis.

Using the plurality of images captured by the image capturing apparatus 100A, the refocusing processor 530 performs a refocusing process for the plane determined by the horizontal plane determiner 511 or for the focal plane determined by the position inclination determiner 514.

The image generator 540 generates an in-focus image using pixel values of the respective pixels generated by the refocusing processor 530.

Operation of Image Generation System

Next, an operation of the image generation system 50 configured in the above-described manner is described below.

The operation of the image generation system 50 is similar to that according to the first embodiment described above with reference to FIG. 7 except for the process in step S1200, and thus, in the following description, the process in step S1200 is described in detail but a further description of the other operations is omitted.

Figure 33:
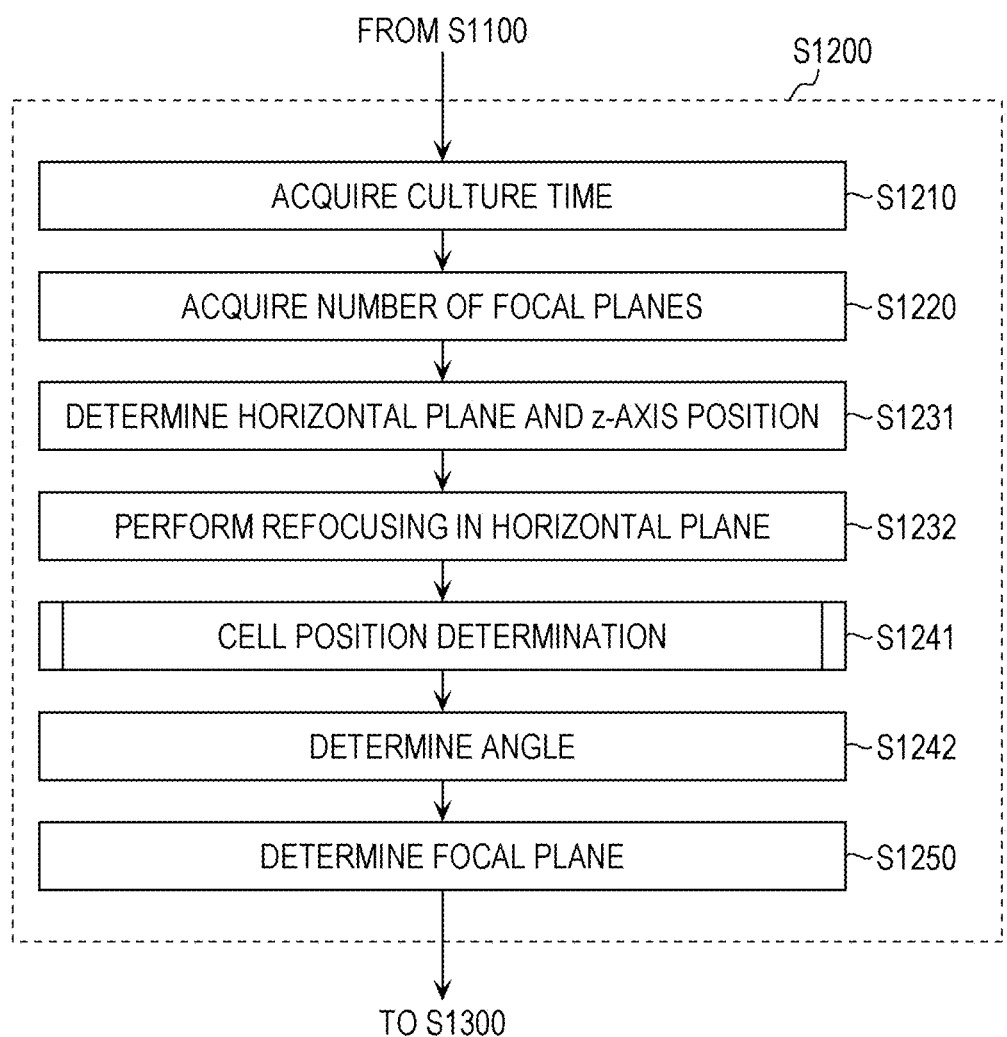
FIG. 33 is a flow chart illustrating an example of an operation of a focal plane determiner according to a modification to the third embodiment.

FIG. 33 is a flow chart illustrating an example of an operation of the focal plane determiner 510 according to the modification to the third embodiment.

First, the horizontal plane determiner 511 of the focal plane determiner 510 acquires a culture time from the timer 430 (step S1210). Thereafter, the horizontal plane determiner 511 refers to the embryo information table 420 and acquires the number of focal planes corresponding to the culture time acquired in step S1210 (step S1220). The horizontal plane determiner 511 determines as many z-axis positions of the respective horizontal planes as the number of focal planes acquired in step S1220 (step S1231). In the present modification, a plurality of cross-section images generated from the three-dimensional model are compared with in-focus images in a plurality of horizontal planes, and the angle of the focal plane, in which the in-focus image is to be generated and output by the image generation system 50, is determined based on the comparison result. In the embryo information table shown in FIG. 29, the number of focal planes is described such that the number is 1 for the pronuclear stage embryo/pronucleus stage embryo and the two cell stage embryo. Thus, in step S1231, the z-axis position of the horizontal plane is determined for each of as many horizontal planes as the number of focal planes acquired from the embryo information table 420.

Note that the number of horizontal planes does not necessarily need to be equal to the number of focal planes. In this case, the embryo information table 420 may describe, in addition to the number of focal planes, the number of horizontal planes for use in determining the cell arrangement. Furthermore, as with the modification to the second embodiment, a pilot image may be acquired, and the number of horizontal planes may be determined based on the state of the pilot image.

The z-axis position of each horizontal plane may be determined as follows. When the size of the early embryo is, for example, about 100 μm in diameter, the z-axis positions of the respective horizontal planes may be determined such that the height of 100 µm is equally divided by as many horizontal planes as the number acquired from the embryo information table 420. The embryo is immersed in a culture solution such that the embryo is in contact with the light reception surface of the image sensor 102. Therefore, in a case where the number of horizontal planes is two, the z-axis positions of the two respective horizontal planes are determined as 33 µm and 66 µm.

The refocusing processor 530 performs the refocusing process for the horizontal planes at the z-axis positions determined in step S1231. The image generator 540 generates in-focus images using pixel values of the respective pixels calculated by the refocusing processor 530 (step S1232).

The cell position detector 513 compares the in-focus images generated in step S1232 with the cross-section image generated from the three-dimensional model of the early embryo. Based on a comparison result, the cell position detector 513 determines the cell arrangement and the rotation angle of the early embryo from the cell arrangement suitable for observing the early embryo (hereinafter, this cell arrangement will also referred to as a reference position) (step S1241). Details of step S1241 will be described later.

The position inclination determiner 514 determines the angle of the focal plane based on the cell arrangement and the rotation angle determined in step S1241 such that the focal plane coincides with the horizontal plane at the reference position (step S1242). For example, when the horizontal plane, at the coordinate where the image is captured, is rotated by an angle equal, but in an opposite direction, to the rotation angle determined in step S1241, and the resultant angle of this horizontal plane is employed as the angle of the focal plane.

Thereafter, the position inclination determiner 514 determines as many positions, on the z-axis, of focal planes as the number acquired in step S1220 by the horizontal plane determiner 511. The z-axis positions are determined, for example, such that the total size of the object in the x-axis direction is equally divided.

The position inclination determiner 514 determines all focal planes using the angles and the z-axis positions determined in step S1242 (step S1250).

In the present modification, it is assumed that all focal planes are parallel to each other. However, focal planes may be disposed at different angles. For example, a plurality of focal planes may be disposed such that they are point symmetric about a certain coordinate point. From a result of an image captured in the direction perpendicular to the image sensor, the center point of the embryo on the light reception surface of the image sensor may be determined. When the diameter of the embryo is equal to about 100 µm, the position may be determined which is 50 µm high in the x-axis direction from the center point of the embryo on the light reception surface of the image sensor, and this position may be employed as the rotation center and the focal plane may be arranged using this rotation center.

Figure 34:
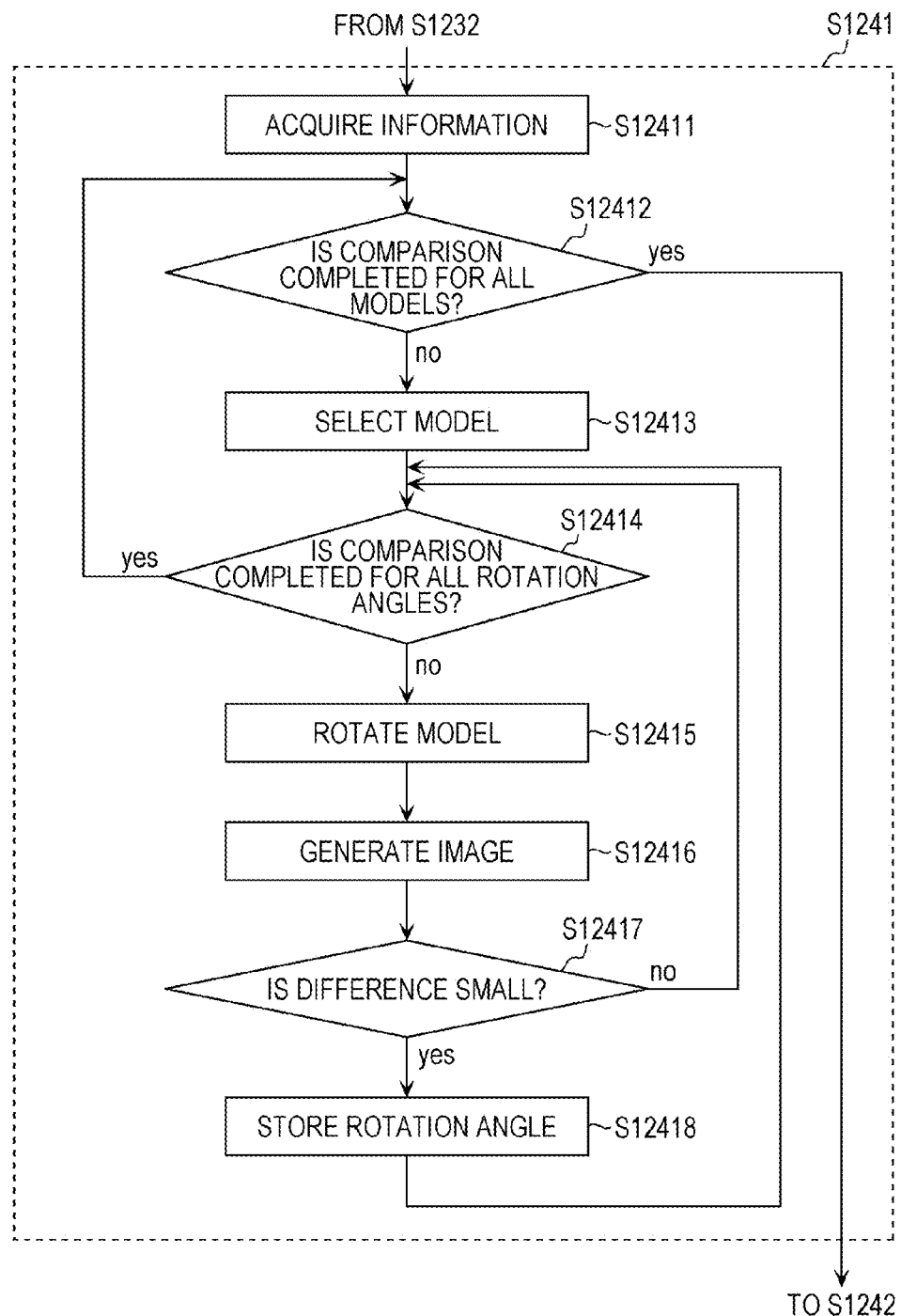
FIG. 34 is a flow chart illustrating a process of determining a cell arrangement by a focal plane determiner according to a modification to the third embodiment.

The process in step S1241 shown in FIG. 33 will be described in further detail below with reference to FIG. 34. FIG. 34 is a flow chart illustrating a process of determining the cell arrangement by the focal plane determiner 510 according to the modification to the third embodiment.

The rotation processor 522 of the cell position detector 513 acquires, from the horizontal plane determiner 511, information about the state of the early embryo, the number of horizontal planes, and the z-axis positions of the horizontal planes (step S12411). The rotation processor 522 determines whether the comparison process is completed for all three-dimensional models, of those stored in the three-dimensional model database 521, corresponding to the information about the state of the embryo acquired in step S12411 (step S12412). The comparison process refers to the process from step S12413 to step S12418.

In a case where the comparison process is completed for all three-dimensional models corresponding to the information on the state of the embryo (yes in step S12412), the processing flow proceeds to step S1242. On the other hand, in a case where the comparison process is not completed for any of the three-dimensional models corresponding to the information on the state of the embryo (no in step S12412), the processing flow proceeds to step S12413.

One three-dimensional model corresponding to the information on the state of the embryo acquired in step S12411 is selected from the three-dimensional models (step S12413). Note that the one three-dimensional model selected herein is a three-dimensional model that has not yet been subjected to the comparison process.

Figure 35C:
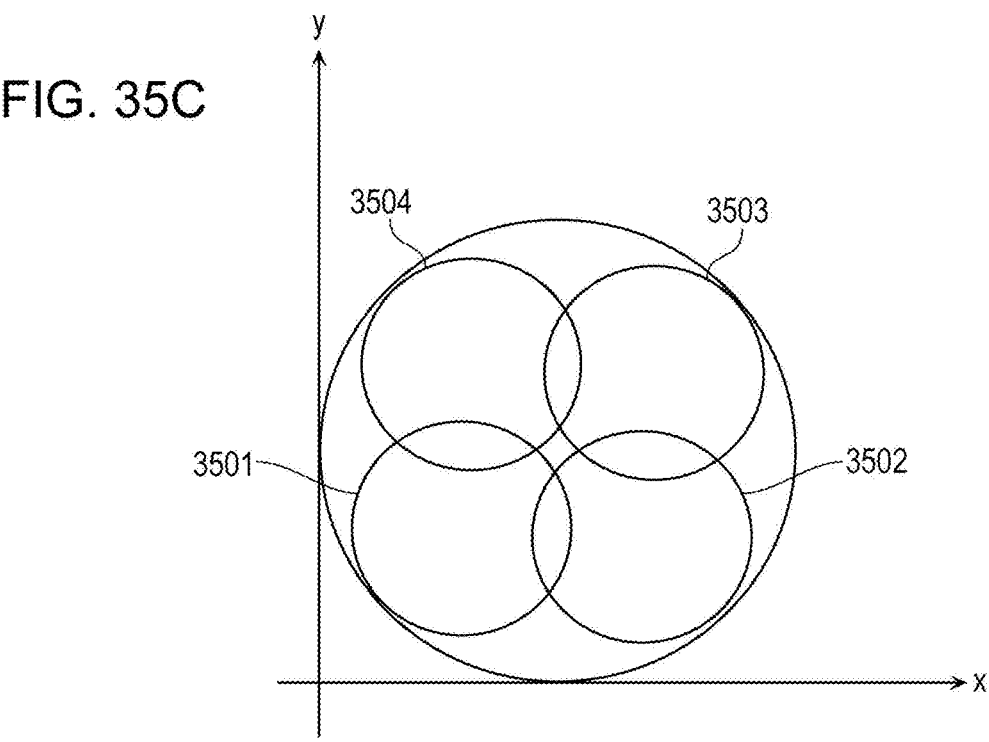
FIG. 35C is a plan view of a three-dimensional model of an embryo in a four cell stage.
Figure 35D:
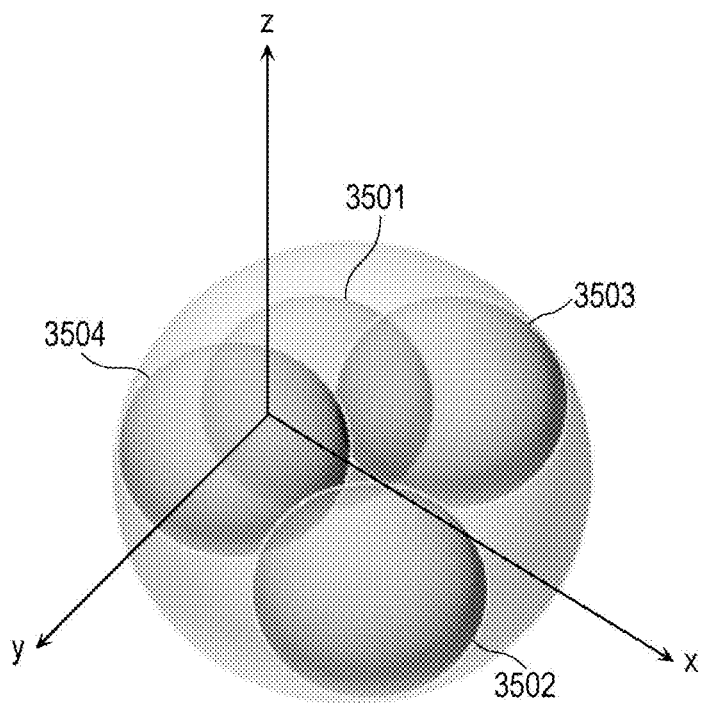
FIG. 35D is a perspective view of a three-dimensional model of an embryo in a four cell stage.

The three-dimensional model represents a cell arrangement in an embryo in a three-dimensional form for each state of the embryo. The three-dimensional model is stored in a rotatable manner. A reference position, at which no rotation is performed, is set such that when a cross section of the cell is taken in a plane parallel to the xy-plane, i.e., the light reception surface, such a cross section is most suitable for observing the cell. FIG. 35A to FIG. 35D illustrate an example of a three-dimensional model of an embryo in a four cell stage. In the example of the three-dimensional model shown in FIG. 35A to FIG. 35D, two cells (a first cell 3501 and a second cell 3502) are located adjacent to each other at a lower position in the z-axis direction, and two cells (a third cell 3503 and a fourth cell 3504) are located adjacent to each other at a higher position in the z-axis direction. A straight line passing through the center point of the first cell 3501 and the center point of the second cell 3502 is perpendicular to a straight line passing through the center point of the third cell 3503 and the center point of the fourth cell 3504 when these two straight lines are projected onto the xy-plane. FIG. 35D shows an overhead view of the three-dimensional model.

Figure 36A:
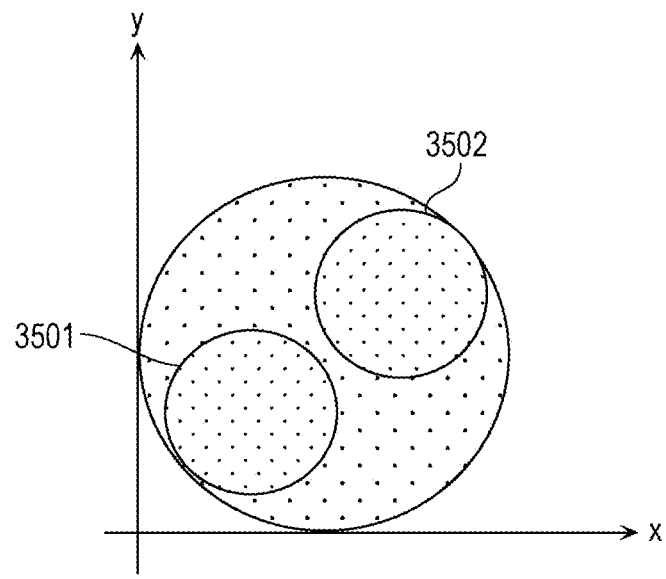
FIG. 36A is a cross-sectional view of a three-dimensional model of an embryo in a four cell stage.
Figure 36B:
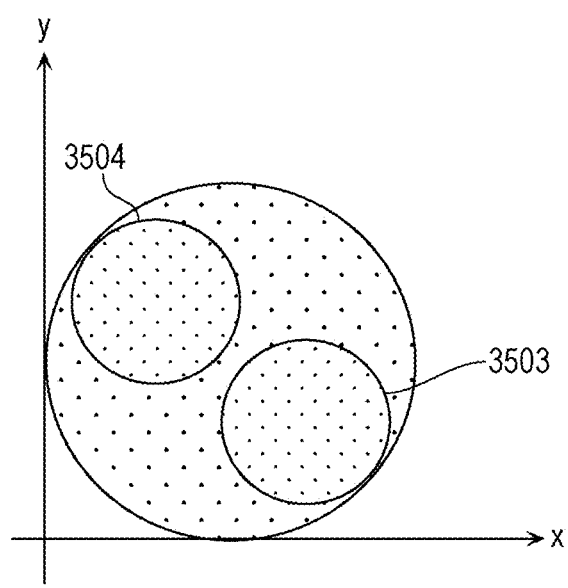
FIG. 36B is a cross-sectional view of a three-dimensional model of an embryo in a four cell stage.

FIG. 36A and FIG. 36B are cross-sectional views of the three-dimensional model respectively taken along lines XXXVIA-XXXVIA and XXXIB-XXXVIB. There are two pairs of cells. One pair lies in a plane parallel to the xy-plane and the other pair lies in another plane which is also parallel to the xy-plane. That is, these two pairs of cells are located in two layers which are arranged in the z-axis direction. In this specific example, a straight line passing through the center point of the first cell 3501 and the center point of the second cell 3502 extends in a direction not parallel to a direction of a straight line passing through the center point of the third cell 3503 and the center point of the fourth cell 3504. The three-dimensional model illustrated in FIG. 35A to FIG. 36B is at the reference position. That is, in the reference position defined herein, the first cell 3501 and the second cell 3502 lie adjacent to each other in one plane parallel to the xy-plane, and the third cell 3503 and the fourth cell 3504 lie adjacent to each other in another plane parallel to the xy-plane.

Next, the rotation processor 522 determines whether the comparison of the cross-section image of the three-dimensional model selected in step S12413 with the in-focus image in the horizontal plane generated in step S1232 has been performed for all predetermined rotation angles (step S12414). In a case where the comparison is completed for all rotation angles, (yes in step S12414), the processing flow returns to step S12412. On the other hand, in a case where the comparison is not completed for all predetermined rotation angles, (no in step S12414), the processing flow proceeds to step S12415.

The rotation processor 522 rotates the three-dimensional model selected in step S12413 by a rotation angle that is included in the predetermined rotation angle but that has not yet been employed in the comparison process (step S12415).

Figure 37:
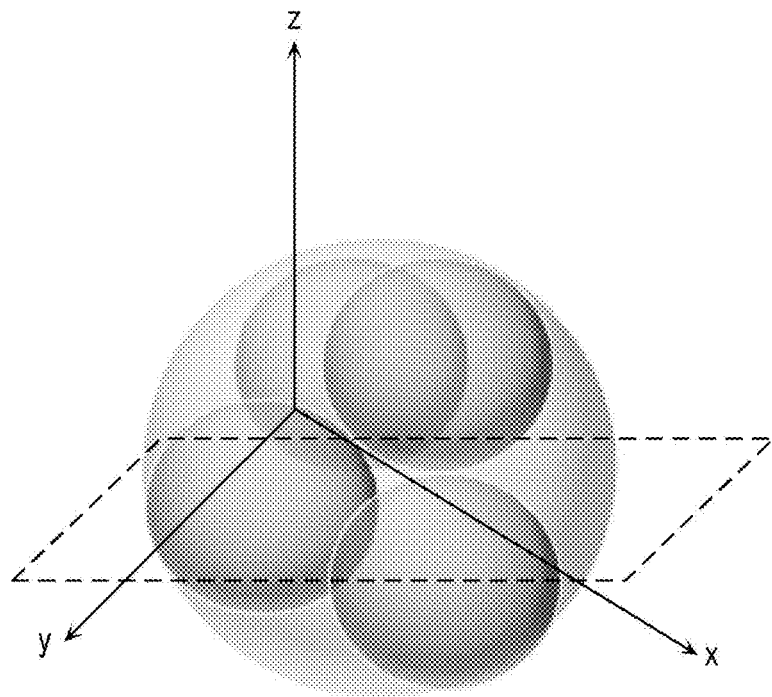
FIG. 37 is a perspective view of a three-dimensional model of an embryo in a four cell stage.
Figure 38:
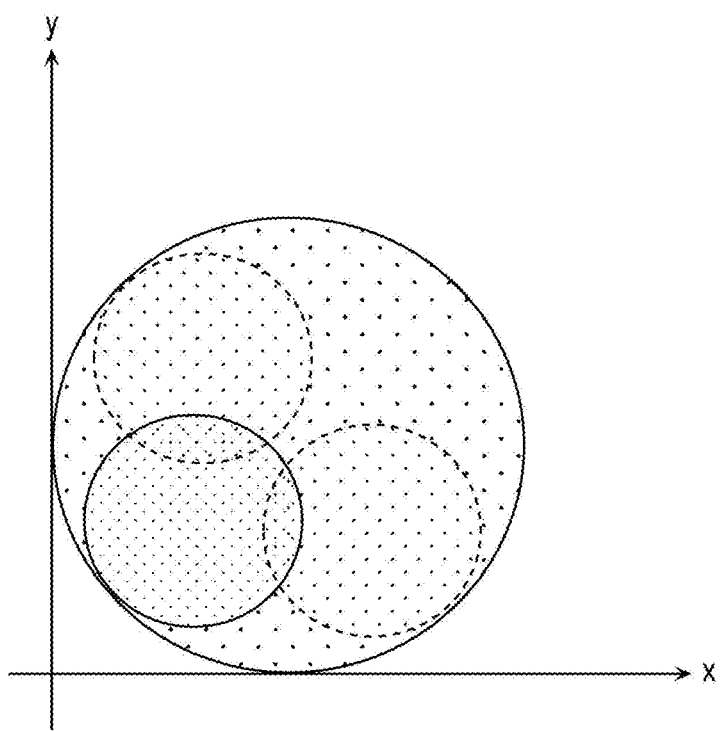
FIG. 38 is a cross-sectional view of a three-dimensional model of an embryo in a four cell stage.

The three-to-two dimension converter 523 generates a cross-section image in one or more planes determined in step S1231 for the three-dimensional model rotated in step S12415 (step S12416). FIG. 37 is a perspective view of a three-dimensional model obtained by rotating the three-dimensional model in the reference position shown in FIG. 35D about a rotation axis given by an axis parallel to the x-axis and passing through the center of the embryo. A cross-section image in a plane represented by a broken line in FIG. 37 is generated. On the cross-section image, as illustrated in FIG. 38, a cell located at a lower left position has a clear contour, but a cell located at a highest position in the z-axis direction can not be seen in the cross-section image and two cells located at middle positions are not clear in contour. The three-to-two dimension converter 523 generates a cross-section image in a specified plane based on a depth of field from the rotated three-dimensional model. Note that the depth of field employed herein is equal to the depth of field of the image generation system 50.

The comparator 524 makes a comparison between the in-focus image in the horizontal plane generated in step S1232 and the cross-section image generated in step S12416, and determines whether a value indicating a difference between them is smaller than a value stored in the storage 525 (step S12417). In a case where the difference is equal to or greater than the value stored in the storage 525 (no in step S12417), the processing flow returns to step S12414. On the other hand, in a case where the difference is smaller than the value stored in the storage 525 (yes in step S12417), the processing flow proceeds to step S12418. Note that an initial value of an upper limit of the difference is determined in advance and stored in the storage 525.

The storage 525 stores the value indicating the difference between the in-focus image and the cross-section image (step S12418). That is, the value stored in the storage 525 is updated by the value indicating the difference between the in-focus image in the horizontal plane generated in step S1232 and the cross-section image generated in step S12416. Thereafter, the processing flow returns to step S12414.

Figure 39:
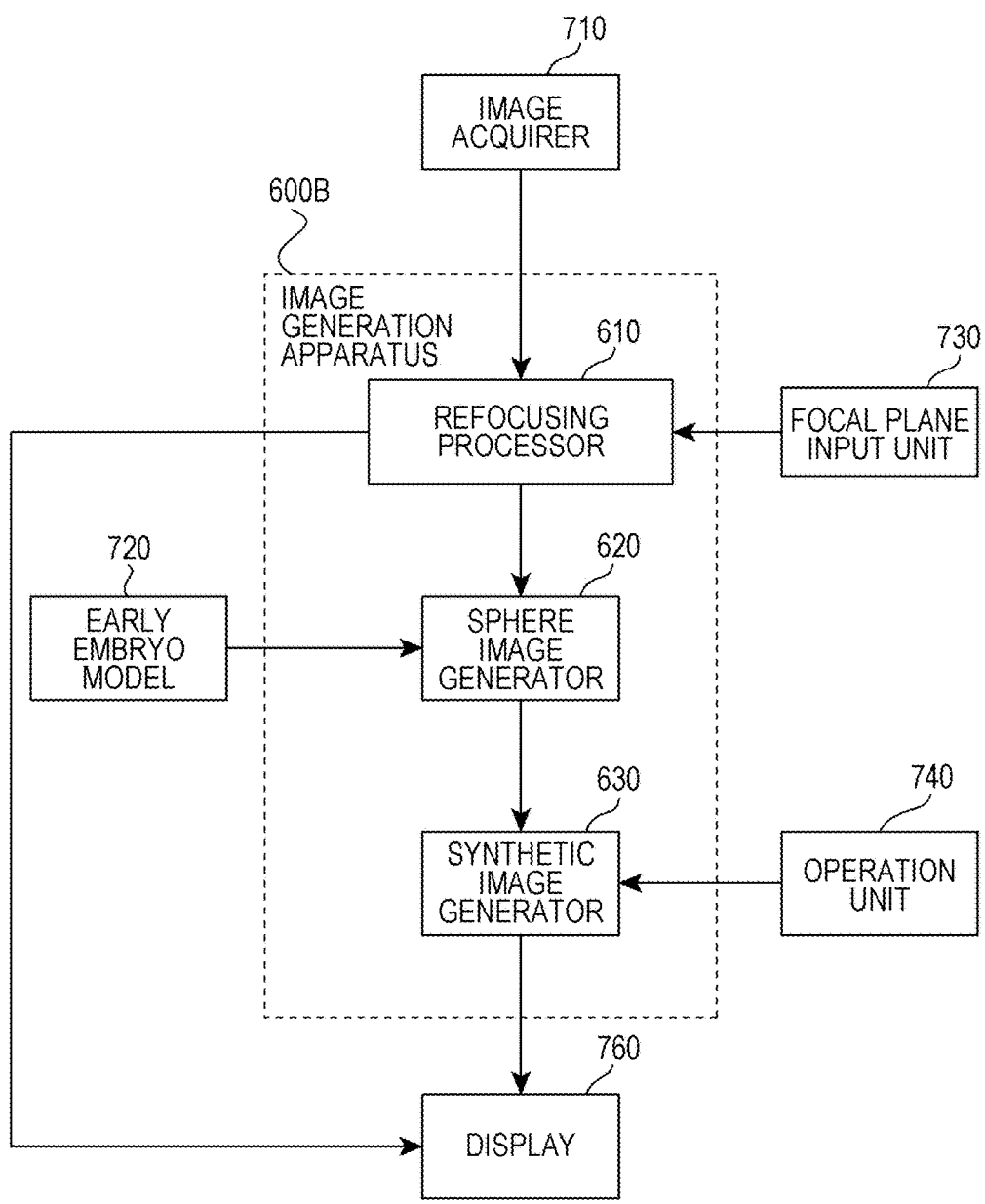
FIG. 39 is a functional block diagram of an image generation system according to a fourth embodiment.

By repeatedly performing the comparison process from step S12414 to step S12418, it is possible to determine how much to rotate the three-dimensional mode from the reference position to obtain a cross-section image of the three-dimensional mode which is the most similar to the in-focus image generated in step S1232 (that is, the in-focus image in the horizontal plane generated from the captured image).
Advantageous Effects In the image generation system 50 according to the present modification, as described above, it is possible to properly determine the position and the angle of the focal plane depending on the cell arrangement of the early embryo given as the object, and thus it is possible to generate an in-focus image suitable for observing the early embryo.
Fourth Embodiment In a fourth embodiment, an image generation apparatus displays a synthetic image for guiding a user in selecting an in-focus image to be displayed. The image generation apparatus according to the fourth embodiment performs the refocusing process in a similar manner as the image generation apparatuses 100B, 200B, 300B, 400B, and 500B according to the first to third embodiment or modifications thereto.
Image Generation System FIG. 39 is a functional block diagram of an image generation system according to the fourth embodiment.

In the fourth embodiment, the image generation system includes an image generation apparatus 600B, an image acquisition unit 710, an early embryo model 720, a focal plane input unit 730, an operation unit 740, and a display 760.

The image acquisition unit 710 includes an image capturing apparatus and a storage, according to one of the first to third embodiments or modifications thereto. That is, the image acquisition unit 710 acquires a plurality of captured images of an object via an image capturing process performed by the image sensor 102 such that an image of the object is captured each time the object is irradiated sequentially by a plurality of irradiators 101.

The early embryo model 720 is a storage medium in which model data is stored. The model data is data representing a model of an early embryo in which an embryonic membrane of the early embryo and cells existing in a region surrounded by the embryonic membrane are each modeled in the form of a sphere wherein the number of cells varies depending on a culture time. Furthermore, in the model represented by the model data, the sphere of the embryonic membrane is greater than the spheres of cells, and the sphere of the embryonic membrane contains the spheres of cells, wherein the surface of the sphere of the embryonic membrane does not intersect with the surface of the sphere of any cell. In the fourth embodiment, the object is an embryo (more specifically, an early embryo) and this embryo is modeled by the early embryo model 720 such that the model includes at least one sphere.

The object whose image is to be captured is, for example, a plurality of translucent substances placed on the image sensor 102. A specific example of an object is an early embryo of a fertilized egg of a vertebrate animal, that is, an embryo having a spherical shape. In some cases, a plurality of substances in the object may have an overlap in position when seen in a projected view. A specific example of a set of a plurality of substances is a set of a plurality of spherical cells. The fourth embodiment is described below for a case where the object is an early embryo. The shape of the object whose image is to be captured is not limited to the spherical shape, but the object may be of any shape. For example, the shape of the object whose image is to be captured may be a polyhedron. The shape of each of the plurality of substances is not limited to the sphere, but it may be any shape. For example, the shape of each of the plurality of substances may be a polyhedron. To make it possible to capture an image of each of the plurality of substances existing in the inside of the object whose image is to be captured, it is desirable that the object is transparent or translucent. It is desirable that the plurality of substances are transparent or translucent such that light emitted from the irradiator 101 can pass through them, although the plurality of substances may not be transparent or translucent. The object may not include two or more substances, but it may include only one substance.

The display 760 may be realized, for example, by a liquid crystal display, an organic electroluminescence display, or the like, and the display 760 displays an in-focus image and a synthetic image functioning as the guide described above.

The focal plane input unit 730 accepts a request by a user for a refocusing process, that is, a request for generating an in-focus image.

The operation unit 740 accepts an operation by a user in terms of a screen of the display 760.

The image generation apparatus 600B generates an in-focus image by performing the refocusing process as described above, and generates a synthetic image for guiding a user in selecting a focal plane of the in-focus image to be displayed.

Image Generation Apparatus

The image generation apparatus 600B includes, as illustrated in FIG. 39, a refocusing processor 610, a sphere image generator 620, and a synthetic image generator 630. The image generation apparatus 600B may be realized using a control circuit. The image generation apparatus 600B may include a plurality of irradiators 101, and an image sensor 102 having a surface on which an object is placed.

The refocusing processor 610 has a function similar to that of the image generation apparatuses 100B, 200B, 300B, 400B, and 500B, and the refocusing processor 610 generates a synthetic image of an object by performing a refocusing process. That is, the refocusing processor 610 generates the in-focus image of the object in each of a plurality of predetermined focal planes by using a plurality of captured images of the object obtained by the image sensor 102 by capturing an image each time the object is irradiated sequentially by one of the plurality of irradiators 101.

The plurality of the captured images of the object have been acquired by the image acquisition unit 710 and stored in the storage.

A plurality of focal planes determined in advance are, for example, such planes that are parallel to the light reception surface of the image sensor 102 and that are located equally apart from each other in a direction perpendicular to the light reception surface (that is, in a direction along the z-axis). More specifically, the plurality of the focal planes are disposed 1 μm or 2 μm apart from each other. Hereinafter, the plurality of these focal planes determined in advance will also be referred as initial focal planes.

The sphere image generator 620 extracts a contour of at least one cross section of the object represented in the plurality of in-focus images generated by the refocusing processor 610. Next, the sphere image generator 620 generates at least one circumference based on the extracted at least one cross section. The sphere image generator 620 then generates a sphere image, in the form of a three-dimensional image, of at least one or more spheres, each sphere having one of the at least one or more circumferences generated. More specifically, the sphere image generator 620 refers to the early embryo model 720 and generates the sphere image thereof. That is, in the present embodiment, the object is an embryo, and each of the at least one or more spheres includes an outer sphere and at least one inner sphere wherein the outer sphere represents an outward appearance of the embryo, and each inner sphere is contained in the outer sphere and represents an outward appearance of a cell.

The synthetic image generator 630 generates a synthetic image by processing the sphere image such that a cross section appears, and displays the resultant synthetic image on the display 760.

When an operation on the screen by a user is accepted by the operation unit 740, then in accordance with the operation performed by the user, the synthetic image generator 630 changes the position of the cross section represented in the synthetic image displayed on the display 760.

When a request from a user for generating an in-focus image is accepted by the focal plane input unit 730, the refocusing processor 610 generates the synthetic image of the object according to the request from the user. That is, in response to the request from the user, the refocusing processor 610 generates the in-focus image of the object in the focal plane corresponding to the cross section displayed on the display 760 by using the plurality of captured images, and displays the resultant in-focus image on the display 760. Note that the plurality of the captured images of the object have been acquired by the image acquisition unit 710 and stored in the storage.

Figure 40:
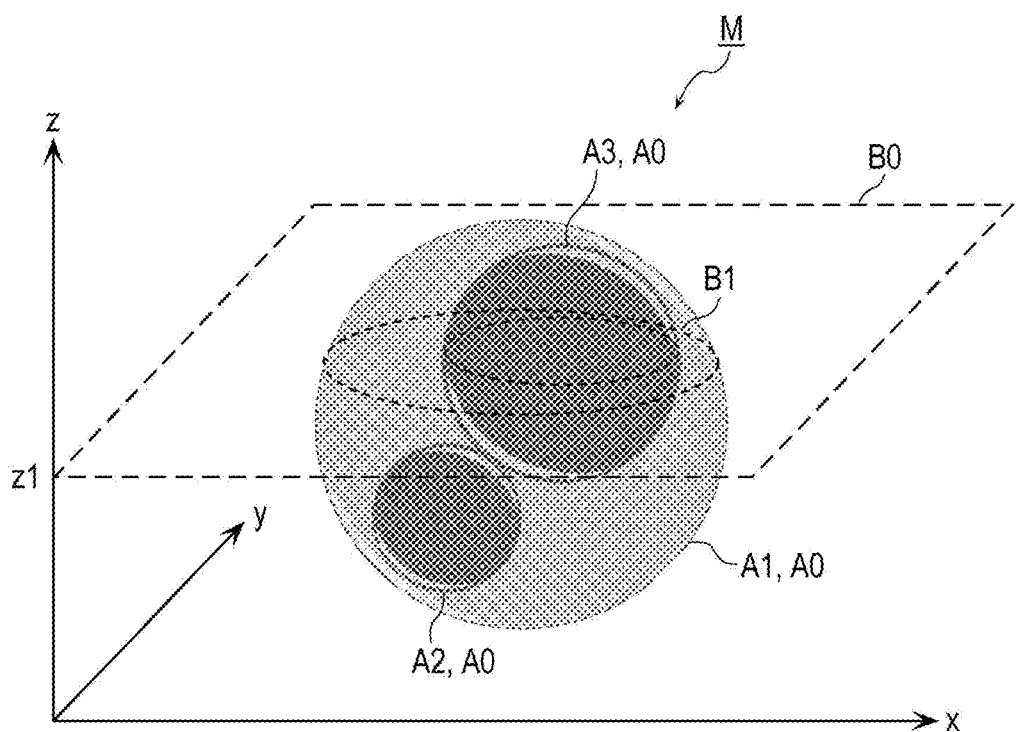
FIG. 40 is a diagram illustrating an example of a synthetic image displayed by a synthetic image generator according to the fourth embodiment.

FIG. 40 is a diagram illustrating an example of a synthetic image displayed by the synthetic image generator 630.

For example, the sphere image generator 620 generates, as a sphere image A0, a sphere A1 including two smaller spheres A2 and A3. Note that the sphere image A0 is formed so as to be translucent such that the inside thereof can be seen. For example, the sphere image generator 620 generates the above-described sphere image A0 in a virtual space in which a plane parallel to the light reception surface of the image sensor 102 is employed as an xy-plane and a direction perpendicular to this xy-plane is employed as a z-axis direction.

The synthetic image generator 630 synthesizes a synthetic image M by processing the sphere image A0 such that a plane B0 intersects with the sphere image A0. That is, the synthetic image generator 630 generates the synthetic image M by processing the sphere image A0 such that a cross section B1 of at least one sphere appears, and the synthetic image generator 630 displays the resultant synthetic image M on the display 760. For example, the plane B0 used in this process is, in an initial state, located at a position of z-coordinate=z1 and it extends parallel to the xy-plane. As a result, in the synthetic image M, a cross section B1 which is parallel to the xy-plane and located at z-coordinate=z1 appears. In a case where the light reception surface of the image sensor 102 is located at z-coordinate=0, z1 is, for example, 50 μm.

On the other hand, when an operation is performed by a user to input a command to change the position of the displayed cross section B1 (that is, the plane B0), then, in response to the operation, the synthetic image generator 630 changes the position of the cross section B1 in the sphere image A0.

In the fourth embodiment, as described above, the embryo given as the object is modeled as the sphere image A0. A user is allowed to change the position of the cross section B1 of the synthetic image M, that is, the user is allowed to easily select any cross section of the embryo, which makes it possible for the user to understand the general state of the embryo and detailed cross-sectional structure.

Sphere Image Generator

Figure 41:
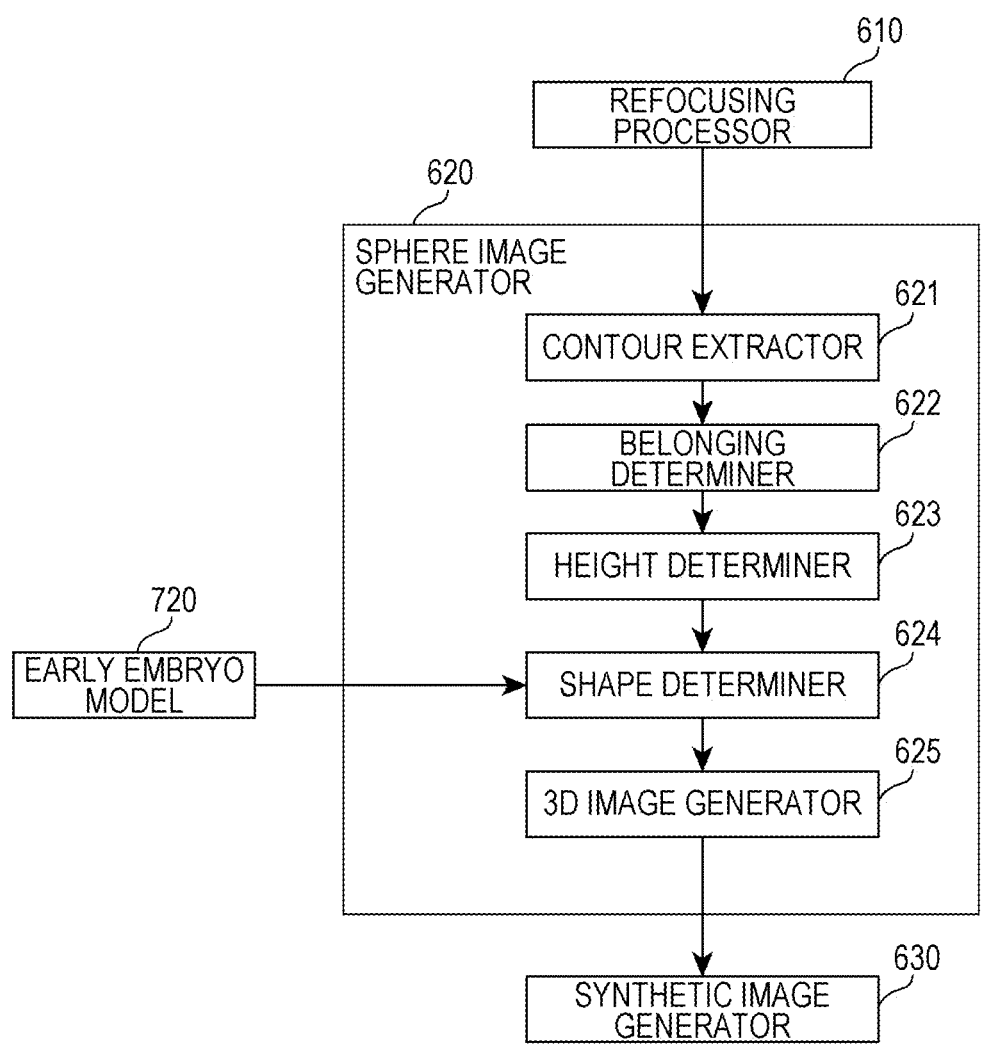
FIG. 41 is a block diagram illustrating a detailed functional configuration of a sphere image generator according to the fourth embodiment.

FIG. 41 is a block diagram illustrating a detailed functional configuration of the sphere image generator 620.

The sphere image generator 620 includes a contour extractor 621, a belonging determiner 622, a height determiner 623, a shape determiner 624, and a three-dimensional image generator 625.

The contour extractor 621 extracts a contour of a cross section of the object represented in the in-focus image in each of the plurality of initial focal planes. More specifically, the contour extractor 621 detects an edge having contrast higher than a threshold value and employs the detected edge as the contour. For example, in a case where the object is an embryo, the embryo has an embryonic membrane, and contains cells surrounded by the embryonic membrane where the number of cells may vary depending on the culture time. The embryonic membrane and the cells each have a shape similar to a sphere. Thus, the contour extractor 621 extracts contours each having a shape similar to a circle from each in-focus image. Note that the number of contours extracted from one in-focus image may be one, two or more, or zero, depending on the situation. For example, the contour extractor 621 extracts Ka contours from in-focus images in a plurality of initial focal planes where Ka is an integer equal to or greater than 2. For example, the contour extractor 621 extracts edge point from each in-focus image and performs a Hough transform on the extracted edge points. Note that the edge point refers to a point at which there is a large difference in pixel value between a pixel and an adjacent pixel. In the Hough transform, a circumference passing through an edge point (x, y) in an orthogonal coordinate plane corresponding to a focal plane is represented by center coordinates (centerX, centerY) and a coordinate point (centerX, centerY, r) including a parameter of radius r. Thereafter, the shape determiner 624 determines a candidate for the circumference passing through the edge point. That is, when centerX and centerY (center position) are given, a radius r can be determined according to formula $r^2=(x-centerX)^2+(y-centerY)^2$. Thus, the shape determiner 624 converts an edge point (x, y) on an orthogonal coordinate plane to a plane in a (centerX, centerY, r)-three-dimensional space. In a case where positions of a plurality of edge points on an orthogonal coordinate plane are (x1, y1), ..., (xn, yn), the shape determiner 624 generates n planes in the (centerX, centerY, r)-three-dimensional space. Points shared by these n planes (where n is an integer equal to or greater than 2) lie on a single circumference on the original orthogonal coordinate plane. Thus, the shape determiner 624 determines a circumference on the original orthogonal coordinate plane specified by points shared by the n planes in the (centerX, centerY, r)-three-dimensional space. That is, the shape determiner 624 detects points shared by many planes from the original edge points, and determines a circumference based on the detected points.

The belonging determiner 622 determines whether an extracted contours is a contour corresponding to the same constituent element included in the object. This determination is performed for each of the extracted Ka contours. The belonging determiner 622 selects Kb contours corresponding to the same constituent element from the Ka contour where Kb is an integer equal to or greater than 2. In a case where the object includes a plurality of constituent elements, the belonging determiner 622 selects a plurality of contours corresponding to the same constituent element for each of the plurality of constituent elements. In a case where the object is an embryo, the embryo or a cell is a constituent element.

The determination as to whether a contour corresponds to the same constituent element is performed based on the shape, the size, and the position of each contour (edge).

That is, in the present embodiment, the contour extractor 621 and the belonging determiner 622 extract a plurality of contours, which are located at the same position in respective in-focus images and which are the same in size and shape, from contours of cross sections of the object represented in the respective in-focus images generated by the refocusing processor 610. These contours which are located at the same position in the respective in-focus images and which are the same in size and shape are contours corresponding to the same constituent element.

The height determiner 623 identifies a z-coordinate of an in-focus image in the initial focal plane for each of the in-focus images having the respective Kb contours corresponding to the same constituent element. The height determiner 623 detects an initial focal plane whose z-coordinate is at the center of the identified z-coordinate values of the Kb initial focal planes. The height determiner 623 employs the z-coordinate of the detected initial focal plane as the height of the center of the same constituent element described above. In a case where the object includes a plurality of constituent elements, the height determiner 623 determines the height of the center of the constituent element for each of the plurality of constituent elements. More specifically, the height of the center of the embryonic membrane or the height of the center of each cell is determined.

The shape determiner 624 determines the shape of each constituent element of the object using the early embryo model 720. More specifically, according to the model data of the early embryo model 720, as described above, the embryonic membrane and the cells are each modeled as a sphere. Therefore, the shape determiner 624 models each constituent element of the object as a sphere. That is, the shape determiner 624 sets the z-coordinate of the center of each sphere so as to be equal to the height of the center of the corresponding constituent element determined by the height determiner 623. The shape determiner 624 then sets the radius of the sphere so as to be equal to the radius of the circumference of the shape formed by the contour of the constituent element located at the determined height. Thereafter, the shape determiner 624 sets the x-coordinate and the y-coordinate of the center of the sphere so as to be equal to those of the center position of the circumference in the initial focal plane. As a result, for the constituent element of interest of the object, the center coordinates (x-coordinate, y-coordinate, z-coordinate) and the radius of the sphere are set. In a case where the object includes a plurality of constituent elements, the shape determiner 624 sets the center coordinates and the radius of the sphere for each constituent element.

In other words, the shape determiner 624 generates a circumference based on a contour having a highest edge intensity of the plurality of contours selected by the belonging determiner 622. The highest edge intensity may be detected, for example, by comparing the sharpness. The sharpness may be obtained, for example, by converting an image into frequency components by performing a Fourier transform. The higher frequency components means the higher sharpness. The frequency components higher than a predetermined frequency are compared among those of contours, and a contour having highest frequency components is determined as a contour having the highest edge intensity. The plurality of contours selected by the belonging determiner 622 are contours corresponding to the same constituent element extracted by the contour extractor 621 and the belonging determiner 622. That is, the above-described height determiner 623 determines the height of the center of the same constituent element by employing, as the height, the z-coordinate of the in-focus image in the initial focal plane in which the contour with the highest edge intensity is represented.

The shape determiner 624 generates a circumference inscribed in or circumscribed about the contour having the highest edge intensity.

The three-dimensional image generator 625 generates a sphere image as a three-dimensional image of a sphere corresponding to the center coordinates and the radius set by the shape determiner 624 to the structure of the object. In a case where the object includes a plurality of constituent elements, the three-dimensional image generator 625 generates the sphere image such that the three-dimensional image includes spheres corresponding to the respective constituent elements. The three-dimensional image generator 625 outputs the resultant sphere image to the synthetic image generator 630.

That is, in the present embodiment, the shape determiner 624 and the three-dimensional image generator 625 generate the sphere image such that the three-dimensional image includes the sphere having the same center and the same radius as those of the generated circumference. In this process, in a case where a plurality of circumferences are selected or extracted, the three-dimensional image generator 625 generate the sphere image such that the three-dimensional image includes a plurality of spheres whose respective spherical surfaces do not intersect with each other.

Note that there is a possibility that a plurality of in-focus images exit which each represent a highest edge intensity. In such a case, the shape determiner 624 generates a plurality of circumferences. In this case, the three-dimensional image generator 625 may generate the three-dimensional image based on the plurality of circumferences. That is, the three-dimensional image generator 625 identifies z-coordinates of the respective initial focal planes of the in-focus images in which highest edge intensities are represented. The three-dimensional image generator 625 employs the center of the determined z-coordinates as the center of the sphere. Furthermore, the three-dimensional image generator 625 employs the distance from the determined center of the sphere to one of the plurality of circumferences as the radius of the radius. Alternatively, the three-dimensional image generator 625 employs the radius of one of the plurality of circumferences as the radius of the sphere. After the center and the radius of the sphere are determined in the above-described manner, the three-dimensional image generator 625 generates a three-dimensional image including the sphere having the determined center and radius.

Figure 42:
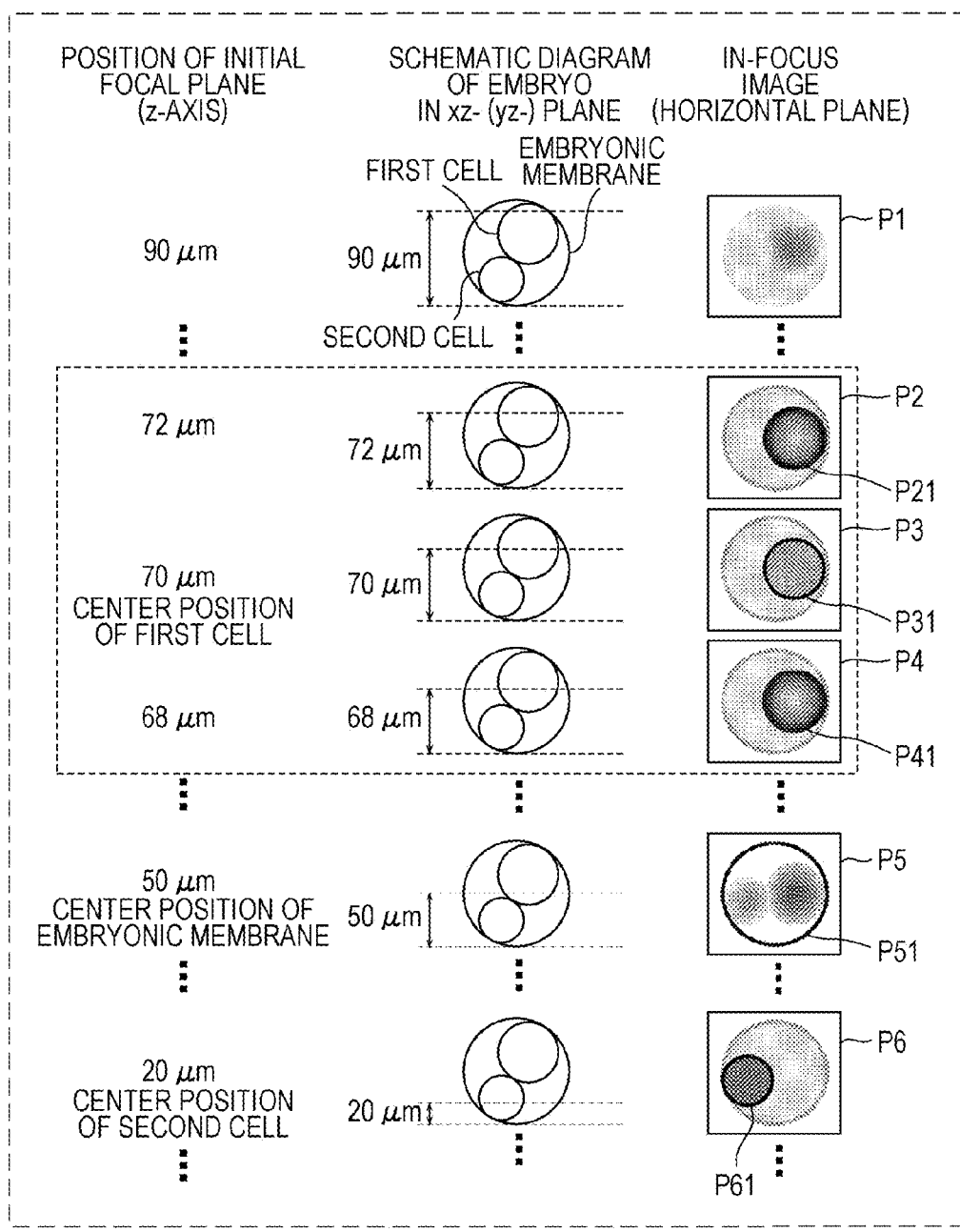
FIG. 42 is a diagram illustrating an example of a specific process performed by the sphere image generator according to the fourth embodiment.

FIG. 42 illustrates a specific example of the process performed by the sphere image generator 620.

It is assumed here by way of example that the object is an embryo with a diameter of about 100 µm, and the embryo includes, as constituent elements, an embryonic membrane and two cells (a first cell and a second cell) surrounded by the embryonic membrane.

A plurality of initial focal planes are set such that they are arranged in parallel to the light reception surface of the image sensor 102 and such that they are apart in a direction along the z-axis from each other by 2 µm. The height from the light reception surface of the image sensor 102 is defined in the direction of the z-axis, and thus, for example, 55 initial focal planes are respectively located at heights of 2 µm, 4 µm, 6 µm, . . . , 108 µm, and 110 µm.

The refocusing processor 610 generates synthetic images for the respective 55 initial focal planes. The in-focus images generated in these initial focal planes are each an image including, for example, 260 pixels×260 pixels.

The contour extractor 621 extracts contours with edges having contrast higher than a threshold value from the respective in-focus images in the 55 initial focal planes. For example, the contour extractor 621 extracts contours P21, P31, P41, P51, and P61 from the respective in-focus images P2, P3, P4, P5, and P6. Let a denote the average pixel value of pixels determined as those forming the contours represented in the in-focus images, and let b denote the average pixel value of pixels adjacent to the pixels determined as those forming the contours represented in the in-focus images, then contour contrast of the in-focus image may be given by |a−b|.

The belonging determiner 622 determines whether the extracted contours P21, P31, P41, P51, and P61 are contours corresponding to the same constituent element included in the embryo. In the present example, the contours P21, P31, and P41 are similar to each other in terms of edge shape, size, and position, and are different from the other contours P51 and P61. The determination as to the similarity in terms of the edge shape and the size can be performed by comparing the radiuses of the contours P21, P31, P41, P51, and P61. More specifically, for example, the average of radiuses and the standard deviation thereof are determined. If a contour has a radius having a difference greater than the standard deviation from the average, then it is determined that this contour does not correspond to the same constituent element. In a case where contours are not circular, for example, contours P21, P31, P41, P51, and P61 may be placed such that the barycenters of the contours P21, P31, P41, P51, and P61 are located at the same position, and the determination as to the similarity may be performed based on a difference between contours. The difference in contour may be performed as follows. For example, to determine the difference between the contour P21 and contour P31, the distance from a point on P21 to a nearest point on P31 is determined. The distance between nearest points on P21 and P31 is determined for as many points on P21 as a predetermined number, and the sum thereof is determined. The difference in contour is also determined for each of other two contours, and clustering is performed based on the difference in contour. Alternatively, straight lights may be drawn radially from the barycenter, and the distance between intersections on P21 and P31 may be determined for each straight light. When the variance of the distance is large, it is determined that shapes are different, while when the variance is small, it is determined that shapes are similar. The difference in contour position is determined by comparing the center positions or barycenter positions among the contours P21, P31, P41, P51, and P61. For example, the average of distances between centers and the standard deviation of distances are determined. When the distance to another center is larger than the sum of the determined average distance between centers and the standard deviation, it is determined that the contour positions are different. Thus, the belonging determiner 622 selects three contours P21, P31, and P41 as those corresponding to the first cell from the contours P21, P31, P41, P51, and P61

Next, the height determiner 623 identifies the z-coordinates of the respective initial focal planes of the in-focus images P2, P3, and P4 respectively including three contours P21, P31, and P41 corresponding to the first cell, that is, the heights thereof are respectively identified as 72 µm, 70 µm, and 68 µm. Thereafter, the height determiner 623 detects an initial focal plane whose height is at the center of the identified heights from the three identified initial focal planes. That is, the height determiner 623 detects the initial focal plane with the height of 70 µm. The height determiner 623 employs the height, 70 µm, of the detected initial focal plane as the height of the center of the first cell.

In a case where contours have been extracted by the contour extractor 621 also from synthetic images in initial focal planes located at heights close to 50 µm, the belonging determiner 622 selects these contours together with the contour P51 as a plurality of contours corresponding to the embryonic membrane. The height determiner 623 identifies the heights of the initial focal planes of the in-focus images including the respective contours. The height determiner 623 detects an initial focal plane with a height equal to the center value of identified heights of the plurality of initial focal planes. In this specific example, the height determiner 623 detects the initial focal plane with the height of 50 μm. The height determiner 623 employs the height, 50 μm, of the detected initial focal plane as the height of the center of the embryonic membrane.

Similarly, in a case where contours have been extracted by the contour extractor 621 also from synthetic images in initial focal planes located at heights close to 20 μm, the belonging determiner 622 selects these contours together with the contour P61 as a plurality of contours corresponding to the second cell. The height determiner 623 identifies the heights of the initial focal planes of the in-focus images including the respective contours. The height determiner 623 detects an initial focal plane with a height equal to the center value of the identified height values of the plurality of initial focal planes. In this specific example, the height determiner 623 detects the initial focal plane with the height of 20 μm. The height determiner 623 employs the height, 20 μm, of the detected initial focal plane as the height of the center of the second cell.

The shape determiner 624 models each constituent element of the embryo as a sphere. That is, the shape determiner 624 sets the z-coordinate of the center of the sphere to be equal to the height of the center of the first cell determined by the height determiner 623. Furthermore, the shape determiner 624 sets the radius of the sphere so as to be equal to the radius of the circumference along the contour P31 of the first cell included in the in-focus image P3 generated in the initial focal plane located at the determined height (70 μm) of the center of the first cell. The shape determiner 624 then sets the x-coordinate and the y-coordinate of the center of the sphere so as to be equal to those of the center position of the circumference in the initial focal plane. As a result, for the first cell of the embryo, the center coordinates (x-coordinate, y-coordinate, z-coordinate=70 μm) and the radius of the sphere are set. Similarly, the shape determiner 624 sets the center coordinates and the radius of the sphere for the embryonic membrane and the second cell.

As a result, as shown in FIG. 40, the three-dimensional image generator 625 generates, as the sphere image A0, a three-dimensional image including three spheres A1 to A3 respectively having the center coordinates and the radiuses set for the embryonic membrane, the first cell, and the second cell in the above-described manner. Furthermore, the synthetic image generator 630 combines the plane B0 and the sphere image A0 generated by the three-dimensional image generator 625 thereby generating a synthetic image M in which a cross section B1 of the sphere image A0 appears.

Figure 43:
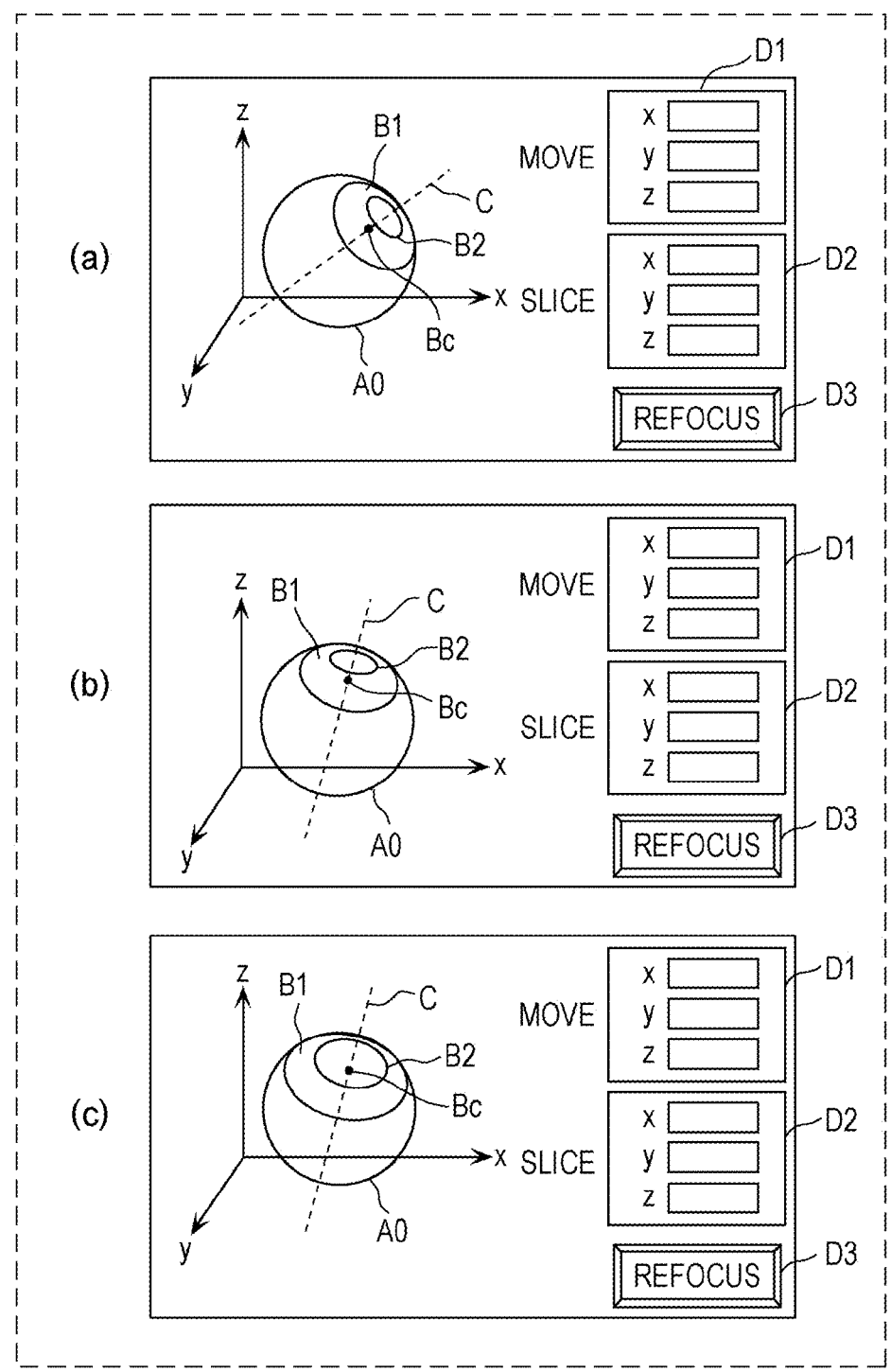
FIG. 43 is a diagram illustrating an example of a screen displayed on a display according to the fourth embodiment.

FIG. 43 illustrates an example of a screen displayed on the display 760.

In the example shown in FIG. 40, the synthetic image generator 630 generates the synthetic image M such that the whole sphere image A0 and the cross section B1 are represented. To make it possible for the cross section B1 to be more easily be seen, the synthetic image generator 630 may generate the synthetic image such that the cross section B1 and only one of two parts of the sphere image A0 divided by the cross section B1 are represented. For example, in the cross section B1, the contour B2 of the sphere A3 representing the first cell modeled in the above-described manner is shown (see FIG. 40).

The synthetic image generator 630 displays the above-described synthetic image on the display 760. When the synthetic image is displayed, the synthetic image generator 630 may also display a center axis C, which extends in a direction perpendicular to the cross section B1 passing through the center of the cross section B1.

The synthetic image generator 630 also displays an axis adjust box D1, a cross section adjustment box D2, and a refocus button D3.

For example, the operation unit 740 may accept an operation by a user to input an x-coordinate, a y-coordinate, a z-coordinate in the axis adjust box D1. The synthetic image generator 630 change the direction of the center axis C such that the center axis C extends along a vector indicated by the accepted coordinates. As a result, the direction of the synthetic image, as a whole, including the sphere image A0 displayed on the display 760 is changed as shown in FIG. 43(a) and FIG. 43(b). Alternatively, the synthetic image generator 630 may change only the direction of the cross section B1. That is, the synthetic image generator 630 may change the direction of the center axis C, as the direction of the normal line of the cross section B1, without changing the direction of the center axis of the sphere image A0. Thus, only the direction of the cross section B1 is changed without changing the direction of the sphere image A0 displayed on the display 760.

The operation unit 740 may also accept an operation by a user to input an x-coordinate, a y-coordinate, a z-coordinate in the cross section adjustment box D2. The synthetic image generator 630 moves the center Bc of the cross section B1 to a position indicated by the accepted coordinates. Note that the x-coordinate, the y-coordinate, and the z-coordinate input in the cross section adjustment box D2 are limited to those indicating a position on the center axis C. Thus, as shown in FIG. 43(b) and FIG. 43(c), the synthetic image generator 630 moves the position of the cross section B1 of the sphere image A0 displayed on the display 760 such that the position moves along the center axis C according to the coordinates input in the cross section adjustment box D2.

The focal plane input unit 730 may accept a selection operation on the refocus button D3 performed by a user to request a refocusing process. In response to a request from a user, the refocusing processor 610 generates, using a plurality of captured images, an in-focus image of an object in a focal plane corresponding to the cross section B1 displayed on the display 760, and displays the generated in-focus image on the display 760. Note that the plurality of captured images are images acquired by the image acquisition unit 710.

Operation of Image Generation Apparatus

FIG. 44 is a flow chart illustrating an example of an operation of the image generation apparatus 600B according to the fourth embodiment.

(Step S100) First, the refocusing processor 610 generates an in-focus image of an object in each of a plurality of focal planes by using a plurality of captured images of the object acquired by the image acquisition unit 710.

(Step S110) Next, the sphere image generator 620 extracts a contour of a cross section of the object represented in each of the generated in-focus images, and the sphere image generator 620 generates a sphere image, in the form of a three-dimensional image, of at least one or more spheres respectively having circumferences corresponding to the extracted contours.

(Step S120) Next, the synthetic image generator 630 generates a synthetic image by processing the sphere image such that a cross section appears, and displays the resultant synthetic image on the display 760.

(Step S130) Next, the refocusing processor 610 determines whether a request for an in-focus image, that is, a request for a refocusing process, is accepted by the focal plane input unit 730.

(Step S140) In a case where it is determined in step S130 that the request is accepted (yes in step S130), the refocusing processor 610 generates an in-focus image. That is, in response to the request from the user, the refocusing processor 610 generates, using a plurality of captured images, an in-focus image of an object in a focal plane corresponding to the cross section displayed on the display 760. Note that the plurality of captured images are a plurality of captured images of the object acquired by the image acquisition unit 710.

(Step S150) The refocusing processor 610 displays the generated in-focus image on the display 760.

(Step S160) In a case where the refocusing processor 610 determines in step S130 that a request for an in-focus image is not accepted (No in step S130), the synthetic image generator 630 determines whether an operation on the screen by a user is accepted by the operation unit 740. In a case where the synthetic image generator 630 determines that an operation on the screen is not accepted (No in step S160), the image generation apparatus 600B ends the process.

(Step S170) On the other hand, in a case where it is determined that an operation on the screen is accepted (yes in step S160), the synthetic image generator 630 changes the displayed synthetic image in accordance with the accepted operation. That is, the synthetic image generator 630 changes the position of the cross section represented in the displayed synthetic image in accordance with the operation performed by the user. The image generation apparatus 600B then performs the process from step S130 repeatedly.

FIG. 45 is a flow chart illustrating a detailed process of generating a sphere image in step S110 shown in FIG. 44.

(Step S111) First, the contour extractor 621 of the sphere image generator 620 extracts a contour of a cross section of the object represented in the in-focus image in each of the plurality of initial focal planes.

(Step S112) The belonging determiner 622 selects a plurality of contours corresponding to a same constituent element from the plurality of contours extracted in step S111, for each of at least one or more constituent elements included in the object.

(Step S113) For each of at least one or more constituent elements included in the object, the height determiner 623 identifies heights (z-coordinates) of a plurality of contours corresponding to the same constituent element. The height determiner 623 employs the center of the identified heights of the plurality of contours as the height of the center of the constituent element.

(Step S114) The shape determiner 624 generates a spherical model of a constituent element for each of the at least one or more constituent elements included in the object. That is, the shape determiner 624 generates a spherical model of a constituent element using the early embryo model 720, the height of the center of the constituent element, and contours extracted from the in-focus image at this height.

(Step S115) The three-dimensional image generator 625 generates a sphere image, in the form of a three-dimensional image, of at least one or more spheres obtained by modeling the at least one constituent element included in the object.

The image generation apparatus 600B according to the fourth embodiment described above is realized using the plurality of irradiators 101 and the control circuit.

Figure 46A:
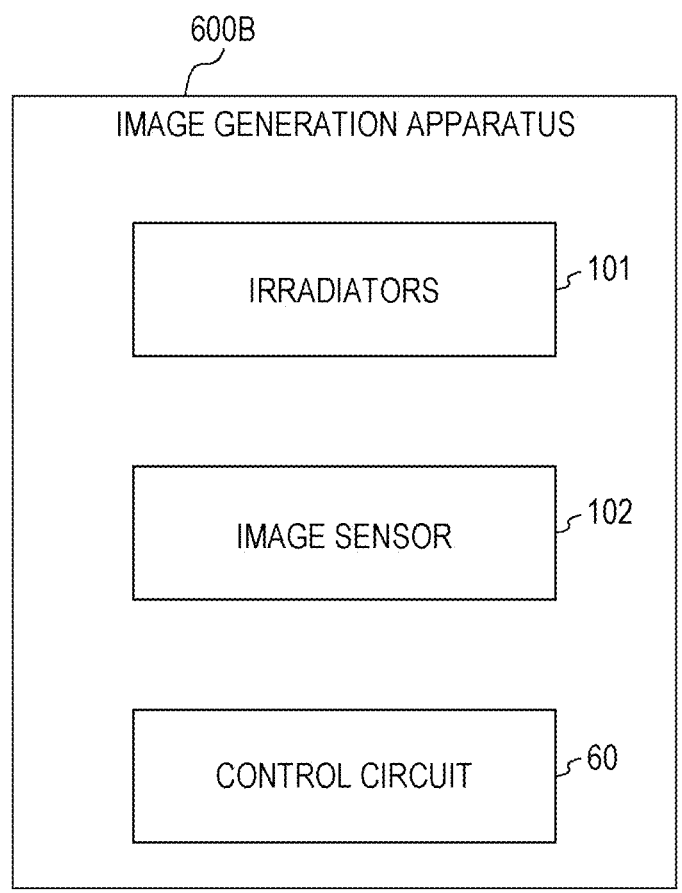
FIG. 46A is a diagram illustrating an example of a hardware configuration of an image generation apparatus according to the fourth embodiment.

FIG. 46A is a diagram illustrating an example of a hardware configuration of the image generation apparatus 600B according to the fourth embodiment.

In the fourth embodiment, the image generation apparatus 600B includes a plurality of irradiators 101, an image sensor 203 having a surface on which an object is placed, and a control circuit 60 that generates an in-focus image of the object in a virtual focal plane located between the image sensor 102 and the plurality of irradiators 101. The control circuit 60 achieves respective functions of the refocusing processor 610, the sphere image generator 620, and the synthetic image generator 630. Note that the control circuit 60 may achieve the functions by executing a program or a command stored in a non-transitory storage medium.

That is, the control circuit 60 generates the in-focus image of the object in each of a plurality of predetermined focal planes by using a plurality of captured images of the object obtained by the image sensor 102 by capturing an image each time the object is irradiated sequentially by one of the plurality of irradiators 101. Next, the control circuit 60 extracts a contour of at least one or more cross sections of the object represented in the plurality of generated in-focus images. Next, the control circuit 60 generates at least one or more circumferences based on the contour of the at least one or more cross sections, and generates a sphere image A0 in the form of a three-dimensional image of at least one or more spheres, each sphere having one of the generated at least one or more circumferences. The control circuit 60 then generates a synthetic image M by processing the sphere image A0 such that a cross section B1 of the at least one sphere appears, and the control circuit 60 displays the resultant synthetic image on the display 760.

FIG. 46B is a flow chart illustrating an example of an operation of the control circuit 60 included in the image generation apparatus 600B.

(Step S61) First, the control circuit 60 generates the in-focus image of the object in each of a plurality of predetermined focal planes by using a plurality of captured images of the object obtained by the image sensor 102 by capturing an image each time the object is irradiated sequentially by one of the plurality of irradiators 101.

(Step S62) Next, the control circuit 60 extracts a contour of at least one or more cross sections of the object represented in the plurality of generated in-focus images.

(Step S63) Next, the control circuit 60 generates at least one or more circumferences based on the contour of the at least one or more cross sections.

(Step S64) Next, the control circuit 60 generates a sphere image A0 in the form of a three-dimensional image of at least one or more spheres, each sphere having one of the generated at least one or more circumferences.

(Step S65) The control circuit 60 generates a synthetic image M by processing the sphere image A0 such that a cross section B1 of at least one sphere appears, and displays the resultant synthetic image M on the display 760.

As a result, the object is modeled as the sphere image A0, and a synthetic image M including, for example, sphere image A0 and its cross section B1 is displayed on the display 760. Thus, a user is allowed to easily understand a structure of the object by observing the synthetic image M.

In response to an operation performed by a user, the control circuit 60 may change the position of the cross section B1 shown in the displayed synthetic image M. In this case, according to the request from the user, the control circuit 60, generates, using a plurality of captured images, an in-focus image of an object in a focal plane corresponding to the cross section B1 displayed on the display 760, and the synthetic image generator 630 displays the resultant in-focus image on the display 760.

Thus, a user is allowed to change the position, at which the cross section B1 of the synthetic image M is taken, to another desired position and display the resultant in-focus image. Thus, a user is allowed to determine the position of a cross section of a cell the user wants to observe while seeing an internal structure of an embryo. The capability of allowing a user to seeing the internal structure makes it possible for the user to efficiently selected a position of a cross section. Therefore, it is possible to easily display an in-focus image of an object at a cross section desired by a user.

The image generation system including the image generation apparatus 600B described above may further include a number-of-cells input unit that allows a user to input the number of cells. In this case, the sphere image generator 620 generates the sphere image A0 based on the number of cells input via the number-of-cells input unit. More specifically, the sphere image generator 620 sets center coordinates and radiuses of n spheres based on the contours extracted from the synthetic images in the plurality of initial focal planes. However, in a case where the number of cells input via the number-of-cells input unit is m (m<n), the sphere image generator 620 treats (n−m) spheres of the n spheres as noise. These (n−m) spheres treated as noise are, for example, spheres which are smaller than remaining m spheres of n spheres. Thus, the sphere image generator 620 generates a sphere image including m spheres. Thus the sphere image generated in the above-described manner does not include noise, which makes it possible to properly generate a model of the object. Note that the number-of-cells input unit may accept a culture time instead of the number of cells. In this case, the number-of-cells input unit refers to the embryo information table 420 according to the third embodiment, and identifies the number of cells based on the accepted culture time.

In the fourth embodiment, the shape determiner 624 sets the radius of the sphere so as to be equal to the radius of the circumference of the shape formed by the contour of the constituent element. The circumference may be a circumference that is inscribed in the contour or a circumference that is circumscribed about the contour.

In the fourth embodiment, the image generation apparatus 600B performs the process in step S130, S160, and S170 shown in FIG. 44. However, these steps may not be performed. In this case, the image generation apparatus 600B displays on the display 760 a synthetic image in which a cross section at a predetermined position is shown. That is, in a case where the position of the cross section allowed to be specified by a user is fixed, the image generation apparatus 600B displays a synthetic image in which the cross section at the fixed position appears without accepting an operation on the screen by a user. The image generation apparatus 600B then generates an in-focus image in a focal plane corresponding to the cross section and displays the generated in-focus image.

Other Embodiments

The image generation system has been described above with reference to embodiments. However, the present disclosure is not limited to those embodiments described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

In the third embodiment and the modification thereto described above, the time 430 determines the culture time by measuring the elapsed time from the start of culture. However, alternatively, the elapsed time since fertilization. In this case, in the embryo information table, not information on the culture time but information on the elapsed time since the fertilization may be described.

The present disclosure is applicable to a wide variety of apparatuses that generate an image of a cell being cultured or clumps of cells such as an embryo or the like.

What is claimed is:

1. An image generation apparatus comprising
a plurality of irradiators;
an image sensor having a surface on which an object is placed; and
a control circuit that generates an in-focus image of the object in a virtual focal plane located between the image sensor and the plurality of irradiators, wherein the control circuit performs an operation including
(a) generating an in-focus image of the object in each of a plurality of predetermined focal planes by using a plurality of captured images of the object, the captured images being obtained such that the plurality of irradiators sequentially irradiate the object and one image is captured by the image sensor each time the object is irradiated by one of the plurality of irradiator,
(b) extracting a contour of at least one or more cross sections of the object represented in the plurality of generated in-focus images,
(c) generating at least one or more circumferences based on the contour of the at least one or more cross sections,
(d) generating a sphere image in the form of a three-dimensional image of at least one or more spheres, each sphere having one of the generated at least one or more circumferences, and
(e) generating a synthetic image by processing the sphere image such that a cross section of the at least one or more spheres appears in the synthetic image, and displaying the resultant synthetic image on a display,
wherein the object is an embryo,
and wherein each of the at least one or more spheres includes an outer sphere representing an outward appearance of the embryo and at least one or more inner spheres, each inner sphere being contained in the outer sphere and representing an outward appearance of a cell.

2. The image generation apparatus according to claim 1, wherein the control circuit performs the operation such that
in (b), from the contours of the cross sections of the object represented in the respective generated in-focus images, a plurality of contours having the same size and located at the same position are extracted from the respective in-focus images, and
in (c), the circumference is generated based on a contour having a highest edge intensity among the extracted contours.

3. The image generation apparatus according to claim 2, wherein in the operation performed by the control circuit, in (c), the circumference is generated such that the circumference is inscribed in or circumscribed about the contour having the highest edge intensity.

4. The image generation apparatus according to claim 3, wherein in the operation performed by the control circuit, in (d), the sphere image is generated such that the sphere image includes a three-dimensional image of a sphere having the same center and the same radius as the center and the radius of the generated circumference.

5. The image generation apparatus according to claim 1, wherein in the operation performed by the control circuit, in (d), the sphere image is generated such that the sphere image includes a three-dimensional images of a plurality of spheres whose respective spherical surfaces do not intersect with each other.

6. The image generation apparatus according to claim 1, wherein the operation performed by the control circuit further includes
(f) in response to an operation performed by a user, changing the position of the cross section in the synthetic image displayed on the display, and
(g) in response to a request from a user, generating an in-focus image of the object in a focal plane corresponding to the cross section displayed on the display by using the plurality of captured images, and displaying the resultant in-focus image on the display.

7. An image generation method for generating an in-focus image of an object in a virtual focal plane located between a plurality of irradiators and an image sensor on which the object is placed, the method comprising:
(a) generating an in-focus image of the object in each of a plurality of predetermined focal planes by using a plurality of captured images of the object, the captured images being obtained such that the plurality of irradiators sequentially irradiate the object and one image is captured by the image sensor each time the object is irradiated by one of the plurality of irradiator,
(b) extracting a contour of at least one or more cross sections of the object represented in the plurality of generated in-focus images,
(c) generating at least one or more circumferences based on the contour of the at least one or more cross sections,
(d) generating a sphere image in the form of a three-dimensional image of at least one or more spheres, each sphere having one of the generated at least one or more circumferences, and
(e) generating a synthetic image by processing the sphere image such that a cross section of the at least one or more spheres appears in the synthetic image, and displaying the resultant synthetic image on a display,
wherein the object is an embryo,
and wherein each of the at least one or more spheres includes an outer sphere representing an outward appearance of the embryo and at least one or more inner spheres, each inner sphere being contained in the outer sphere and representing an outward appearance of a cell.

8. The image generation method according to claim 7, wherein the method further includes
in (b), from the contours of the cross sections of the object represented in the respective generated in-focus images, a plurality of contours having the same size and located at the same position are extracted from the respective in-focus images, and
in (c), the circumference is generated based on a contour having a highest edge intensity among the extracted contours.

9. The image generation method according to claim 8, wherein in (c), the circumference is generated such that the circumference is inscribed in or circumscribed about the contour having the highest edge intensity.

10. The image generation method according to claim 9, wherein in (d), the sphere image is generated such that the sphere image includes a three-dimensional image of a sphere having the same center and the same radius as the center and the radius of the generated circumference.

11. The image generation method according to claim 7, wherein in (d), the sphere image is generated such that the sphere image includes a three-dimensional images of a plurality of spheres whose respective spherical surfaces do not intersect with each other.

12. The image generation method according to claim 7, wherein the method further comprises
(f) in response to an operation performed by a user, changing the position of the cross section in the synthetic image displayed on the display, and
(g) in response to a request from a user, generating an in-focus image of the object in a focal plane corresponding to the cross section displayed on the display by using the plurality of captured images, and displaying the resultant in-focus image on the display.

13. A storage medium including a control program for causing a device including a processor to execute a process, the storage medium being a computer-readable non-transitory storage medium, the process being a process for generating an in-focus image of an object in a virtual focal plane located between a plurality of irradiators and an image sensor on which the object is placed, the process comprising:
(a) generating an in-focus image of the object in each of a plurality of predetermined focal planes by using a plurality of captured images of the object, the captured images being obtained such that the plurality of irradiators sequentially irradiate the object and one image is captured by the image sensor each time the object is irradiated by one of the plurality of irradiator,
(b) extracting a contour of at least one or more cross sections of the object represented in the plurality of generated in-focus images,
(c) generating at least one or more circumferences based on the contour of the at least one or more cross sections,
(d) generating a sphere image in the form of a three-dimensional image of at least one or more spheres, each sphere having one of the generated at least one or more circumferences, and
(e) generating a synthetic image by processing the sphere image such that a cross section of the at least one or more spheres appears in the synthetic image, and displaying the resultant synthetic image on a display,
wherein the object is an embryo,
and wherein each of the at least one or more spheres includes an outer sphere representing an outward appearance of the embryo and at least one or more inner spheres, each inner sphere being contained in the outer sphere and representing an outward appearance of a cell.

14. The storage medium according to claim 13, wherein
in (b), from the contours of the cross sections of the object represented in the respective generated in-focus images, a plurality of contours having the same size and located at the same position are extracted from the respective in-focus images, and
in (c), the circumference is generated based on a contour having a highest edge intensity among the extracted contours.

15. The storage medium according to claim 14, wherein in (c), the circumference is generated such that the circumference is inscribed in or circumscribed about the contour having the highest edge intensity.

16. The storage medium according to claim 15, wherein in (d), the sphere image is generated such that the sphere image includes a three-dimensional image of a sphere having the same center and the same radius as the center and the radius of the generated circumference.

17. The storage medium according to claim 13, wherein in (d), the sphere image is generated such that the sphere image includes a three-dimensional images of a plurality of spheres whose respective spherical surfaces do not intersect with each other.

18. The storage medium according to claim 13, wherein the program further causes the computer to execute the process including
(f) in response to an operation performed by a user, changing the position of the cross section in the synthetic image displayed on the display, and
(g) in response to a request from a user, generating an in-focus image of the object in a focal plane corresponding to the cross section displayed on the display by using the plurality of captured images, and displaying the resultant in-focus image on the display.

19. A method for performing a process with a processor, the process comprising:
(i) causing irradiators to irradiate an embryo including a cell for irradiation periods that are assigned to the respective irradiators such that there is no overlap;
(ii) causing an image sensor to capture an image of the embryo during each of irradiation periods in which the corresponding irradiators irradiate the embryo thereby obtaining a plurality of images of the embryo;
(iii) generating in-focus images focused in respective focal planes;
(iv) detecting an edge having a maximum intensity in each of the in-focus images;
(v) based on a predetermined radius of the embryo and an edge with a maximum intensity included in a first in-focus image, determining a first circle having a first radius and a first center in the first in-focus image;
(vi) based on a predetermined radius of the cell and an edge with a maximum intensity included in a second in-focus image, determining a second circle having a second radius and a second center in the second in-focus image;
(vii) generating an image of a first sphere whose radius is set to be equal to the first radius and whose center is determined based on the first center and a position of a focal plane corresponding to the first in-focus image relative to the positions of the focal planes;
(viii) generating an image of a second sphere whose radius is set to be equal to the second radius and whose center is determined based on the second center and a position of a focal plane corresponding to the second in-focus image relative to the positions of the focal planes; and
(ix) causing a display to display the image of the first sphere and the image of the second sphere.

* * * * *